US008810882B2

(12) United States Patent
Heikenfeld et al.

(10) Patent No.: US 8,810,882 B2
(45) Date of Patent: Aug. 19, 2014

(54) DISPLAY PIXELS, DISPLAYS, AND METHODS OF OPERATING DISPLAY PIXELS

(75) Inventors: Jason Heikenfeld, Cincinnati, OH (US); Eric Kreit, Cincinnati, OH (US); Shu Yang, Cincinnati, OH (US)

(73) Assignee: University Of Cincinnati, Cincinnati, OH (US)

( * ) Notice: Subject to any disclaimer, the term of this patent is extended or adjusted under 35 U.S.C. 154(b) by 418 days.

(21) Appl. No.: 13/389,730

(22) PCT Filed: Aug. 13, 2010

(86) PCT No.: PCT/US2010/045472
§ 371 (c)(1),
(2), (4) Date: Mar. 6, 2012

(87) PCT Pub. No.: WO2011/020020
PCT Pub. Date: Feb. 17, 2011

(65) Prior Publication Data
US 2012/0154886 A1    Jun. 21, 2012

Related U.S. Application Data

(60) Provisional application No. 61/234,070, filed on Aug. 14, 2009, provisional application No. 61/234,099, filed on Aug. 14, 2009, provisional application No. 61/307,637, filed on Feb. 24, 2010, provisional application No. 61/308,105, filed on Feb. 25, 2010.

(51) Int. Cl.
*G02B 26/00*    (2006.01)
(52) U.S. Cl.
CPC .................................... *G02B 26/004* (2013.01)
USPC ............................. 359/228; 359/253; 345/107

(58) Field of Classification Search
CPC ..... G02B 26/005; G02B 26/004; G06F 1/153
USPC ........ 359/228, 290, 296; 345/48–49, 84, 105, 345/107
See application file for complete search history.

(56) References Cited

U.S. PATENT DOCUMENTS 6,958,132 B2    10/2005    Chiou et al.
8,508,468 B2 *   8/2013    Huitema ....................... 345/107
(Continued)

OTHER PUBLICATIONS

U.S. Patent and Trademark Office, International Search Report and Written Opinion in corresponding International Application No. PCT/US10/45472 mailed Oct. 14, 2010, 10 pp.

(Continued)

*Primary Examiner* — James Phan
(74) *Attorney, Agent, or Firm* — Wood, Herron & Evans, LLP

(57) ABSTRACT

Electrofluidic and electrowetting display pixels, electrofluidic and electrowetting displays, and methods of operating electrofluidic and electrowetting display pixels. The pixel includes a hydrophobic channel formed between first and second substrates and containing a polar fluid and a non-polar fluid, of which at least one is visible through at least one substrate. An electrode with a dielectric is electrically connected to a voltage source. A Laplace barrier defines a fluid pathway for fluid movement in the channel. The polar fluid moves a first position when the voltage source is biased at a first voltage of less than or equal to a threshold voltage to provide a first display state. The polar fluid moves to a second position when the voltage source is biased with a second voltage, greater than the first voltage, to provide a second display state.

25 Claims, 33 Drawing Sheets

(56) References Cited

U.S. PATENT DOCUMENTS

| | | | |
|---|---|---|---|
| 2002/0012856 | A1 | 1/2002 | Ohtsu et al. |
| 2004/0057143 | A1 | 3/2004 | Steinfield et al. |
| 2005/0046673 | A1 | 3/2005 | Silverbrook |
| 2005/0285835 | A1 | 12/2005 | Jessop |
| 2007/0115532 | A1 | 5/2007 | Chen et al. |
| 2008/0230836 | A1 | 9/2008 | Ajiki |
| 2009/0043082 | A1 | 2/2009 | Stoffel et al. |
| 2009/0195850 | A1 | 8/2009 | Takahashi |

OTHER PUBLICATIONS

U.S. Patent and Trademark Office, International Search Report and Written Opinion in corresponding International Application No. PCT/US10/45463 mailed Oct. 14, 2010, 11pp.

Bach, U. et al. Nanomaterials-Based Electrochomics for Paper-Quality Display. Advanced Materials 14, 845-848, 2002.

K.A. Dean, M.R. Johnson, E. Howard, K. Zhou and J. Heikenfeld. Development of Flexible Electrowetting Displays, Proc. Soc. Inf. Display, p. 51.4, 772-775.

M. Dhindsa, J. Heikenfeld, S. Kwon, J. Park, P.D. Rack, I. Papautsky, Virtual electrowetting channels: electronic liquid transport with continuous channel functionality, Lab on a Chip. 10(7): (2010), 832-836.

R. Fair. Digital microfluidics: is a true lab-on-a-chip possible? Microfluidics and Nanfluidics 3, 245-281.

J. Song, R. Evans, Y. Lin, B. Hsu and R. Fair, A Scaling Model for Electrowetting-on-Dielectric, Microfluidic Actuators Microfluidics Nanofluidics, 2009, 7, 75-89.

Gelink, G.H. et al. A rollable, organic electrophoretic QVGA display with field-shielded pixel architecture. J. Soc. Inf. Display 14, 113-118.

Hattori, R. et al. A novel bistable reflective display using quick-response liquid powder. J. Soc. Inf. Display 12, 75-80.

Hayes, R.A. & Feenstra, B.J. Video-speed electronic paper based on electrowetting. Nature 425, 383-385.

J. Heikenfeld, K. Zhou, B. Raj, E. Kreit, B. Sun, and R. Schwartz, Electrofluidic displays exploiting Young-Laplace transposition of brilliant pigment dispersions, Nature Photonics, vol. 3, No. 5, pp. 292-296.

K.-M.H. Lenssen, M.H.W.M. van Delden, M. Müller and L.W.G. Stofmeel, Bright Color Electronic Paper Technology and Applications, Proceedings of the IDW 2009, pp. 529-532.

M. Maillard, J. Legrand, B. Berge. Two Liquids Wetting and Low Husteresis Electrowetting on Dielectric Applications, Langmuir, vol. 25, No. 11, pp. 6162-6167.

Miles, M. et al. Digital Paper for reflective displays. Journal of the Society for Information Display 11, 209-215.

M. Bienia, M. Vallade, C. Quilliet and F. Mugele, Electrical-field-induced curvature increase on a drop of conducting liquid, 2006 Europhys. Lett. 74 103-109.

A.A.S. Bhagat, S.S. Kuntaegowdanahalli, and I. Papautsky, Continuous particle separation in spiral microchannels using Dean flows and differential migration, Lab Chip, vol. 8, pp. 1906-1914, 2008.

A.A.S. Bhagat, S.S. Kuntaegowdanahalli, and I. Papautsky, Geometrically modulated inertial microfluidics for continuous particle filtration and extraction, Microfluid. Nanofluid., vol. 7, pp. 217-226, 2009.

\* cited by examiner

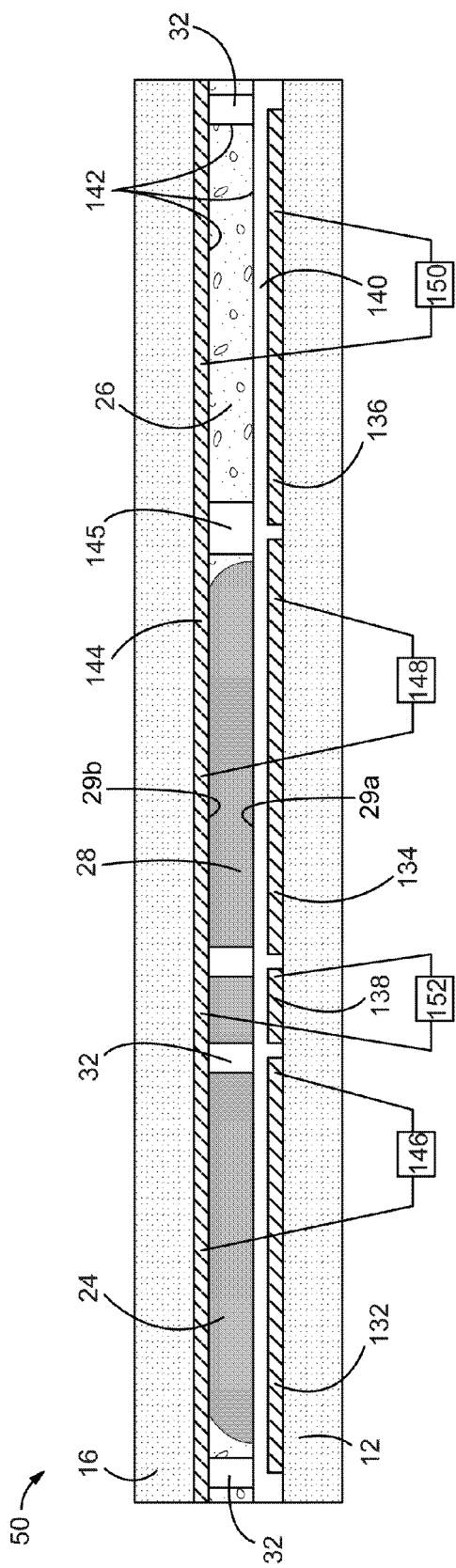
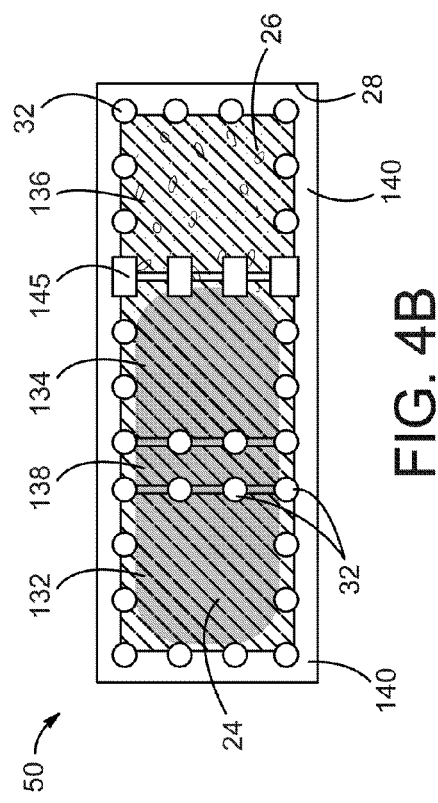
FIG. 4A
FIG. 4B

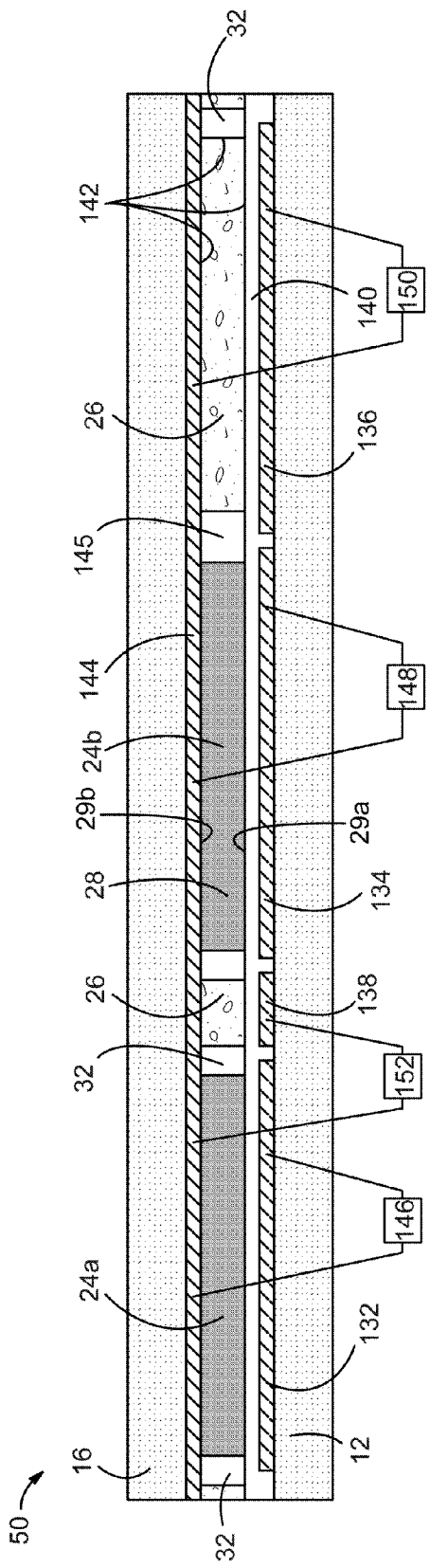
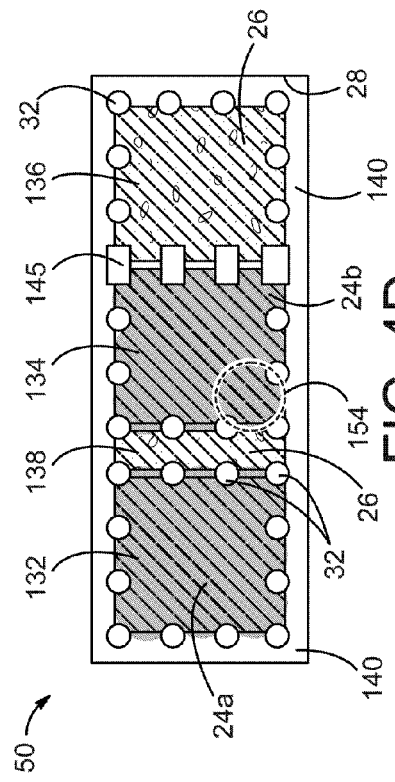

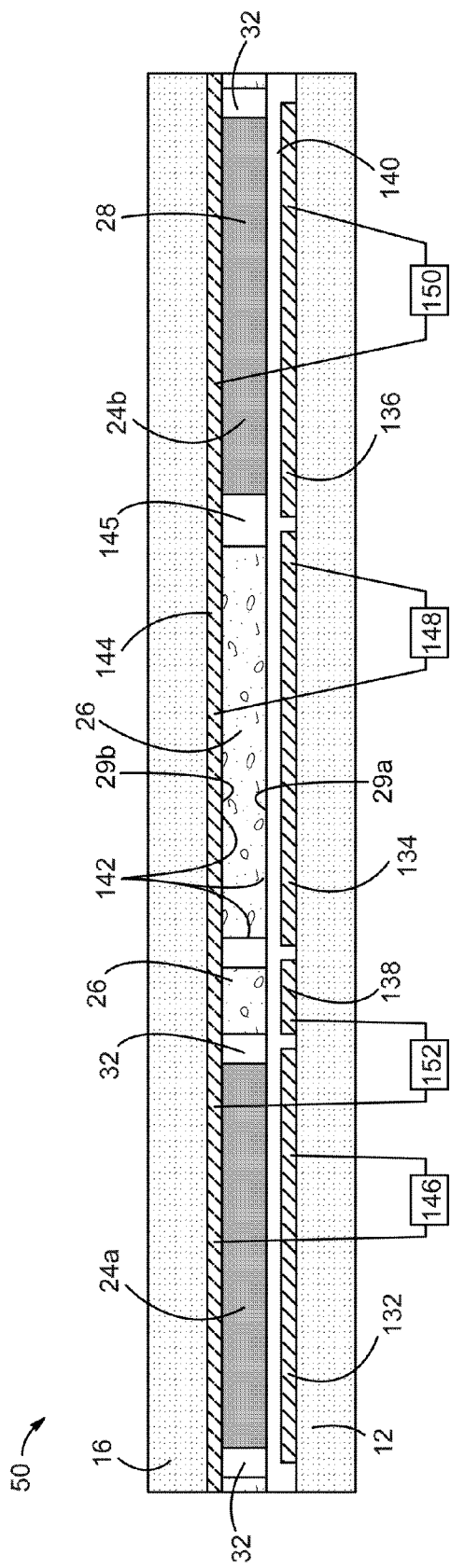
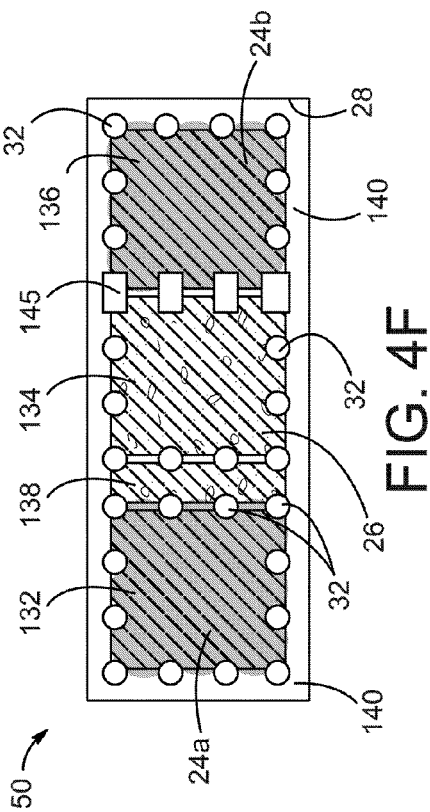
FIG. 4E
FIG. 4F

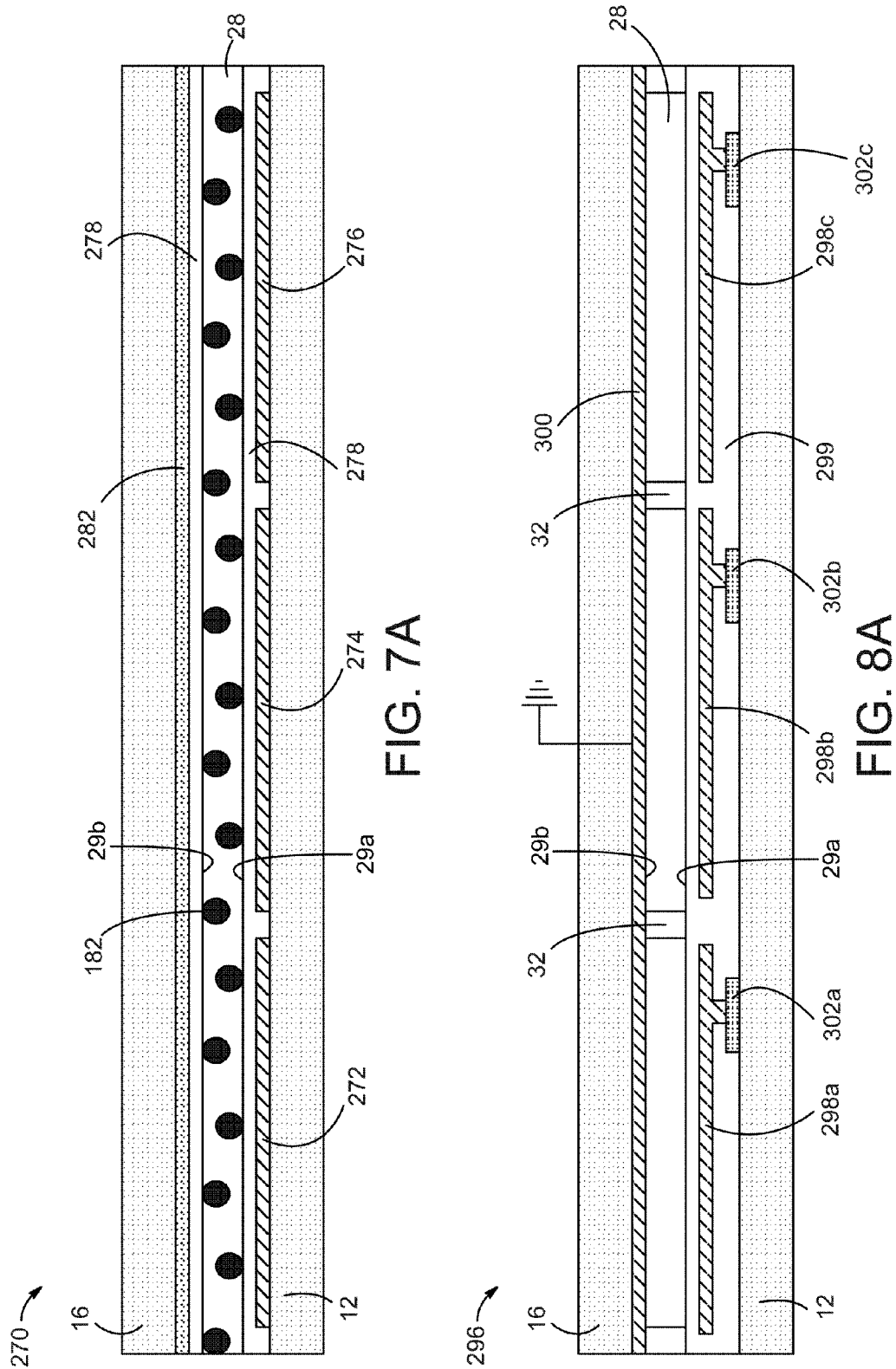

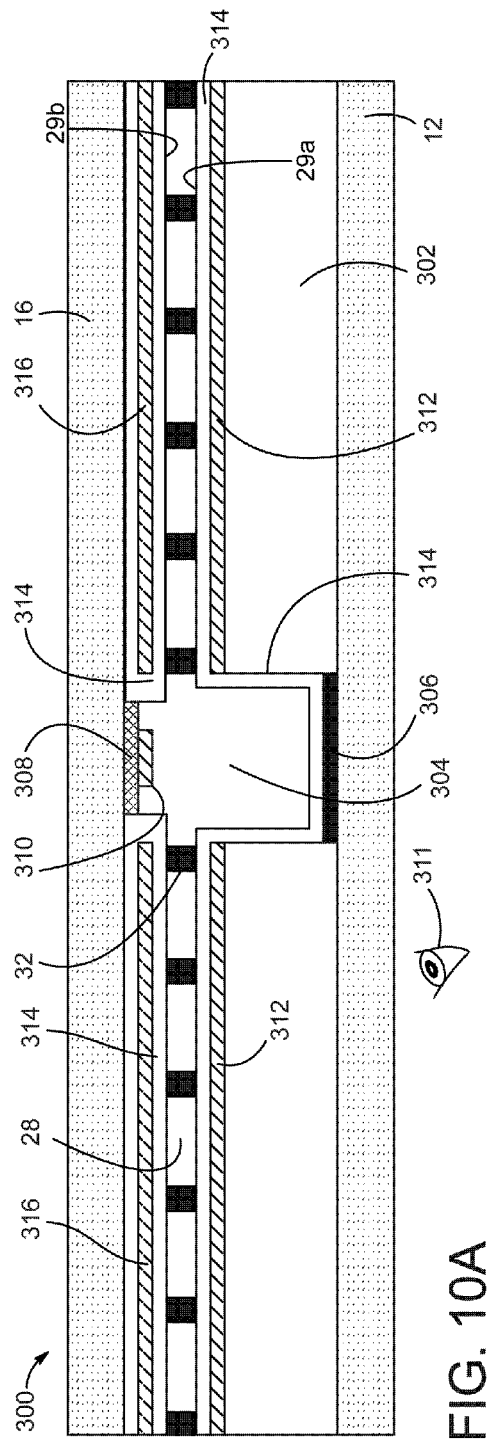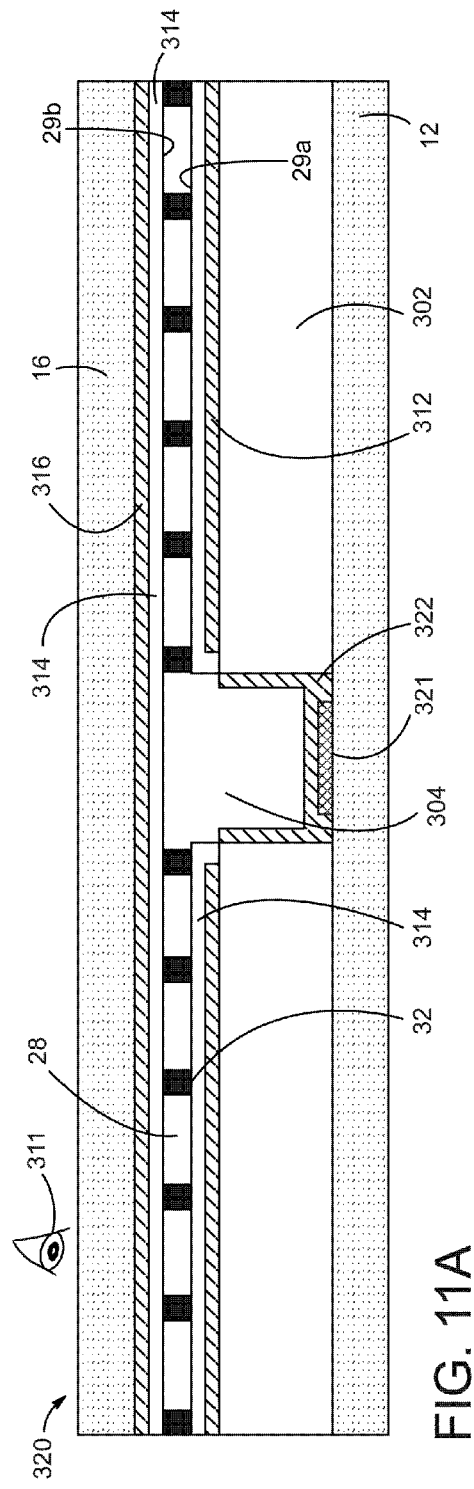

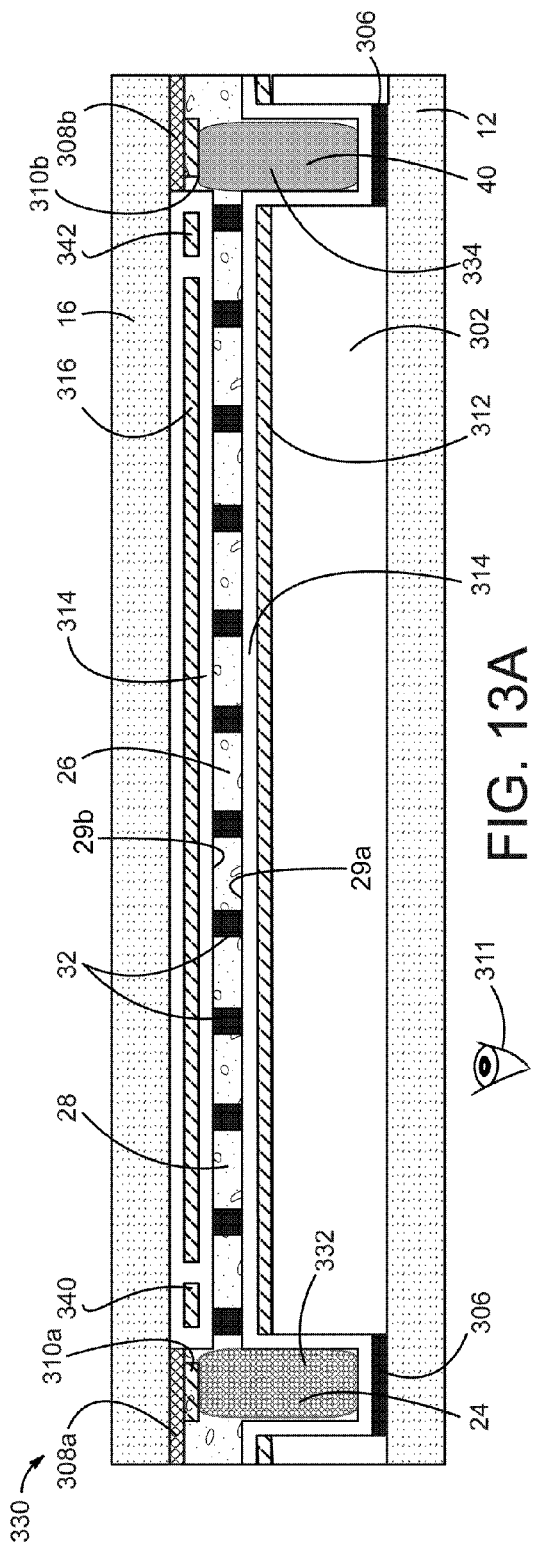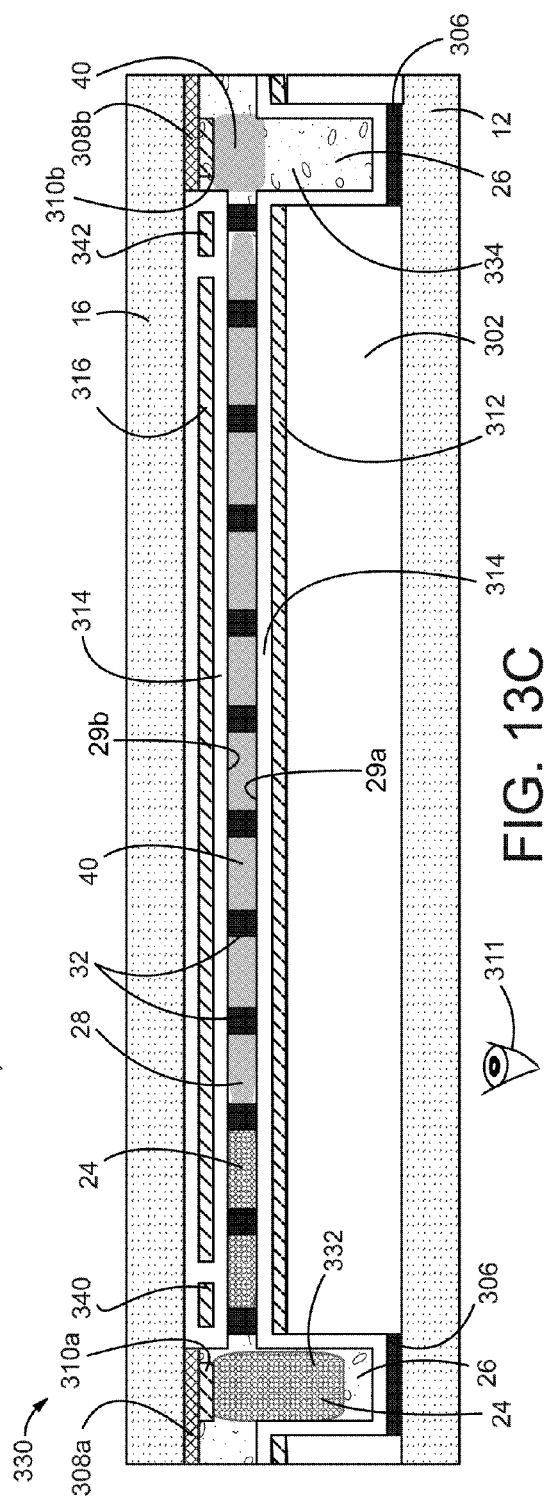

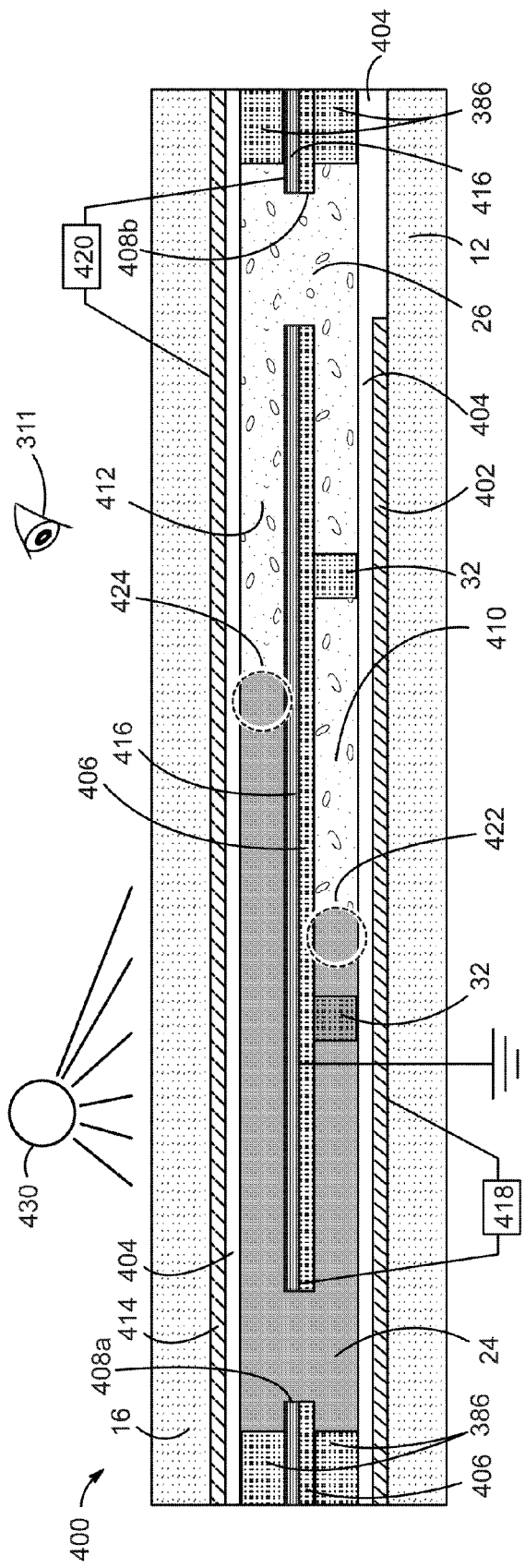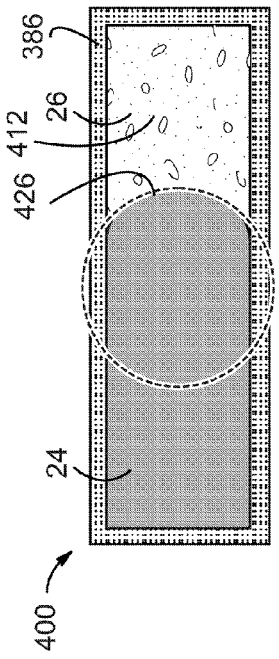
FIG. 17A
FIG. 17B

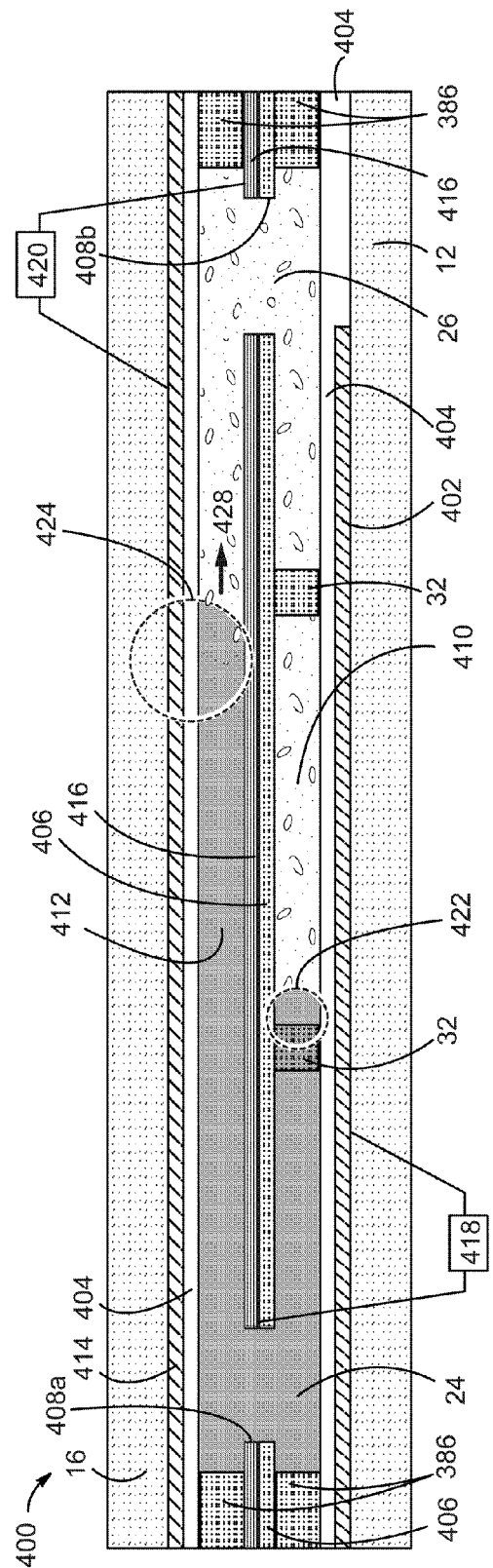
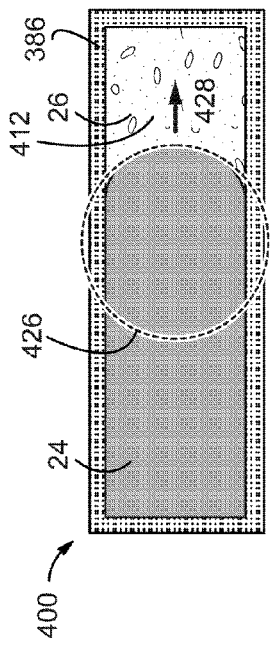
FIG. 17E
FIG. 17F

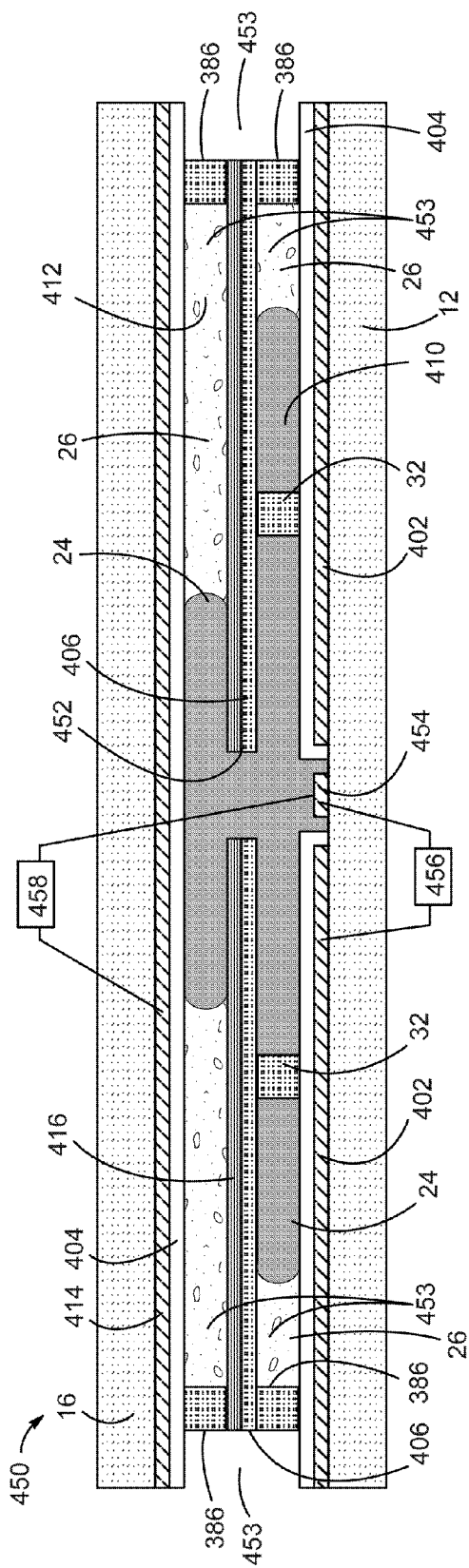
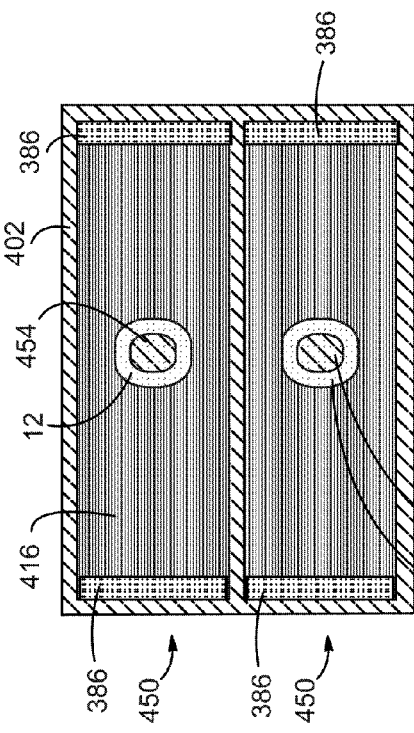
FIG. 18A
FIG. 18B

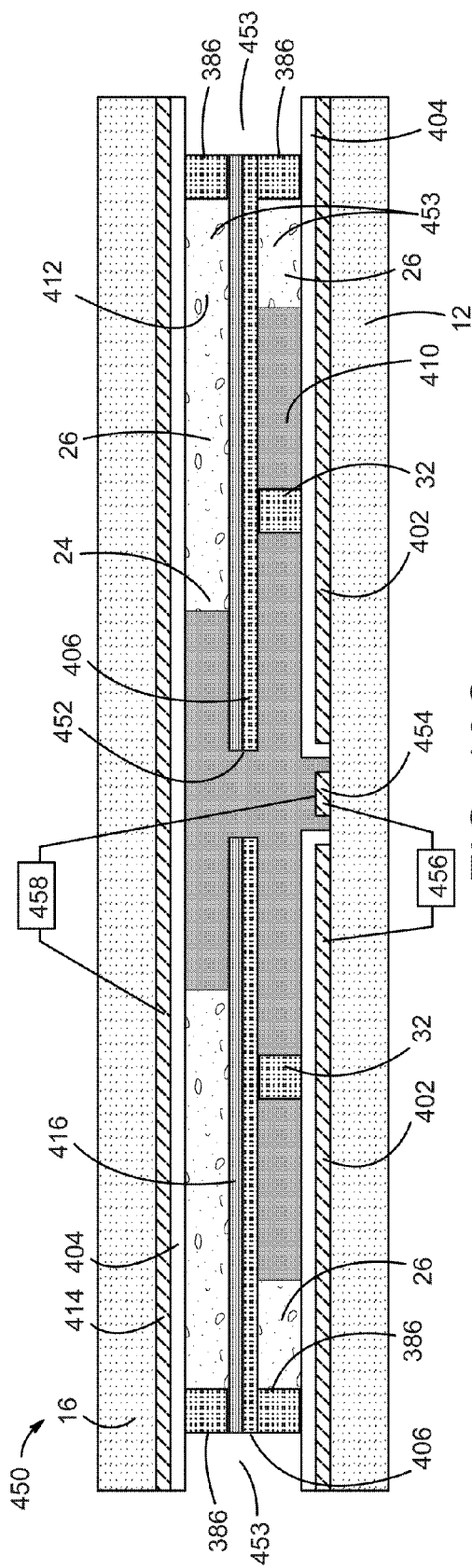
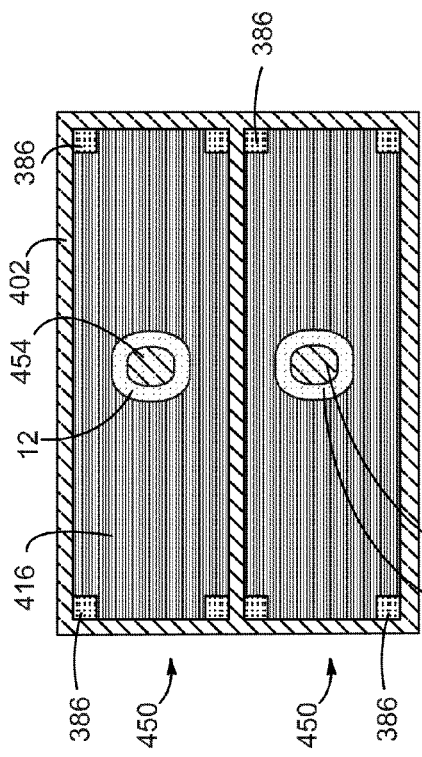
FIG. 18C
FIG. 18D

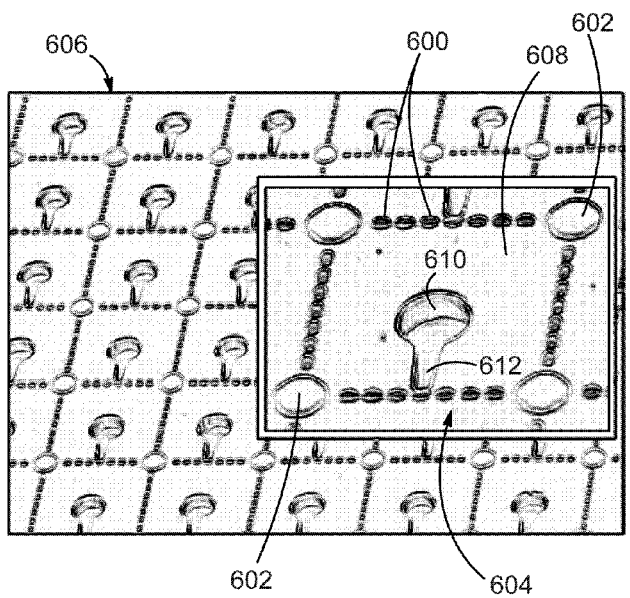
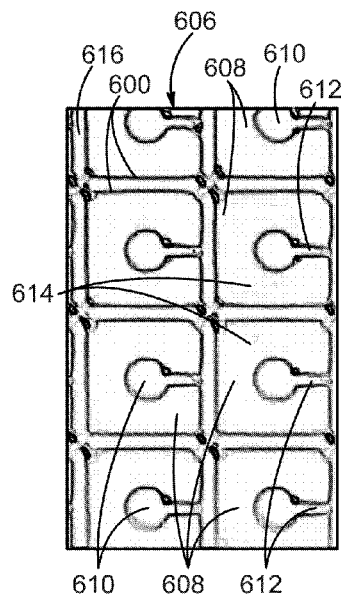
FIG. 21A  FIG. 21B
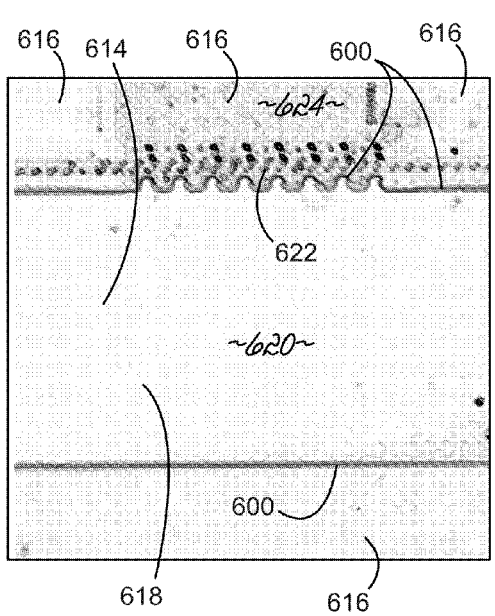
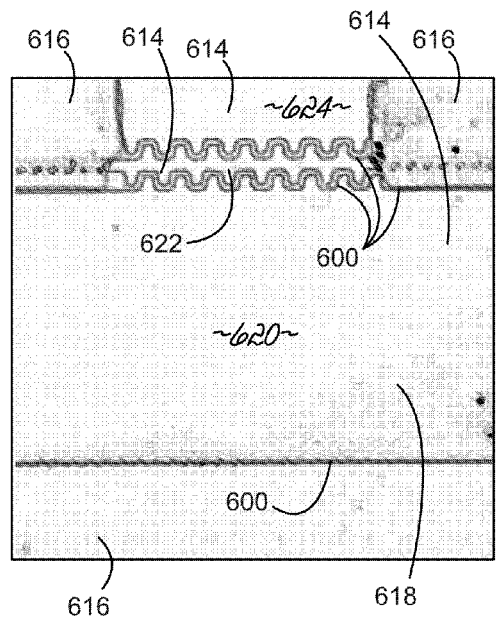
FIG. 22A  FIG. 22B

DISPLAY PIXELS, DISPLAYS, AND METHODS OF OPERATING DISPLAY PIXELS

CROSS-REFERENCE TO RELATED APPLICATIONS

This application claims the benefit of U.S. Provisional Application No. 61/234,070, filed Aug. 14, 2009, U.S. Provisional Application No. 61/234,099, filed Aug. 14, 2009, U.S. Provisional Application No. 61/307,637, filed Feb. 24, 2010, and U.S. Provisional Application No. 61/308,105, filed Feb. 25, 2010. This application is related to International Patent Application No. PCT/US10/45463, entitled ELECTROWETTING AND ELECTROFLUIDIC DEVICES WITH LAPLACE BARRIERS AND RELATED METHODS, and filed on even date herewith. The disclosure of each of these applications is hereby incorporated by reference herein in its entirety.

STATEMENT REGARDING FEDERALLY SPONSORED RESEARCH OR DEVELOPMENT

The U.S. Government has a paid-up license in this invention and the right, in limited circumstances, to require the patent owner to license others on reasonable terms as provided for by the terms of Grant No. 0729250 awarded by the National Science Foundation and the terms of Grant No. 0640964 awarded by the National Science Foundation.

BACKGROUND

The present invention relates to electrofluidic and electrowetting display pixels, electrofluidic and electrowetting displays, and methods of operating electrofluidic and electrowetting display pixels.

Electrowetting is a highly attractive modulation scheme for a variety of optical applications. For example, electrowetting has been used to provide optical switches for fiber optics, optical shutters or filters for cameras and guidance systems, optical pickup devices, optical waveguide materials, and video display pixels. Electrowetting has also found application in lab-on-chip devices, primarily in the form of digital droplet-driven flow.

Despite the numerous commercial applications and a large body of on-going research, nearly all conventional electrowetting-based devices require a constant application of voltage to hold a polar fluid in a particular geometry. These devices are not 'bistable,' that is to say, when the voltage is removed, the fluid is free to return to a spherical geometry along all non-confined fluid surfaces.

What is needed is an advanced electrowetting or electrofluidic display technology that is suited to more advanced control of colored polar fluid geometry and flow for display applications.

SUMMARY

In accordance with one illustrative embodiment of the invention, a display pixel includes a polar fluid and a non-polar fluid. The polar fluid and the non-polar fluid occupy a hydrophobic channel formed between first and second substrates. At least one of the polar fluid and the non-polar fluid is visible through at least one of the first and second substrates. The electrode with a dielectric layer separating the electrode from the fluids is electrically connected to a voltage source. This electrode and dielectric layer arrangement can cause the first polar fluid to advance or move within the hydrophobic channel. A Laplace barrier within the hydrophobic channel defines a fluid pathway that is open to the advancement of the polar fluid. The polar fluid moves to a first position within the hydrophobic channel by biasing the voltage source with a first voltage that is less than or equal to a threshold voltage. The first position provides a first display state. The polar fluid then moves to a second position within the hydrophobic channel when the voltage source is biased with a second voltage that is greater than the first voltage. The second position provides a second display state, which is typically different from the first display state.

The Laplace barrier may restrain the polar fluid at the first position when the electrode is biased with the first voltage. The Laplace barrier operates by reliance on Laplace pressure.

In another embodiment, a method is provided for fabricating a display pixel. The method includes patterning a spacer layer in a photoresist layer on a first substrate by photolithography. A separating layer is laminated onto the spacer layer and the first substrate, where the separating layer is a dry film photoresist. The method further includes patterning the separating layer to form a reservoir and a fluid via coupled to the reservoir by photolithography. A second substrate is positioned onto the separating layer of the first substrate to form the hydrophobic channel between the separating layer and the second substrate.

In another embodiment, a method is provided for operating a display pixel. The method includes moving a polar fluid to a first position within the electrofluidic pixel and displacing a non-polar fluid within the electrofluidic pixel to provide a first display state. The method further includes moving the polar fluid from the first position to a second position within the electrofluidic pixel and further displacing the non-polar fluid within the electrofluidic pixel to provide a second display state. The polar fluid is restrained at the first position by a Laplace barrier to maintain the first display state.

The embodiments of the invention provide an advanced electrowetting or electrofluidic display technology that is suited to more advanced control of colored polar fluid geometry and flow for display applications. The improved control and flow result in dramatically improved display performance.

BRIEF DESCRIPTION OF THE DRAWINGS

The accompanying drawings, which are incorporated in and constitute a part of this specification, illustrate embodiments of the invention and, together with a general description of the invention given above and the detailed description given below, serve to explain the principles of the invention.

FIGS. 4A, 4C, and 4E are diagrammatic cross-sectional views of a device in accordance with another embodiment of the invention.

FIGS. 4B, 4D, and 4F are top views of the device shown in FIGS. 4A, 4C, and 4E, respectively.

FIG. 7A is a diagrammatic cross-sectional view of a device with passive matrix electrodes in accordance with another embodiment of the invention.

FIG. 8A is a diagrammatic cross-sectional view of a device with active matrix electrodes in accordance with another embodiment of the invention.

FIGS. 10A, 11A, and 12A are diagrammatic cross-sectional views of devices in accordance with various embodiments of the invention.

FIGS. 13A and 13C are diagrammatic cross-sectional views illustrating successive steps of an embodiment of operating a device according to another embodiment of the invention.

FIGS. 17A, 17C, 17E, 17G, and 17I are diagrammatic cross-sectional views illustrating successive steps of an embodiment of operating a device according to another embodiment of the invention.

FIGS. 17B, 17D, 17F, 17H, and 17J are top views of the devices shown in FIGS. 17A, 17C, 17E, 17G, and 17I, respectively.

FIGS. 18A and 18C are diagrammatic cross-sectional views illustrating successive steps of an embodiment of operating a device according to another embodiment of the invention.

FIGS. 18B and 18D are top views of the devices shown in FIGS. 18A and 18C.

FIGS. 21A-23D are scanning electron microscope and optical microscope images of various examples of one or more embodiments of the present invention.

DETAILED DESCRIPTION

Figure 1A:
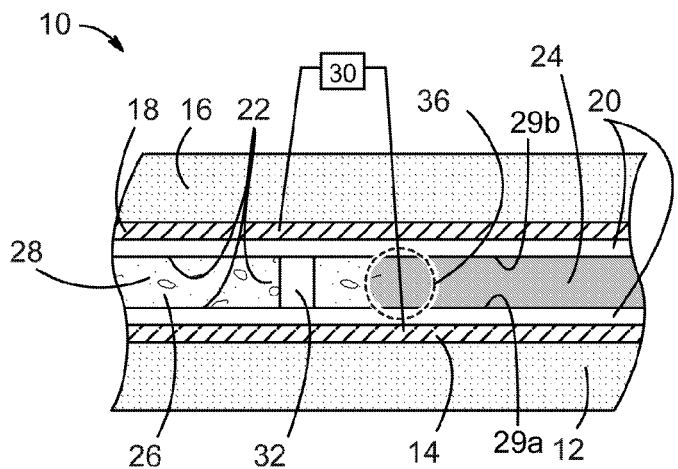
FIG. 1A is a diagrammatic cross-sectional view of a device consistent with one embodiment of the invention.

Although the invention will be described in connection with certain embodiments, the description of the embodiments is intended to cover all alternatives, modifications, and equivalent arrangements as may be included within the spirit of the present invention. In particular, those of ordinary skill in the art will recognize that the components of the various electrofluidic devices described herein could be arranged in multiple different ways.

An electromechanical force on a conductive polar fluid that is adjacent to an electrically insulated electrode underlies the physical mechanism for at least one embodiment of the present invention. This electromechanical force originates near a line of contact between the conductive polar fluid and a dielectric that insulates the electrode. The electromechanical force is proportional to electrical capacitance times the square of the bias potential, or applied voltage. The electromechanical force is generally oriented such that it is directed outward from an exposed surface of the polar fluid. When the polar fluid is confined within a cavity or channel, this electromechanical force can also be interpreted as a force per unit area or a pressure. This arrangement provides high-speed operation (on the order of milliseconds), low power capacitive operation (about 10 mJ/m$^2$), and excellent reversibility. However, alternative embodiments of the present invention include other fluid manipulation methods that are well-known by those of ordinary skill in the art of microfluidics. These alternate methods include, but are not limited to, electrowetting without insulators, syringe-pumps, thermocapillary, photo-responsive molecules such as spiropyrans, dielectrophoresis, electrophoresis, and micro-electro-mechanical pumping. Various embodiments of Laplace barriers that are described herein will work equally well with alternate mechanisms of fluid manipulation and transport. In some embodiments, the Laplace barriers may be referred to as a partial fluid barrier or a porous fluid barrier.

A Cartesian coordinate system will be used to define specific directions and orientations. References to terms such as 'above,' 'upper,' 'below,' and 'lower' are for convenience of description only and represent only one possible frame of reference for describing a particular embodiment. The dimensions of the devices described herein cover a wide range of sizes from nanometers-to-meters based on the application. Terms such as visible will be used in some cases to describe a person or machine vision system or other optical source or detector that is facing towards an upper surface of the embodiments described herein. Several of the diagrams will contain a 'side view' and a 'top view', the 'top view' being the direction normal to a substrate surface, usually a viewable surface of the substrate, and in some cases in the direction of the viewer or observer of the device. These top view diagrams can be partial device cross-sections in order to show the arrangement of only a particular sub-set of features and should not always be considered as the actual top view appearance of the device features.

The color systems and devices described herein are also equally useful for reflective, transmissive, and transflective displays. Therefore light can transmit through or reflect from the upper surface, the lower surface, or both surfaces of the devices. Devices can operate in dual mode transmissive/reflective at the same time, or switch between such modes of operation on demand. Backlights or other light sources used in conventional displays are also fully compatible with the devices described herein and are included within the spirit of the present invention.

Light may be provided by a source that is positioned internal to the devices such as a backlight or frontlight, by waveguide or other optics, or by the ambient surroundings such as sunlight or conventional light fixtures. Any means of coupling a light source is applicable, including all techniques known by those skilled in the art of displays.

The term fluid is used herein to describe any material or combination of materials that is neither solid nor plasma in its physical state. A gas may also be considered as a fluid so long as the gas moves freely according to the principles of the present invention. Solid materials, such as fluid powders, can also be considered a fluid if the solid materials move freely according to the principles of the present invention. The term fluid is not confining to any particular composition, viscosity, or surface tension. Fluids may also contain any weight percent of a solid material so long as that solid material is stably dispersed in the fluid. Fluids may also contain mixtures of multiple fluids, dispersants, resins, biocides, and other additives used in commercial fluids with demanding optical, temperature, electrical, fouling, or other performance specifications.

Examples of polar fluids include water, propylene glycol, and ethylene glycol. Examples of non-polar fluids include alkenes and silicone oils. Examples of gases include argon, carbon dioxide, and nitrogen. If more than one fluid is used that contains distinct solid particles or dissolved constituents, then it is preferred that the fluid be polar if particles or constituents are to be kept separated.

Non-polar fluids often penetrate small defects or situate against non-planar geometric structures. Therefore, mixing can occur with repeated movement of the non-polar fluids over a common device area. Polar fluids, in some cases, never touch solid surfaces. For instance in the case where the non-polar fluid forms a thin film between the polar fluid and solid surface.

Solid materials described herein serve multiple purposes.

Pigments and dyes in many cases are solid particles that can be dispersed or dissolved in fluids to alter at least one optical or spectral property of the fluid.

Substrates can be glass, plastic, metal foils, paper, or a variety of other materials that support construction of the devices described herein.

Spacers can be made of solid materials that are similar to the solid materials used in constructing the substrates. In some cases, the spacers can be part of the substrate itself, such spacers being formed by etching, laser processing, microreplication, or other technique. Spacers can also be formed from optically curable epoxies or photoresists, such as MICROCHEM SU-8 or DUPONT Per-MX.

Electrodes can be constructed from a transparent solid material such as $In_2O_3$:$SnO_2$ or PEDOT:PSS, a reflective solid material such as aluminum (Al), or colored solid material such as carbon black, so long as the electrode material provides suitable electrical conductance. Voltage sources can be direct voltage sources from a power source or a locally generated voltage or current sources, such as thin-film transistors. Numerous direct, alternating, or other types of voltage sources are known to those skilled in the art of displays or microfluidics are applicable.

Dielectrics can include any solid material which provides suitable electrical insulation and, for example, can be inorganic such as silicon nitride (SiN), organic such as Parylene C, or fluorinated such as Parylene F, mixtures thereof, layers thereof, and combinations thereof. Dielectrics thicknesses can range from 10's nm to 10's μm resulting in operating voltages between 1 V and 120 V, respectively. Solid surfaces or films may be inherently hydrophobic, or provided with an order of hydrophobicity by addition of a film or coating, by plasma treatment, by molecular mono-layer treatment, or other means. Fluoropolymers such as CYTONIX Fluoropel and ASAHI Cytop provide exemplary hydrophobicity. Additional solid materials, which are not hydrophobic to the polar fluid such as water in a gas, may still be hydrophobic if the gas is replaced with a non-polar fluid that has surface tension that is similar to the solid material.

Generally, the term hydrophobic is used herein to describe a Young's wetting angle of >90°, and the term hydrophilic is used herein to describe a Young's wetting angle of <90°. However, hydrophobic or hydrophilic functionality may extend beyond these limits in certain devices or material configurations. Super hydrophobic coatings are those exhibiting a large Young's angle for a polar liquid in a gas and are achieved by geometrically texturing a surface.

Voltage sources can be direct voltage sources from a power source, locally generated voltage, or current sources such as thin-film transistors. Numerous direct, alternating, or other types of voltage sources known to those skilled in the art of displays or microfluidics are applicable. Voltage sources may be biased by 0V, a positive DC voltage, a negative DC voltage, or AC voltage or other as appropriate.

Reflector materials may include metal films, layers with different refractive indices including multilayer dielectrics, particle filled polymers or fluids where the particles differ in refractive index from the polymer or fluid, one- or multi-dimensional photonic crystals, or other reflectors that are known by those skilled in the art of optics and displays.

Scattering mediums include polymers or fluids having particles disperse therein and where the particles differ in refractive index from the polymer or fluid, structured polymers or metals, microreplicated optics, or other scattering features that are know by those skilled in the art of optics and displays.

Black matrix and color filters are any solid or fluid material that absorbs part of or the entire spectrum of light in reflection or transmission modes.

Unless otherwise noted, the terms concave and convex refer to the geometry associated with the smallest radius of curvature along an exposed meniscus of a fluid. It is understood that other larger radii of curvatures on a meniscus can be oppositely concave or convex, but have a weaker influence on the Laplace pressure of the meniscus. These additional radii are often not shown in the figures, but are readily understood in terms of their weaker influence on device design and operation.

The term channel or hydrophobic channel will be used to describe physical confinement of a fluid that is horizontally larger than it is vertical in dimension, and which in some embodiments of the present invention will provide a means to visibly display a fluid. The channel is generally defined or bounded by one or more walls, typically of a fabricated patterned substrate.

The term reservoir can be any feature formed as part of a device, or is external to the device, including any feature that can store or hold a fluid until it is ready to be moved inside, or into, a device. Reservoirs may also be simple inlet/outlet ports or vias that may or may not be connected to additional devices, chambers, or channels.

The term duct will be used to describe a feature which provides a pathway for fluid flow and, like the reservoir, can be integrated inside of device, or in some cases could be external to the device as well.

Fluids may be dosed into devices of the present invention using one of several methods. The polar fluid can be emulsed with the non-polar fluid and then physically, chemically, or optically separated from one another after the device is completed. The polar fluid can be vacuum dosed into the reservoir, non-polar fluid added, and the device sealed. The non-polar fluid can be dosed into a reservoir, the polar fluid added, and the device sealed. The polar fluid can be electrowetted into an area by application of voltage between the polar fluid and an electrode. Numerous alternatives and combinations of dosing combinations are included within the spirit of the present invention.

The above description provides examples of materials and components for embodiments of the invention; however, the description of any particular one embodiment is intended to cover all alternative materials, components, and arrangements known by those skilled in the arts of optics, displays, microfluidics, electrowetting, electrofluidics, microfabrication, electronics, and related disciplines.

With reference now to FIGS. 1A-1D and in accordance with an embodiment of the invention, an electrofluidic device 10 is shown and includes a bottom or first substrate 12 and a first electrode 14 on the first substrate, a top or second substrate 16, and a second electrode 18 on the second substrate 16. The electrodes 14, 18 are further coated with a dielectric 20. The surface of the dielectric 20 is hydrophobic by virtue of a hydrophobic coating 22. A polar fluid 24 and a non-polar fluid 26 are within a channel 28 bounded by walls 29a, 29b of the two substrates 12, 16 or the fabricated layers thereon. A voltage source 30 is electrically coupled with the two electrodes 14, 18.

By virtue of the electrodes 14, 18 the voltage source 30 is electrically insulated and capacitively coupled to the polar fluid 24. Alternate conducting and insulating electrode arrangements are possible as well known by those skilled in the art of electrowetting. As an appropriate voltage is applied, the contact angle for the polar fluid 24 will be reduced from Young's angle ($\theta_Y$) to the electrowetted contact angle ($\theta_V$). This contact angle reduction is due to electromechanical force generated by the voltage-applied electrowetting effect.

The diagrams of FIGS. 1A-1C do not show a full device structure, which will be shown and described below with reference to FIG. 4. Rather, FIGS. 1A-1C have the purpose of only describing the basic physics governing a Laplace barrier, generally. As a first approximation, the electrowetting effect can be predicted according to:

$$\cos\theta_V = (\gamma_{od} - \gamma_{pd})/\gamma_{po} + CV^2/2\gamma_{po},$$

where C is capacitance per unit area of the dielectric 20; γ is the interfacial surface tension between the polar fluid 24 (p), the non-polar fluid 26 (o), and the dielectric 20 (d); and V is the applied DC voltage or AC RMS voltage applied by the voltage source 30. The cosine of $\theta_Y$ is predicted by $(\gamma_{od}-\gamma_{pd})/\gamma_{po}$. When the non-polar fluid 26 is an oil, a polar fluid 24 such as water or a glycol can exhibit $\theta_Y > 160°$. The $\theta_V$ can be as small as 30° to 60°. The Young's angle is not changed during electrowetting, except for microscopic changes. Yet for simplicity in diagramming herein, the $\theta_V$ will be drawn without such consideration.

With further reference to FIG. 1A, a large Young's angle and therefore a convex meniscus for the polar fluid 24 is apparent. This convex meniscus has a radius of curvature that leads to a Laplace pressure according to:

$$\Delta p = \gamma_{po}(1/R_1 + 1/R_2),$$

which includes the principle radii of curvature for the menisci of the polar fluid 24 ($R_1$, $R_2$).

The electrofluidic device 10 includes functionalities that are not possible with conventional device structures. Specifically, the electrofluidic device 10 includes a Laplace barrier, illustrated herein as one or more hydrophobically coated spacers 32, which create two or more passageways 34 on the sides of, or between, the spacers 32. The passageways 34 collectively define the fluid pathway for the advancement of the polar fluid 24 within the channel 28. Under appropriate operating conditions, explained in detail below, the polar fluid 24 can flow through the channel 28 and through the spacers 32 as though the spacers 32 were absent, i.e., as though the only forces acting on the polar fluid 24 are due to the channel configuration.

Figure 1B:
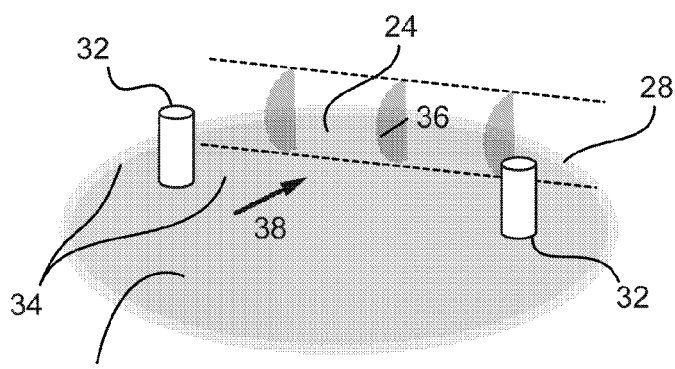
FIG. 1B is a perspective view of a portion of the device shown in FIG. 1A.
Figure 1C:
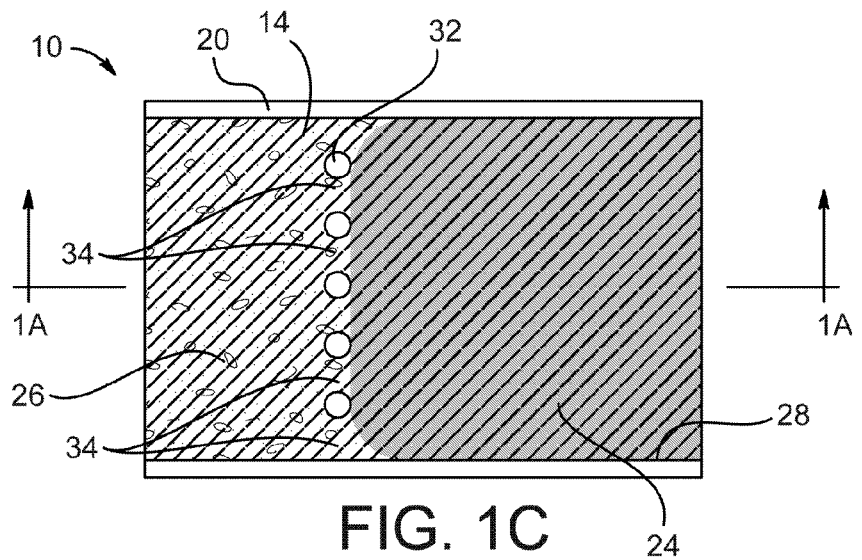
FIG. 1C is a top view of the device shown in FIG. 1A.

In FIGS. 1A-1C, no voltage is supplied from the voltage source 30 and the polar fluid 24 has a small and convex vertical radius of curvature 36. As a result, the polar fluid 24 experiences a net pressure 38 that will not allow it to move forward, or which can cause it to retract from the shown portion of the electrofluidic device 10.

Figure 1D:
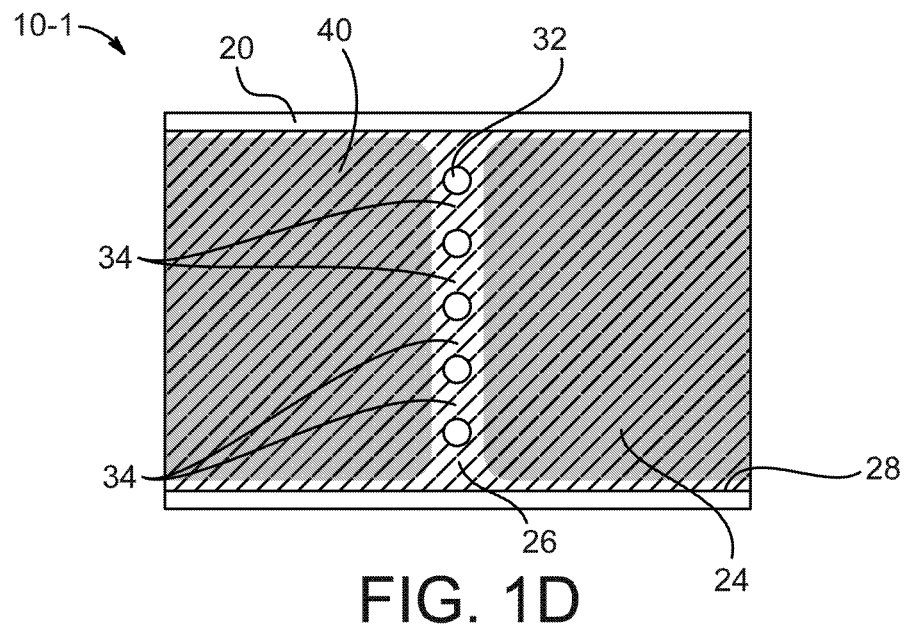
FIG. 1D is a top view of an alternate embodiment of the device of FIG. 1 containing a second polar fluid.
Figure 1E:
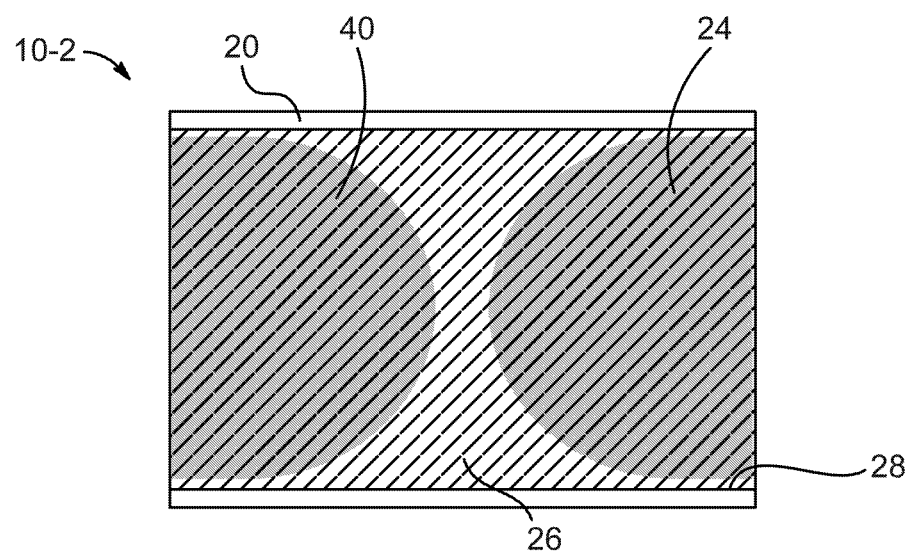
FIG. 1E is a top view of a conventional device containing two polar fluids.

FIG. 1D illustrates another alternative of the electrofluidic device 10-1, which is similar to the device of FIG. 1A but further includes a second polar fluid 40. As can be seen, the first and second polar fluids 24, 40, bordering the spacers 32, can lie in close, adjacent proximity and without merging. Accordingly, the device 10-1 can provide increased surface area coverage as compared with a conventional device 10-2 (FIG. 1E) that lacks the Laplace barrier.

Figure 2A:
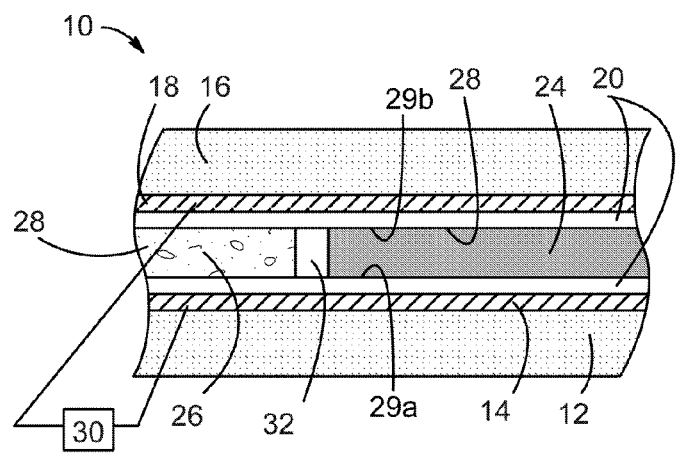
FIG. 2A is a diagrammatic cross-sectional view of the device that is similar to FIG. 1A, but for an application of a voltage that advances the first polar fluid according to one embodiment of the invention.
Figure 2B:
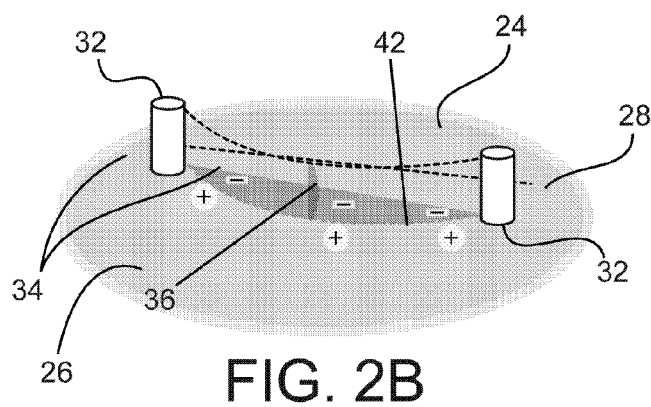
FIG. 2B is a perspective view of a portion of the device shown in FIG. 2A.
Figure 2C:
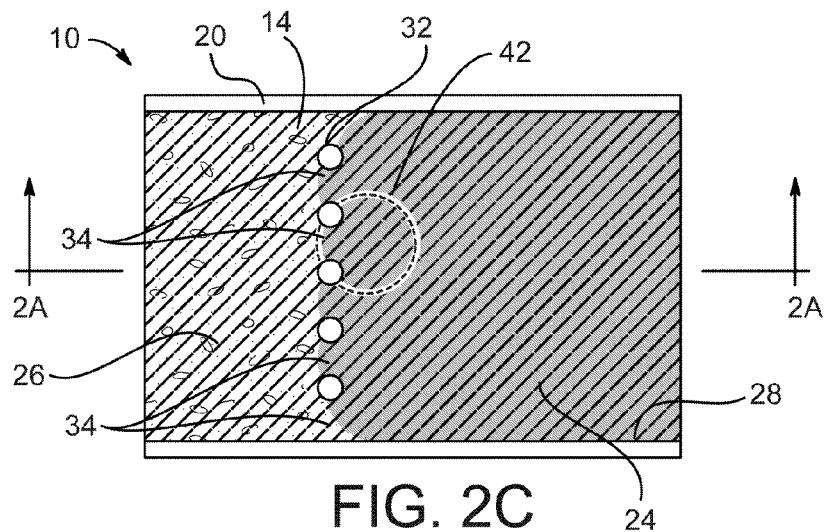
FIG. 2C is a top view of the device shown in FIG. 2A.

Shown in FIGS. 2A-2C, the voltage source 30 provides a first voltage (+V) to the first and second electrodes 14, 18 that is sufficient to invert the vertical radius of curvature 36 to concave, where the first voltage is less than a threshold voltage. This will cause the polar fluid 24 to advance toward the spacers 32 (indicated by "+" and "−" indicia representing the electrical charge causing the electromechanical pressure on the polar fluid 24) in the channel 28. However, when the polar fluid 24 reaches the row of spacers 32, the spacers 32 act as a porous fluid barrier (i.e., the Laplace barrier) by imparting a second and horizontal radius of curvature 42 on the meniscus of the polar fluid 24. The polar fluid 24 will therefore equalize at zero net pressure, which is the point in FIGS. 2A-2C where the radii of curvatures 36 and 42 are equal. This is one localized example for radii of curvatures 36 and 42 and other thresholds can be realized in alternate embodiments of the present invention. Not shown, but as could be envisioned, if the polar fluid 24 were to try to move any further forward, then the horizontal radius of curvature 42 would reduce, which is energetically unfavored for the device 10 presented in FIGS. 1A-3C.

Figure 3A:
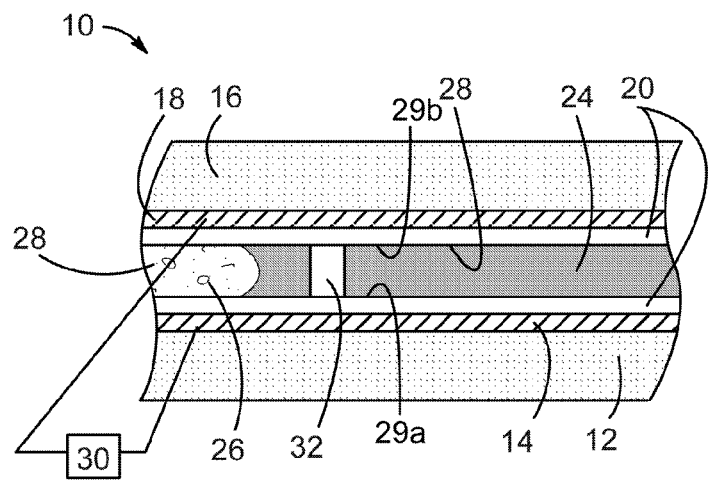
FIG. 3A is a diagrammatic cross-sectional view of the device that is similar to FIG. 2A, but for an application of a second voltage that further advances the first polar fluid.
Figure 3B:
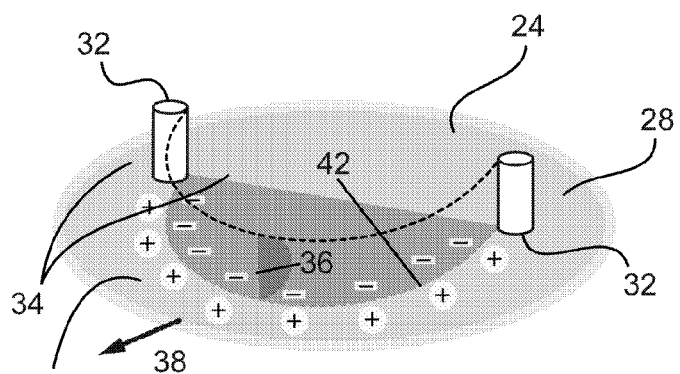
FIG. 3B is a perspective view of a portion of the device shown in FIG. 3A.
Figure 3C:
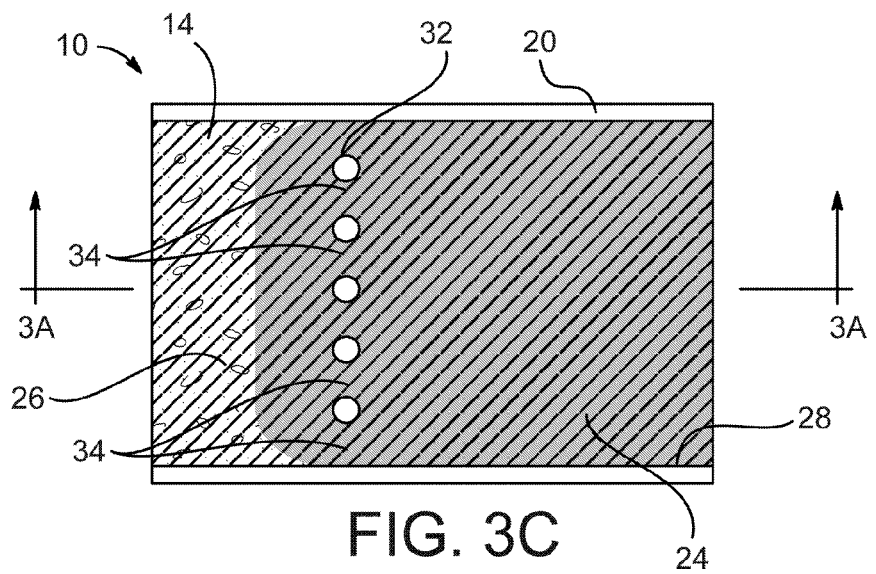
FIG. 3C is a top view of the device shown in FIG. 3A.

Next, shown in FIGS. 3A-3C, the voltage source 30 can provide a second voltage (+V2) that is greater than the threshold voltage which reduces the vertical radius of curvature 36 to the point that the polar fluid 24 will move forward with a net-pressure 38 regardless of the horizontal radius of curvature 42. Said another way, when the voltage source 30 provides a second voltage level (+V2) that exceeds the threshold voltage, the polar fluid 24 is unrestrained by the spacers 32 and advances to a second position that is beyond the spacers 32. Absent factors such as drag forces and wetting hysteresis, theoretically the threshold for such forward movement of the polar fluid 24 is the point at which the vertical radius of curvature 36 is smaller than one-half the distance between the spacers 32, or one-half the width of the passageway 34, comprising the Laplace barrier. Once the polar fluid 24 is beyond the Laplace barrier it will exhibit little resistance or drag. For example, spacers 32 could be 5 μm in both height and diameter and separated with 50 μm between adjacent ones. As a result, about 90% of the cross-sectional area taken through the fluid passageway 34 and the spacers 32 is open to fluid flow.

This ease in flow is a major advantage over conventional techniques such as partial barriers, capillary barriers, or other microfluidic constrictions. Furthermore, embodiments of the present invention provide a unique approach because once the advancing edge of the polar fluid 24 moves beyond the Laplace barrier (here the spacers 32), the polar fluid 24 would rapidly regain a Laplace pressure that is similar to the Laplace pressure within the polar fluid 24 in the first position before the Laplace barrier. As a result, the polar fluid 24 would be capable of continuing to flow through the Laplace barrier, using the first (lower) voltage, and with an ease that is similar to that if no barrier were present in the channel 28. Furthermore, without the need for voltage application, the polar fluid 24 can reside as a single volume, but in multiple locations, on both sides of the Laplace barrier.

With reference now to FIGS. 4A-4F and in accordance with an embodiment of the present invention, an electrofluidic device 50 is described that can provide two or more locations of fluid positioning. The electrofluidic device 50 includes first and second substrates 12, 16. Shown, the first substrate 12 includes three separate and distinct electrodes 132, 134, 136 and a splitting electrode 138, which is described in greater detail below. A dielectric 140 covers the electrodes 132, 134, 136, 138, and a hydrophobic layer 142 covers the dielectric 140. The second substrate 16 includes an upper electrode 144 having the hydrophobic layer 142 thereon. A plurality of the spacers 32 are included within the channel 28 and surrounding the perimeter of the electrodes 132, 134, 136, 138, 144, and may be constructed in a manner that was described previously with reference to FIG. 3A. Shown, some of the spacers 145 may have a different shape as compared to those spacers 32 surrounding the perimeter.

The illustrative embodiment of FIG. 4A is able to provide two or more locations for fluid positioning. Shown in FIGS. 4A and 4B, four voltage sources 146, 148, 150, 152, provide voltage between the upper electrode 144 and each of the first, second, third, and splitting electrodes 132, 134, 136, 138, respectively. The upper electrode 144 is conductive with the polar fluid 24. As a result, the polar fluid 24 partially covers the first, second, third, and upper electrodes 132, 134, 136, 144.

As is also shown and unlike conventional devices, the polar fluid 24 surrounds all exposed surfaces of the spacers 32 when moving from one display state to another. Said another way, the spacers 32 are surrounded or encompassed by the polar fluid 24.

With reference to FIGS. 4C and 4D, the electrofluidic device 50 is shown with the voltage removed from the fourth voltage source 152 associated with the splitting electrode 138. When the voltage is removed from splitting electrode 138, the vertical radius of curvature (not shown) for the meniscus of the polar fluid 24 in the channel 28 above the splitting electrode 138 will be small and convex, which causes the polar fluid 24 to dewet from the channel 28 above the splitting electrode 138. This splits the polar fluid 24 into two volumes: one volume of polar fluid 24a occupying the channel 28 above the first electrodes 132 and one volume 24b occupying the channel 28 above the second electrode 134, wherein the first and second voltage sources 146, 148 are still supplying voltage to the first and second electrodes 132, 134. If the voltages from the first and second voltage sources 146, 148 are then removed from the first and second electrodes 132, 134, then the volumes of the polar fluid 24a, 24b will still reside in the position shown in FIGS. 4C and 4D because of the influence of the spacers 32 that surround the perimeter of the electrodes 132, 134, 136, 138, 144. This is because the horizontal radius of curvature 154 is greater than half the distance between adjacent spacers 32.

Next, shown in FIGS. 4E and 4F, the volume 24b (FIG. 4C) is moved from over the second electrode 134 to over the third electrode 136 by an application of voltage from the fourth voltage source 150. When the voltage is removed, the volume 24b is stabilized by the spacers 32.

Several other alternative embodiments are possible, but are not shown. For example, the two volumes 24a, 24b may be stabilized over the second and third electrodes 134, 136 without either volume touching or mixing with each other. The prevention of liquid mixing, merging, or touching is enhanced by the larger spacers 145 that form a wider Laplace barrier. The particular embodiment shown in FIGS. 4A-4F provides superior close positioning of the two volumes 24a, 24b. For example, if hexagonal-shaped liquids were packed immediately next to each other, then the horizontal space that could not be filled with polar fluid 24 would comprise two out of six hexagon sub-triangles or about 30% of a hexagon area. Squares can be packed with much higher density and are more compatible with most commonly used electrode formats. Such capability of packing two square shaped liquids immediately adjacent to each other, but also allowing for advancement of the polar fluid 24 from square-to-square, is uniquely enabled by the various embodiments of the Laplace barriers Laplace barriers, as specified herein, eliminate the requirement for round or hexagon-shaped containment of polar fluids.

Also, in another alternate arrangement, and starting with the case shown in FIGS. 4C and 4D, by applying a voltage to the splitting electrode 138 via the fourth voltage source 152, the volume 24b could rejoin the volume 24a. With voltage applied to second and third electrodes 134, 136, the single volume of the polar fluid 24 could then be moved over the second and third electrodes 134, 136 and be stabilized even as these voltages are removed. Therefore, a mechanism may be provided for stabilizing the polar fluids 24 adjacent to each other, or in union with each other, both instances with any desired fluid geometry as determined by the Laplace barriers.

In the event that one spacer 32 is improperly fabricated, a second or more adjacent row(s) of spacers 32 can be provided to ensure proper Laplace barrier function. Such improvements may improve device function or improve manufacturing yield.

The electrode and dielectric arrangements shown in FIGS. 4A-4F, and all other embodiments described herein, are also not limited to the specific dielectric and electrode placements illustrated in the figures. For example, the splitting electrode 138 and the related dielectric 140 could be carried by the second substrate 16. Any arrangement is possible so long as the electrodes and the Laplace barrier function according basic electrical and fluidic principles described herein.

With further reference to FIGS. 4A-4F, the Laplace barrier can be defined mathematically as follows. The volume of the polar fluid 24 is limited such that the smallest horizontal radius curvature for the polar liquid 24 is always greater than half the width of the passageways 34 (FIG. 1C) between adjacent spacers 32. This can also be specified as the polar fluid 24 having a maximum radius of curvature that is greater than a minimum radius of curvature imparted on the polar fluid 24 by the Laplace barrier. Generally, the width of the passageways 34 (FIG. 1C) between adjacent spacers 32 should always be greater than the product of the height of the spacers 32 and the cosine of the minimum contact angle achieved under the applied electromechanical force.

With further reference to FIGS. 4A-4F, and all other embodiments that will be covered herein, the polar fluid 24 must be able to traverse the space between adjacent electrodes 132, 138, 134, 136. Several mechanisms are possible, all included within the spirit of the present invention. As known by those skilled in the art of electrowetting lab-on-chip, electrode interdigitation is effective at bridging the gap between adjacent electrodes 132, 138, 134, 136. Because electric field dissipates with distance and does not abruptly terminate in an insulating medium, the electrodes 132, 138, 134, 136 can also be constructed very close to one another. In some cases, providing similar or opposite polarity voltages on the electrodes 132, 138, 134, 136 may prove helpful. In other cases, the spacers 32 forming the Laplace barrier can be partly misaligned relative to the space between electrodes 132, 138, 134, 136, or staggered to provide an alternate means of polar fluid interdigitation across the space between the electrodes 132, 138, 134, 136. The polar fluid 24 can also have a volume that at least partially protrudes over the space between electrodes 132, 138, 134, 136. Numerous combinations and arrangements thereof are possible and included within the spirit of the present invention.

With further reference to FIGS. 4A-4F, the Laplace barrier is depicted as geometrically straight. Although this may be preferred for some embodiments, the Laplace barriers may also take on shapes that are more natural for the polar fluid 24 or more natural during the advancement of polar fluid 24 due to an electromechanical force. This, for example, may allow the Laplace barriers and polar fluid 24 to encounter each other simultaneously at most or all possible locations.

With reference now to FIGS. 5A-5D, electrofluidic devices according to various other embodiments of the present invention are shown utilizing alternate Laplace barriers. Generally, the devices include first and second substrates 12, 16 with the first substrate 12 having first and second electrodes 162, 164 thereon. A dielectric 166 covers the electrodes 162, 164. The second substrate 16 includes an upper electrode 168 and the dielectric 166 covering the upper electrode 168. A first voltage source 170 couples the first and upper electrodes 162, 168; a second voltage source 172 couples the second and upper electrodes 164, 168.

Figure 5A:
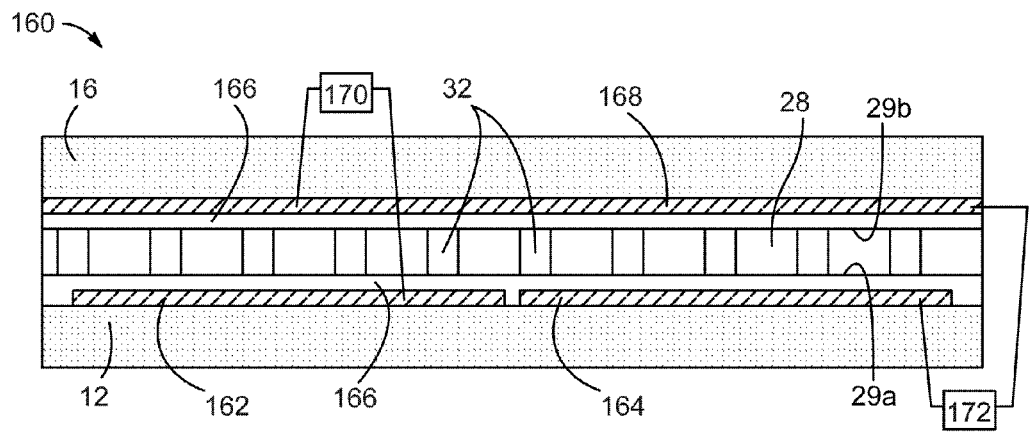
FIGS. 5A-5D are diagrammatic views of devices in accordance with additional embodiments of the present invention.

Shown in FIG. 5A, the spacers 32, which are constructed in a manner that is similar to those of FIG. 4A, can be arranged in a two-dimensional array, such as a square or hexagonal pattern of spacers 32. The only change in the method by which the device 160 functions is that the threshold voltage magnitude necessary to move the polar fluid 24 (FIG. 1A) past the spacers 32 is the same voltage magnitude required to maintain the polar fluid 24 moving forward and covering the electrodes 162, 164. The three advantages of this approach are as follows: (1) the functionality is similar to the device 50 of FIG. 4A, but can be achieved without the need to precisely align the spacers 32 along the perimeters of the electrodes 162, 164; (2) the polar fluid 24 (FIG. 1A) could be stabilized at multiple intermediate positions between and covering the electrodes 162, 164; and (3) the separation between the spacers 32 need not be uniform. For example, though not shown, if the spacers 32 of FIG. 5A are positioned closer together over the left side of the first electrode 162 than the spacers 32 over the right side of the first electrode 162, then when the polar fluid 24 (FIG. 1A) is moved from the second electrode 164 to the first electrode 162 the final position of the polar fluid 24 (FIG. 3A) could be selectable based on the magnitude of the voltage applied from the first voltage source 170 to the first electrode 162. It would, therefore, require more voltage to move through the portion of the channel 28 having spacers 32 with less separation.

Unlike conventional electrowetting devices, device 160 of FIG. 5A has spacers 32 that can provide such adaptive and robust influence over the movement and stabilization of the polar fluid 24 (FIG. 1A) with minimal displacement of the volume of the polar fluid 24 (FIG. 1A). For example, the spacers 32 could be 5 µm in both height and diameter and separated with 50 µm separation between adjacent ones of the spacers 32 positioned in a square array. The net effect is equivalent to having one larger spacer with a cross-sectional area of $\pi \times 2.5$ µm$^2$ (about 20 µm$^2$) inside a square unit device or pixel having a cross-sectional area of 50×50 µm (2500 µm$^2$); or stated another way, the cross-sectional area occupied by the one spacer 32 would be less than 1% of the total horizontal, cross-sectional area of the pixel. This is an advantage for situations when the particular fluid are to be displayed visually or where the fluids are to be moved with maximum speed and volume. This also advantageously makes more efficient use of space than the conventional electrofluidic devices. Because the spacers 32 are often required to regulate the gap between the first and second substrates 12, 16, these spacers 32 can be simultaneously fabricated using a single photolithographic mask step. The spacers 32 can create the Laplace barrier with very little additional drag or resistance to fluid flow. Unlike hydrophilic grids or spacers used in conventional electrowetting display designs, the spacers 32 do not substantially reduce electrowetting on one of two electrowetting plates by creating low electrical capacitance on the substrate on which the spacer 32 is placed.

Figure 5B:
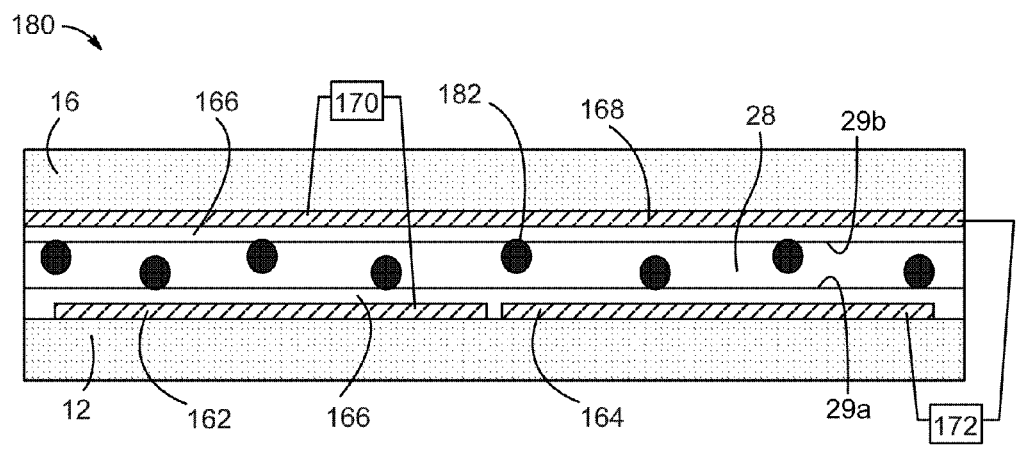

In the alternative embodiment of a device 180 shown in FIG. 5B, a wire or plastic mesh 182 replaces the spacers 32 of FIG. 5A as the Laplace barrier. The mesh 182 is electrically conductive and coated with a very thin fluoropolymer, then the mesh 182 can also act as a localized electrical ground for the polar fluid 24 (FIG. 1A). The mesh 182 can be woven, fused, or other types of porous textiles or sheets, with the economical advantage that the mesh, textile, or sheet need simply be positioned between the first and second substrates 12, 16.

Figure 5C:
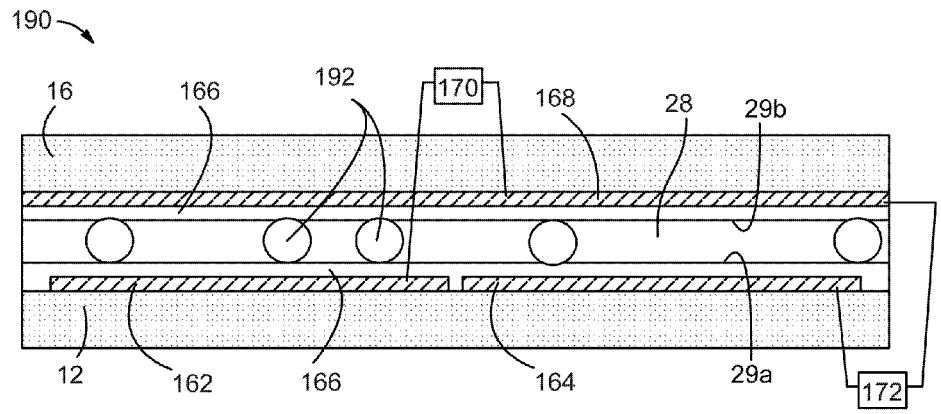

In yet another embodiment, the device 190, shown in FIG. 5C, includes spacer spheres 192 that are capable of acting as the Laplace barrier so long as they exhibit an average separation that permits fluid flow as described for the present invention.

Unlike the spacers 32 described for FIG. 5A, the plastic mesh 182 and the spacer spheres 192 of FIGS. 5B and 5C influence a radius of curvature for the polar fluid 24 (FIG. 1A) that transverses and encompasses any acute angle for the plane of radius of curvature. Said another way, the reduced radius of curvature of the polar fluid meniscus caused by the Laplace barrier can be in a plane that is angled with respect to the vertical plane.

Figure 5D:
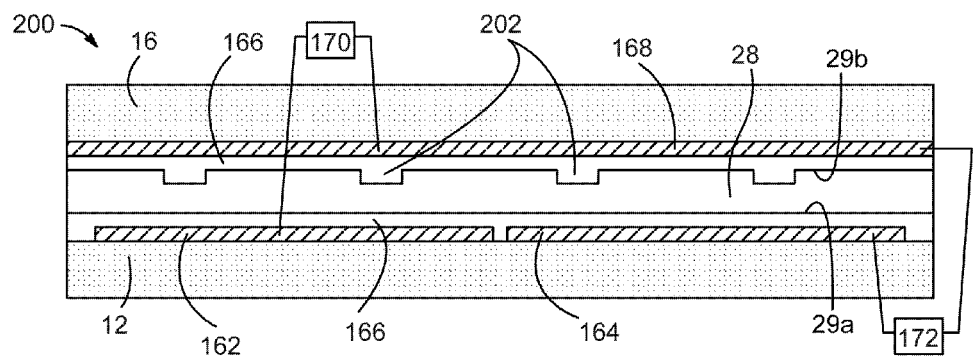

In another embodiment, shown in FIG. 5D, the Laplace barrier of the device 200 is comprised of one or more projections or ridges 202 having a height that is less than the height of the channel 28. In this case, the ridges 202 would not act as an actual physical spacer between the substrates 12, 16, but would still function as the Laplace barrier. Because the ridges 202 are shorter in height than the channel 28, less separation between ridges 202 while maintaining a similar Laplace barrier property may promote more rapid re-merging of the polar fluid 24 after traveling through the ridges 202, in some cases, the polar fluid 24 never split at all. Generally, to promote non-splitting of the polar fluid 24 (FIG. 1A) as it moves past the ridges 202, the Laplace pressure should favor forward movement over top of the ridges 202 as compared to the spacers 32 (FIG. 5A), which in some cases requires that the distance between the second substrate 16 and the top of the ridge 202 to be greater than the diameter of the ridge 202. While the term ridge 202 may seem to connote a particular shape, the ridges 202 are not so limited. Instead, the ridges 202 may include any physical structure that extends into, but not entirely traversing, the channel 28, including ridges having a height greater than its width or diameter and thus shaped in a manner similar to a post.

The specific examples shown in FIGS. 5A-5D do not form a limiting set. Rather, the examples shown in FIGS. 5A-5D illustrate that multiple variations and embodiments of Laplace barriers are included within the spirit of the present invention. Additional Laplace barriers can be partially, or fully, comprised of local changes in surface energy, surface roughness, contact angle hysteresis, and/or the height of the channel between the two substrates. For example, a grid of ridges on one or more of the substrates can provide the Laplace barrier functionality. In addition, devices with Laplace barriers can also make use of partial or porous fluid barriers, such as locally missing portions of electrodes, or locally increased dielectric thickness, that locally decrease electromechanical pressure on a polar fluid.

With further reference to FIGS. 5A-5C, and other embodiments of the present invention, the second substrate 16 need not carry an electrode, nor is there need for a ground wire (not shown) or other electrical coupling in the channel 28. Instead, co-planar electrodes are well known to those skilled in the art of electrowetting and are included within the spirit of the present invention. One of ordinary skill in the art would readily understand how to implement co-planar electrodes in any one of the embodiments of the invention.

With reference to FIGS. 6A-6D, an electrofluidic device 206 according to another embodiment of the present invention is described. The device 206 includes the first and second substrates 12, 16. A dielectric 208 is formed as a block on the first substrate 12 defines a channel portion 210 while the remaining portion of the first substrate 12 forms a reservoir 212 with the second substrate 16. The dielectric 208 includes a lower electrode 214 and a splitting electrode 216 and where the splitting electrode 216 is formed near the fluid pathway into the channel portion 210 or substantially adjacent to the reservoir 212. The second substrate 16 includes an upper electrode 218 and the dielectric 208 covering the upper electrode 218. A first voltage source 220 electrically couples the lower and upper electrodes 214, 218 with the polar fluid 24. A second voltage source 222 couples the splitting electrode 216 and the polar fluid 24. Shown, the splitting electrode 216 thus provides a means to introduce the polar fluid 24 from the hydrophobic reservoir 212 and into the channel portion 210.

Figure 6A:
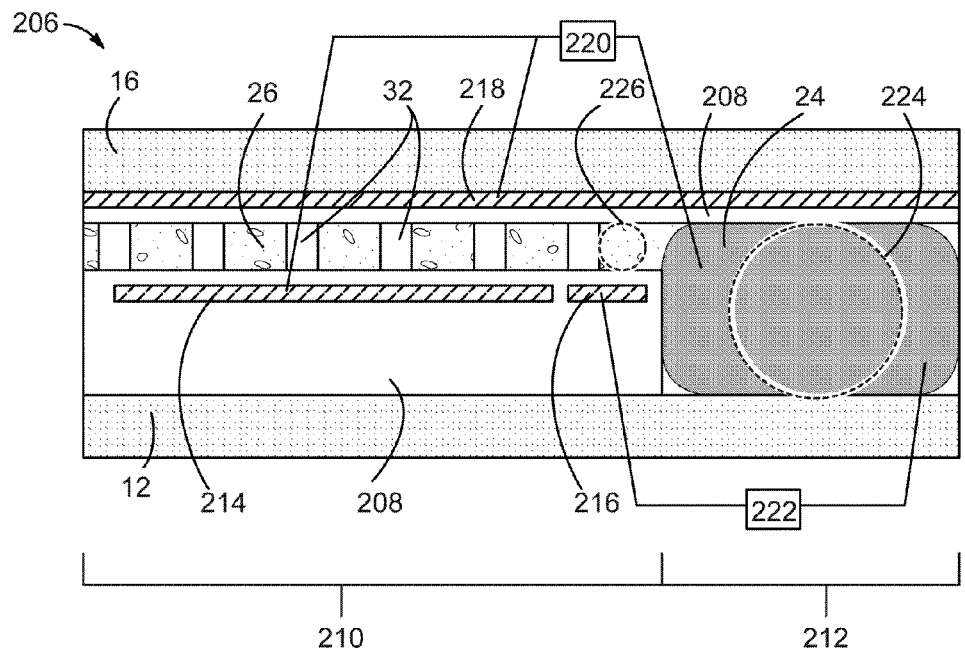
FIGS. 6A-6D are diagrammatic cross-sectional views illustrating successive steps of an embodiment of operating a device according to another embodiment of the invention.

With no voltage supplied from either of the first or second voltage sources 220, 222 shown in FIG. 6A, the polar fluid 24 will favor occupation of the hydrophobic reservoir 212 over a hydrophobic channel portion 210 because the hydrophobic reservoir 212 imparts a larger radius of curvature 224 on the polar fluid 24 than the smaller radius of curvature 226 in the channel portion 210. Shown in FIG. 6A, the radii of curvatures 224, 226 cause the polar fluid 24 to recoil into the hydrophobic reservoir 212 without applied voltage. However, according to the principles of the present invention, a mechanism for stabilizing the polar fluid 24 in the channel portion 210 is needed. Furthermore, once the polar fluid 24 is stabilized in the channel portion 210, it must be allowed to return to the hydrophobic reservoir 212 with appropriate electrical stimulus. Laplace barriers alone cannot achieve the functionality described above because the Laplace barrier is only functional on a polar fluid 24 that is advancing, i.e., not for retracting the polar fluid 24. For this reason, the splitting electrode 216 of electrofluidic device 206 of FIGS. 6A-6D is constructed as to be adjacent to the hydrophobic reservoir 212 and at least one spacer 32.

Figure 6B:
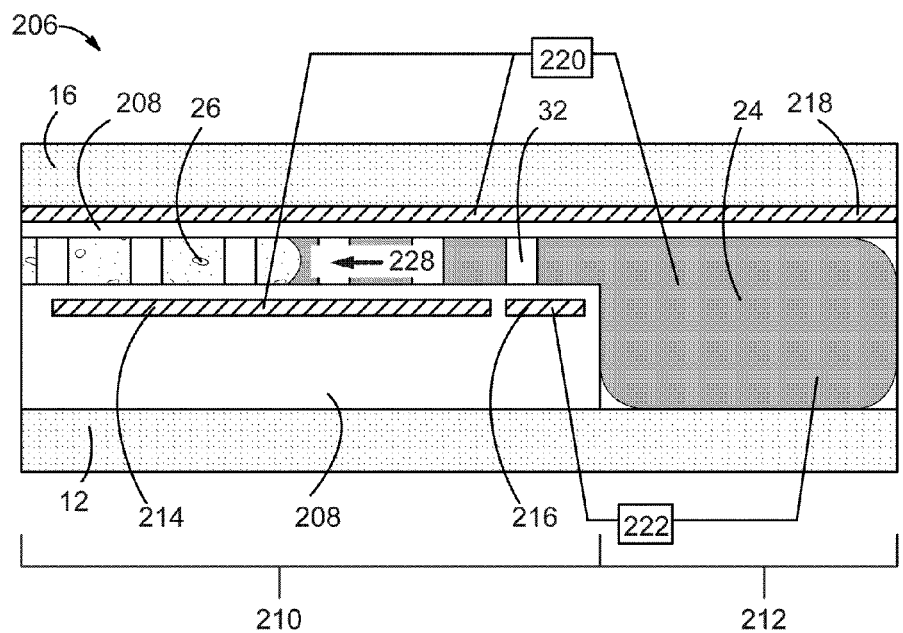
Figure 6C:
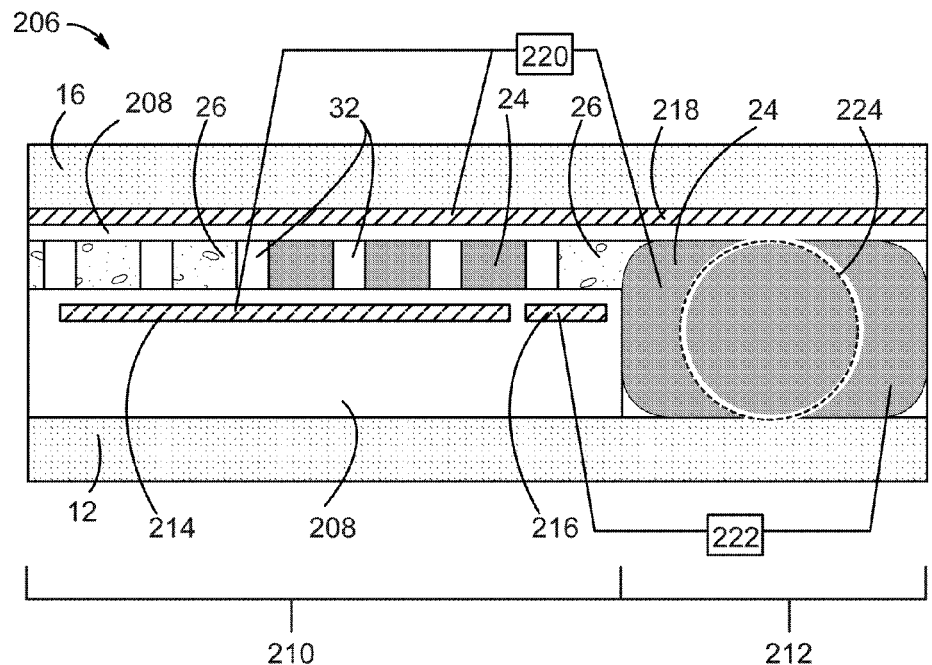
Figure 6D:
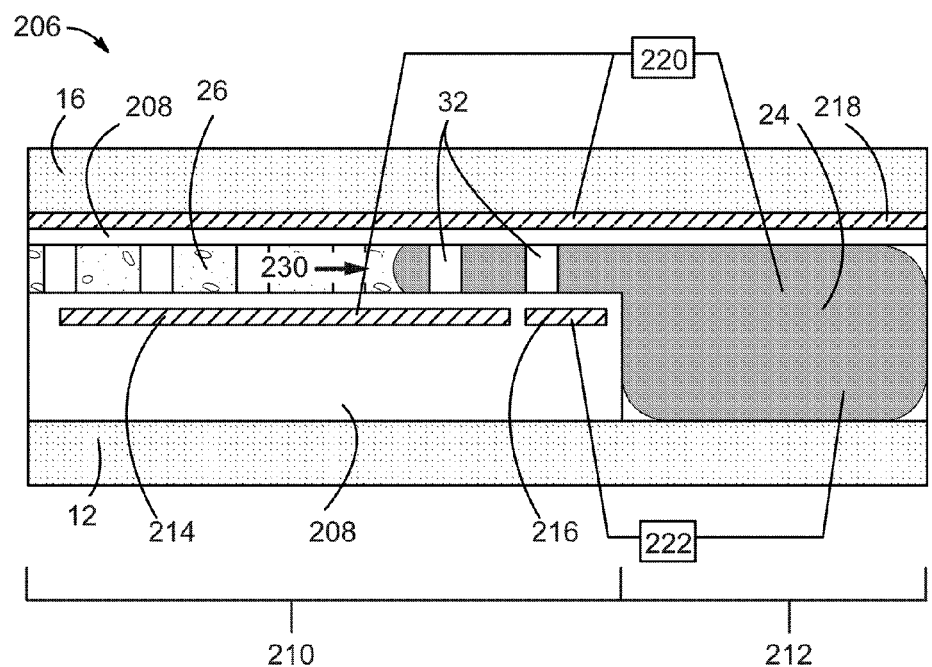

Shown in FIG. 6B, both the first and second voltage sources 220, 222 supply a voltage to the polar fluid 24 and the electrodes 214, 216, 218. As a result, a net pressure 228 is created that is sufficient to advance the polar fluid 24 into the channel portion 210 and through the spacers 32. To stop or reduce fluid advancement, the voltage applied from the first electrode 214 is reduced or stopped.

To hold the polar fluid 24 in a given or desired position, the voltage applied by the second voltage source 222 is removed or reduced on the splitting electrode 216. Accordingly, the polar fluid 24 dewets the area above splitting electrode 216. The voltage supplied from the first voltage source 220 to the lower electrode 214 can also be removed and the polar fluid 24 will then be stabilized, shown in FIG. 6C.

There are three features achieved by the device 206 of FIGS. 6A-6D: (1) a bistable mechanism is achieved for moving the polar fluid 24 into the channel portion 210 from the hydrophobic reservoir 212; (2) the amount of polar fluid 24 within the channel portion 210 can vary based on time or the voltage supplied from the voltage sources 220, 222; and (3) the Laplace barriers (shown as spacers 32) stabilize the polar fluid 24 such that it is always adjacent to the splitting electrode 216. As a result of this third advantage, when a voltage is again applied by the second voltage source 222 to the splitting electrode 216, shown in FIG. 6D, the polar fluid 24 can then be retracted back into the reservoir 212. At the end of the process, the voltage supplied by the second voltage source 222 to the splitting electrode 216 can be removed such that the polar fluid 24 returns to the positions illustrated in FIG. 6A.

Several mechanisms are possible for improving fluid communication between adjacent electrodes, all included within the spirit of the present invention. As known by those skilled in the art of electrowetting lab-on-chip, electrode interdigitation is effective at bridging the gap between adjacent electrodes. Because electric fields dissipate with distance and do not abruptly terminate in an insulating medium, electrodes can also be constructed to be very close to one another. In some cases, providing similar or opposite polarity voltages on the adjacent electrodes may prove helpful. In other cases, the Laplace barrier can be partly misaligned relative to the space between electrodes or staggered to provide an alternate means of polar fluid interdigitation across the space between the electrodes. The polar fluid can also have a volume that at least partially protrudes over the space between electrodes. Numerous combinations and arrangements thereof are possible and included within the spirit of the present invention.

The mechanism for pulling the polar fluid 24 into the channel portion 210 from the reservoir 212, shown in FIGS. 6A-6D, requires electrowetting onto both the first and second substrates 12, 16. Though not specifically shown, a single electrode and electrowetting surface can also be utilized to pull the polar fluid 24 into the channel portion 210. If the spacers 32 included an electrode encased by a dielectric material, then the separation between adjacent ones of the spacers could be reduced and the spacers could electrowet and ratchet the polar fluid 24 into the channel portion 210 from the hydrophobic reservoir 212

With further reference to FIGS. 6A-D, the device 206 with the Laplace barrier can provide a mechanism for grayscale resets. As described previously, when the electrodes 214, 216, 218 are biased at the first voltage up to the threshold voltage, the Laplace barrier can advance the polar fluid 24 to the Laplace barrier but not beyond it. Therefore, the device 206 may provide precise grayscale values that depend on the number of Laplace barriers included within the device 206. Accordingly, a more precise mechanism for grayscale placement of the polar fluid 24 at two or more locations is provided. It will be appreciated that a more precise mechanism is provided for the placement of the polar fluid 24 between Laplace barriers, as the polar fluid 24 is moved to the Laplace barrier and then moved a distance away from the Laplace barrier (for example, as a position that is between two adjacent Laplace barriers). This functionality can be referred to as a grayscale reset state, which avoids grayscale accumulation error over multiple switches between two or more grayscale states (i.e., positions of the polar fluid 24). Grayscale resets are visually preferred because conventionally grayscale resets had required resetting the polar fluid 24 to full filling of the channel portion 210 or the reservoir 212, which would cause an observable flicker in an information display each time the grayscale state is changed.

Figure 7B:
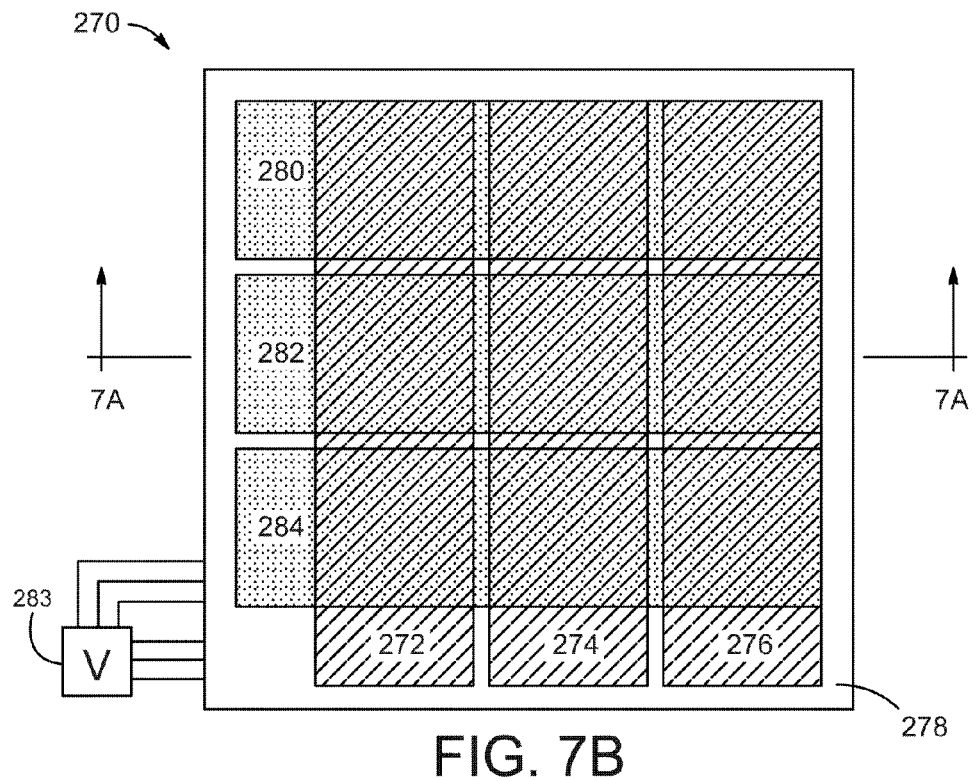
FIG. 7B is a top view of the device shown in FIG. 7A.

With reference now to FIGS. 7A and 7B, an electrofluidic device 270 according to another embodiment of the present invention is shown. Again, the electrofluidic device 270 includes first and second substrates 12, 16 forming the channel 28 there between. The first substrate 12 includes three lower electrodes 272, 274, 276 and a dielectric 278 covering the first substrate 12 and the electrodes 272, 274, 276. The second substrate 16 includes three upper electrodes 280, 282, 284 with the dielectric 278 thereon. The upper electrodes 280, 282, 284 are positioned to be orthogonal to the lower electrodes 272, 274, 276 of the first substrate 12 so as to form a grid-like pattern of rows (the upper electrodes 280, 282, 284 of the second substrate 16) and columns (the lower electrodes 272, 274, 276 of the first substrate 12), shown in FIG. 7B. This arrangement of upper and lower electrodes 272, 274, 276, 280, 282, 284 creates a so-called passive matrix electrode operable to move the polar fluid 24 (FIG. 3A) between multiple locations. While one of ordinary skill in the art would readily understand the implementation of passive matrix electrodes, the device 270 has been illustrated as having a generic voltage source 283 representing a different voltage source that is electrically coupled to a separate one of the upper and lower electrodes 272, 274, 276, 280, 282, 284.

The electrofluidic device 270 moves the polar fluid 24 (FIG. 1A) horizontally between multiple locations to switch the polar fluid 24 (FIG. 1A) in a bistable pixel between two visibly different states. For example, if the polar fluid 24 (FIG. 1A) were to simultaneously cover more than one row or column electrode, then capacitance coupling between the covered electrode, through the polar fluid 24 (FIG. 1A) could complicate the drive scheme. Accordingly, the wire mesh 182, acting as the Laplace barrier if metallic, can function as an electrical grounding electrode for the polar fluid 24 (FIG. 1A) at all locations. Then, the wire mesh 182 can be designed such that electrowetting on the first and second substrates 12, 16 must be provided simultaneously to advance the polar fluid 24 (FIG. 1A) through the wire mesh 182. As a result, the polar fluid 24 (FIG. 1A) will only move toward an adjacent row and/or column electrode that is provided with an appropriate voltage. This aspect of this embodiment of the present invention provides a simple means for passive matrix electrical control of polar fluid movement.

Similarly, conventional electrowetting displays may include passive-matrix techniques to switch polar fluid in a bistable pixel between two visibly different states. However, capacitance coupling between multiple electrodes and polar fluids can degrade passive matrix operation in such conventional electrowetting displays.

Figure 8B:
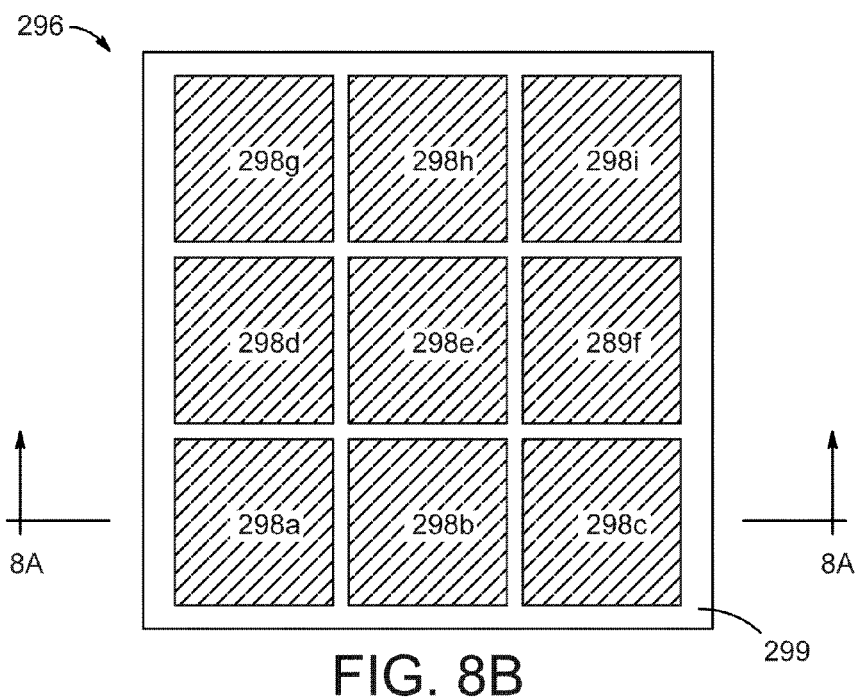
FIG. 8B is a top view of the device shown in FIG. 8A.

With reference to FIGS. 8A and 8B, an electrofluidic device 296 according to yet another embodiment of the present invention may be described. The electrofluidic device 296 is constructed with an active matrix electrode scheme, i.e., the first substrate 12 includes a plurality of electrodes 298n (where n ranges from a to h in the illustrative embodiment) arranged in a matrix-like pattern and covered by a dielectric 299. The second substrate 16 includes a grounding electrode 300 thereon and cooperates with the first substrate 12 to form the channel 28 there between for containing the polar fluid 24 and non-polar fluid 26 (FIG. 1A). The active electrode scheme can move the polar fluid 24 (FIG. 1A) between multiple locations that are defined by each of the electrodes 298n. A thin-film transistor 302n for each electrode 298n provides local voltage control of each of the electrodes 298n and thus controls electrowetting of the polar fluid 24 (FIG. 1A) onto that electrode 298n. Alternately, the thin-film transistors 302n can provide voltage directly to the polar fluid 24 (FIG. 1A). In either case, as the polar fluid 24 (FIG. 1A) moves between the electrode 298n, the electrical capacitance between the polar fluid 24 (FIG. 1A) and the electrode 298n varies. In active matrix drive, discharging the capacitance between the polar fluid 24 (FIG. 1A) and the electrode 298n is easily achieved even if the capacitance is variable. However, building up the capacitance between the polar fluid 24 (FIG. 1A) and the electrode 298n to advance the polar fluid 24 (FIG. 1A) over the electrode 298n presents a challenge because the capacitance between the electrode 298n and the polar fluid 24 (FIG. 1A) increases as the polar fluid 24 (FIG. 1A) advances above that electrode 298n. During a typical write-time in active matrix drive, the polar fluid 24 (FIG. 1A) advances too slowly over the electrode 298n to allow the capacitance to maximize. As a result, multiple row voltage write cycles for the thin-film transistor 298n are required to complete polar fluid movement. Therefore, arrangements of storage capacitors, or arrangements of multiple thin-film transistors 302n may be preferred to promote rapid movement of the polar fluid 24 (FIG. 1A). A variety of such electrical drive schemes are well-known by those skilled in the art of active matrix displays and included within the spirit of the present invention.

Figure 9:
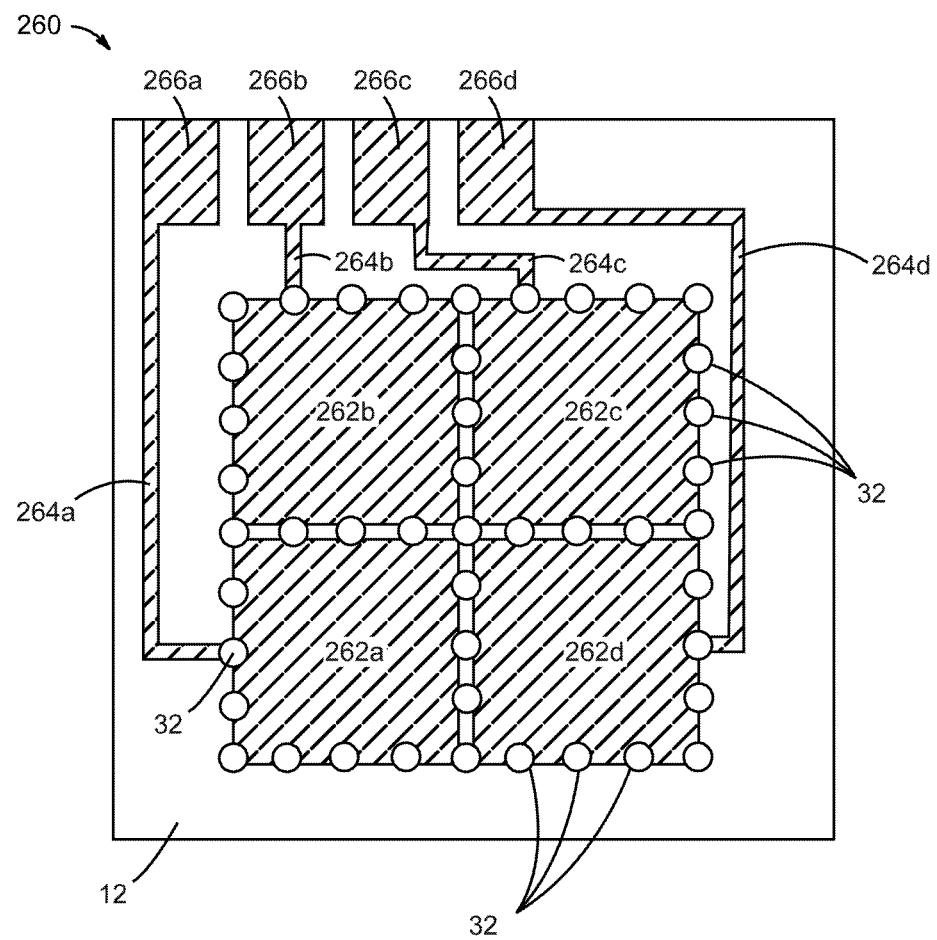
FIG. 9 is a top view of a device according to another embodiment of the invention.

With reference to FIG. 9, yet another electrofluidic device 260 according to an embodiment of the present invention is described. The first substrate 12 is shown and includes segmented electrodes 262a, 262b, 262c, 262d (collectively 262n) in the representative form of square electrode pads, to move the polar fluid 24 (FIG. 1A) over two or more of the segmented electrodes 262n. The second substrate 16 (FIG. 1A) would be included to form the channel 28 with the first substrate 12; however, the second substrate 16 (FIG. 1A) is not shown for simplicity in this cross-section through the channel 28. Generally, the segmented electrode layout requires a plurality of electrode lines 264a, 264b, 264c, 264d (collectively 264n) to electrode pads 266a, 266b, 266c, 266d at the edge of the first substrate 12. Alternatively, though not shown, an electrode via may extend through the first substrate 12 in a manner that is similar to that used in printed circuit boards. In the representative embodiment, the electrode lines 264n terminate near the first substrate edge and are respectively connected with the electrodes 262n, in a one-to-one fashion. For the case where the electrodes 262n are all carried on the same substrate, spacers 32 may be placed at each location where the electrode line 264n connects with the respective segmented electrode 262n. This structure prevents the polar fluid 24 (FIG. 1A) from being electromechanically and prematurely pulled onto the electrode line 264n. An alternate approach, though not specifically shown, is to implement an electrode line that is horizontally narrow, such that the effective electrode line area is insufficient to pull polar fluid 24 (FIG. 1A) onto the electrode line.

Figure 10B:
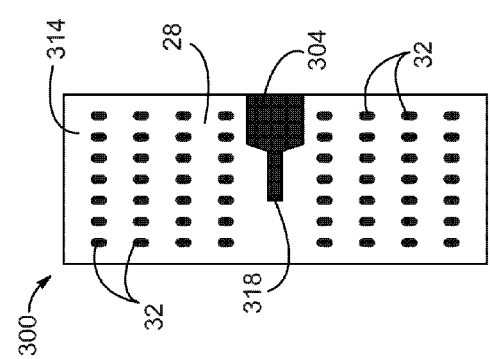
FIGS. 10B, 11B, and 12B are top views of the devices shown in FIGS. 10A, 11A, and 12A, respectively.

With reference to FIGS. 10A and 10B, a device 300 in accordance with another embodiment of the invention is shown for utilizing one or more of the capabilities described for FIGS. 1A-9. The device 300 includes first and second substrates 12, 16, which can be constructed from rigid materials, like glass, or non-rigid materials that are attached to a rigid carrier during fabrication. Non-rigid materials may be flexible or rollable, such as a plastic. The first substrate 12 includes a dielectric 302 having a reservoir 304 extending therein. An optically absorbing base material 306, such as carbon black or Perylene black pigment is fabricated on the bottom surface of the reservoir 304 for reducing reflection from those portions of the device 300 that cannot be covered by the fluids 24, 26, and thereby increasing pixel contrast. Specific to FIG. 10A, the base material 306 can also be used to increase pixel contrast by reducing the reflection from the polar fluid 24 (FIG. 1A) while it resides in the reservoir 304.

To achieve maximum resolution for patterning of features, it may be preferred to fabricate all structures, except the reservoir, onto the second substrates 16, including the spacers 32. Shown, the spacer 32 are constructed from or coated with carbon black or Perylene black pigment. The structures carried by the first substrate 12, i.e., the reservoir 304, the dielectric 302, and the base material 306, could be fabricated using a single lithography mask step, because these structures share a complimentary geometry in the horizontal plane.

The device 300 also includes one or more voltage sources 308, illustrated in FIG. 10A as a thin-film transistor, but could alternatively be a multiple thin-film transistors forming a small switching circuit and/or a storage capacitor, as are well known by those skilled in the art displays. The voltage source 308 includes an electrode 310 that is capable of maintaining an electrical connection between the voltage source 308 and at least a portion of the polar fluid 24 (FIG. 1A) for all positions of the polar fluid 24 (FIG. 1A) within the channel 28. To maintain the electrical connection between the electrode 310 and the polar fluid 24, the electrode 310 may be more hydrophilic than other surfaces found in the device 300 either inherently or through the addition of a coating that is hydrophilic.

Because the transistor is not transparent and the first substrate 12 can be constructed from a transparent material, the viewpoint 311 is from the vantage point such that the polar fluid 24 (FIG. 1A) and/or the non-polar fluid 26 (FIG. 1A) within the channel 28 are viewed through the first substrate 12.

The first substrate 12 may further include an electrode 312 that is enclosed by a dielectric 314. The second substrate 16 may also include an electrode 316 that is also enclosed by the dielectric 314. The channel 28 formed between the first and second substrates 12, 16 includes at least one Laplace barrier therein, which is specifically shown here as a plurality of spacers 32.

Referring still to both FIGS. 10A and 10B, the reservoir 304 is connected to a duct 318 that provides a pathway for the non-polar fluid 26 to enter the reservoir 304 when the polar fluid 24 moves from the reservoir 304 and into the channel 28. The duct 318 causes the reservoir 304 to be non-symmetrical in geometry, which aids in initiating the flow of the polar fluid 24 from the reservoir 304 into the channel 28.

Figure 11B:
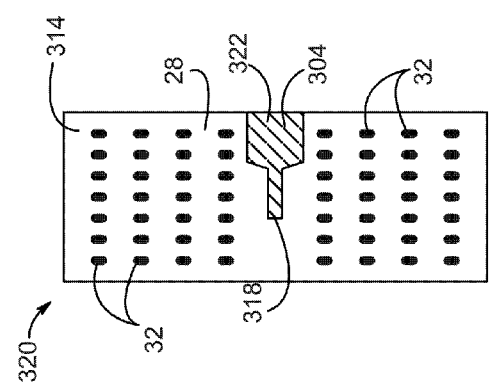
Figure 13B:
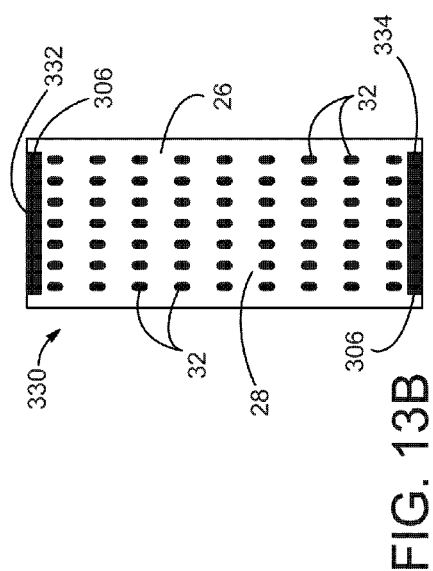
FIGS. 13B and 13D are top views of the devices shown in FIGS. 13A and 13C, respectively.
Figure 13D:
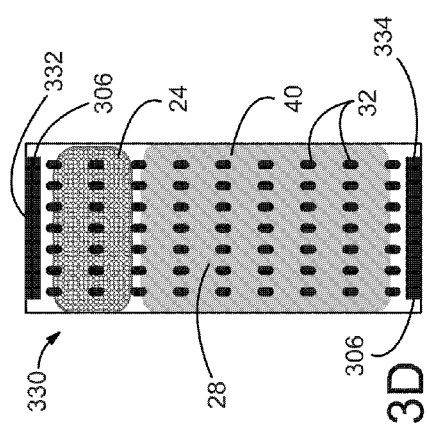

FIGS. 11A and 11B illustrate a device 320 that is similar to the construction of the device 300 in FIG. 10A and in accordance with an embodiment of the invention. The voltage source 321 of the device 320 is fabricated on the bottom surface of the reservoir 304 and the associated electrode 322 is thus fabricated on the bottom surface and sidewalls of the reservoir 304. Accordingly, the viewpoint 311 is directed above the second substrate 16.

To achieve maximum resolution for patterning, the structures, up to and including the spacers 32, may be fabricated on the first substrate 12 up to and including the spacers 32. During assembly of the first substrate 12 with the second substrate 16, those structures fabricated on the second substrate 16, including up to the electrode 18 and associated dielectric 302, need not be aligned to the corresponding structures carried by the first substrate 12.

Turning now to FIGS. 12A-13D, a device 330 according to another embodiment of the invention is shown having first and second substrates 12, 16 with the dielectric 302 on the first substrate 12, as was described with reference to FIG. 10A. Unlike the device 300 of FIG. 10A, the device 330 includes two reservoirs 332, 334. Each of the reservoirs 332, 334 may be constructed in a manner that is similar to the reservoir 304 of FIG. 10A and each contains different polar fluids 24, 40 (FIG. 1A), each of the polar fluids 24, 40 (FIG. 1A) having differing optical properties when displayed in the channel 28 of the device 320 and viewed from the viewpoint 311. When multiple polar fluids are used within the device 330, or any other single device described herein, then more than one Laplace barrier may be used to individually and simultaneously restrict advancements of each polar fluid. As specifically shown in FIG. 13C and FIG. 13D, the Laplace barriers allow the two or more polar fluids 24, 40 to be positioned in close proximity and without merging. The Laplace barriers provide a means by which more than one polar fluid 24, 40 (FIG. 1A) is stabilized within the channel 28 and without risking the merging of the other polar fluid 40, 24 (FIG. 1A) that is the reservoir 332, 334. The Laplace barriers also achieve the above described functionality while stabilizing the polar fluids in the channel 28 with a viewable area, i.e., cross-sectional area covered, that is greater than the horizontally circular geometry that the polar fluids 24, 40 (FIG. 1A) would take on in a conventional device without the Laplace barriers. Efficient use of viewable space in the device 330 reduces the visual contrast of the display in all non-reflective portions in a reflective display application.

Figure 12B:
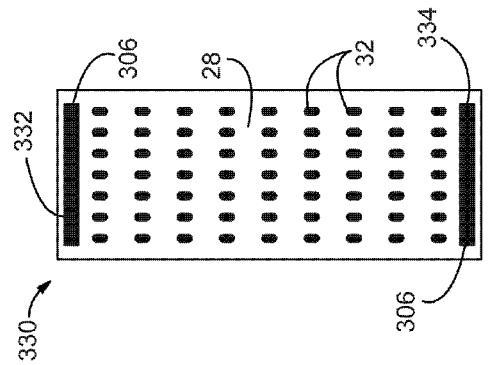
Figure 12A:
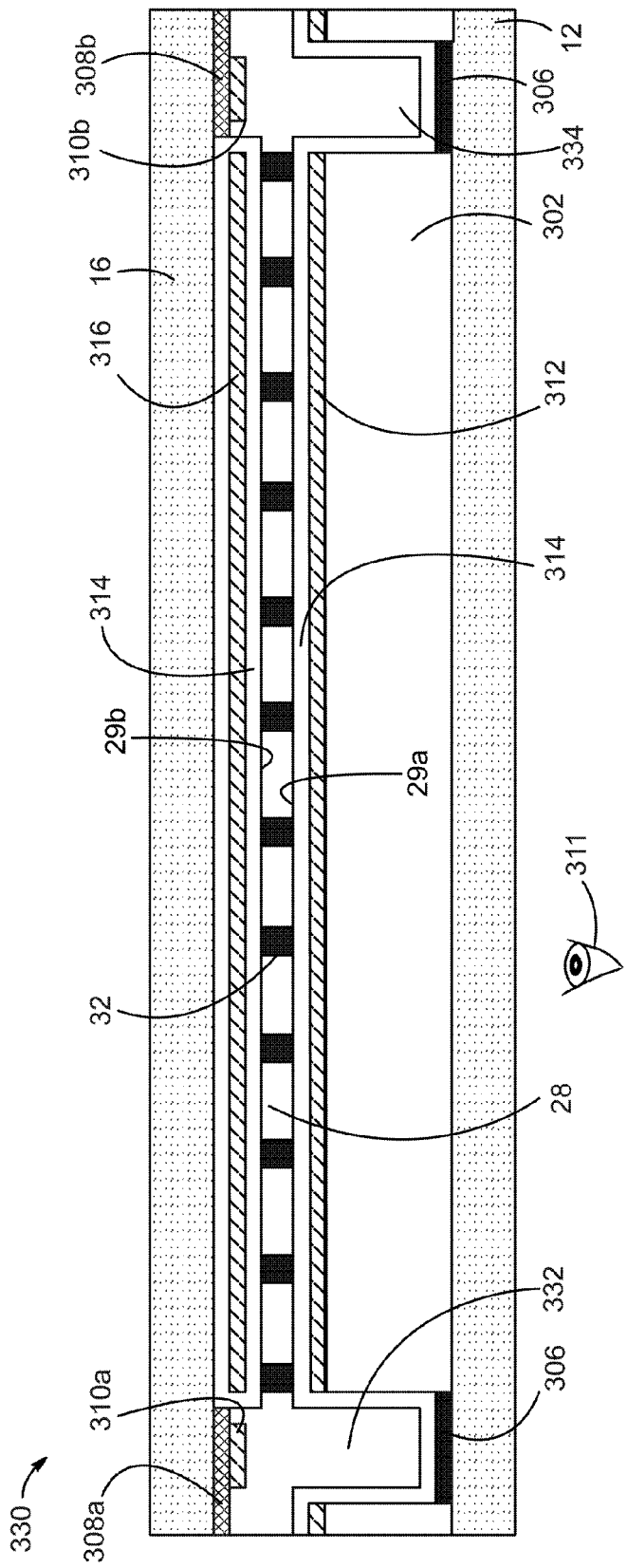

With reference to FIGS. 13A-13D and in accordance with an embodiment of the invention, splitting electrodes 340, 342 are added to the electrofluidic device of FIG. 12A. The illustrated first and second polar fluids 24, 40 have at least one differing optical property. The splitting electrodes 340, 342 provide functionality that is similar to that described for FIG. 6A. The spacers 32 within the channel 28 ensure that a portion of each of the polar fluids 24 when positioned within the channel 28 will always remain stabilized and adjacent to one of the splitting electrodes 340, 342 such that the polar fluids 24, 40 may be returned to the respective reservoir 332, 334. The spacers 32 also stabilize the different polar fluids 24, 40 within the channel 28 such that the splitting electrodes 340, 342 can split one of the polar fluids 24, 40 into two volumes within the channel 28 and reservoirs 332, 334. This mechanism for splitting the polar fluid 24, 40 into two distinct, smaller volumes has advantage over splitting in conventional lab-on-a-chip electrowetting devices where volumes must be similar or equal. The Laplace barriers allow the split volumes of the polar fluids 24, 40 to be different and repeatable.

With further reference to FIGS. 13A-D, using the principles described for FIGS. 1A-12B, video and bistable modes of operating the device 330 are shown in a stepwise manner.

During video mode, the splitting electrodes 340, 342 are biased such that at least one of the polar fluids 24, 40 can reside within the channel 28 and near the splitting electrode 340, 342. As a result, one of the polar fluids 24, 40 can be moved between the channel 28 and the respective reservoir 332, 334 with video speed (i.e., 10 s of Hz) as described with reference to FIGS. 6A-6D.

During bistable mode, the splitting electrodes 340, 342 are biased with the proper voltage, or no voltage, such that one or both of the polar fluids 24, 40 within the channel 28 is split from the volume within the respective reservoirs 332, 334. As a result, the positions of the polar fluids 24, 40 remain stable in the channel 28 without any voltage applied to any of the electrodes in the device 330. In fact, in a display device comprised of two or more pixels having structures similar to the devices 330, the display can be switched between video and bistable mode using only a single voltage source attached to all splitting electrodes 340, 342.

Although not shown in FIGS. 13A-13D, once one or both of the polar fluids 24, 40 is stabilized within the channel 28, the polar fluid 24, 40 can also be moved using principles similar to that described above. Multiple combinations of the various devices and embodiments presented herein exist, and the present invention is not limited to the functionality illustrated by specific figures.

A passive matrix drive scheme may also be implemented in the devices described with reference to FIGS. 6A, 12A and 13A. While this description will specifically be directed to the device 206 of FIG. 6A, the implementation of the principles to the device 330 of FIGS. 12A and 13A would be readily understood.

Assuming a display comprised of an array of the devices 206 shown in FIG. 6A, each of the devices 206 located at the intersection of a row and a column electrode matrix. Each device 206 forms a pixel, a segment, a subpixel, or other visually useful feature. In a first passive matrix drive scheme, the splitting electrode 216 is the row electrode; the upper electrode 218 is the column electrode, and the lower electrode 214 is shared by all pixels. The lower electrode 214 can be provided with a voltage that permits polar fluid 24 to advance into the channel 28 or retract into the reservoir 212. The polar fluid 24 is also provided with a common electrical connection at all devices 206 to electrically ground the device 206 and prevent capacitive coupling of voltage to the polar fluid 24. As a result, the devices 206 can be addressed one row at a time, using the row electrode 216 to connect the polar fluid 24 in the channel 210 and reservoir 212, and the column electrode 218 to control whether polar fluid 70 moves into the channel 210 or the reservoir 212. Additional drive schemes are possible, one could use any of the electrodes 214, 216, 218 and possibly an additional column electrode (not shown) connected capacitively or conductively to the polar fluid 24 to create a passive matrix frame that first allows movement of polar fluid 24 into the channel 210 followed by an alternate frame that allows movement of polar fluid 24 to the reservoir 212. Numerous passive matrix drive schemes for the present invention are possible, enabled by use of Laplace barriers, the splitting electrode 216, and two or more electrodes per device 206.

With reference to FIGS. 14A-16B and in accordance with yet another embodiment of the invention, a single pixel 360 is shown, which may be joined with additional pixels to form a large array of pixels, i.e., the display device. Each pixel 360 is driven by active matrix addressing techniques, but for simplicity, only a single pixel 360 is shown. The pixel 360 has four channel regions 362a, 362b, 362c, 362d (collectively 362n) formed between the first and second substrates 12, 16 (second substrate 16 is not shown in the cross-sectional figures), where the first substrate 12 includes four independent electrodes 364a, 364b, 364c, 364d (collectively, 364n) driven by voltage sources, generically shown as voltage source 365. It would be readily appreciated that while only four channel regions 362n and four electrodes 364n are shown, any number of channel regions with only one or even more than four electrodes in the channel may be possible.

Figure 14B:
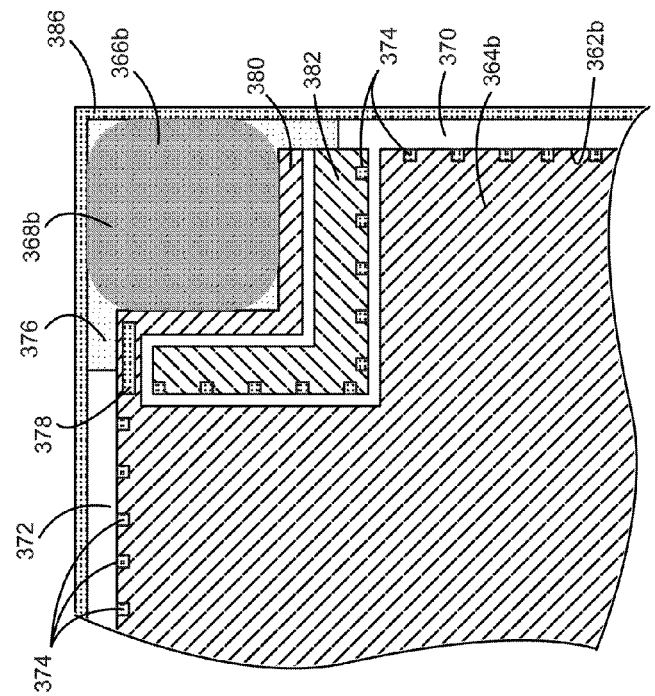
FIGS. 14B, 15B, and 16B are enlarged top views of a portion of the devices shown in FIGS. 14A, 15A, and 16A, respectively.
Figure 14A:
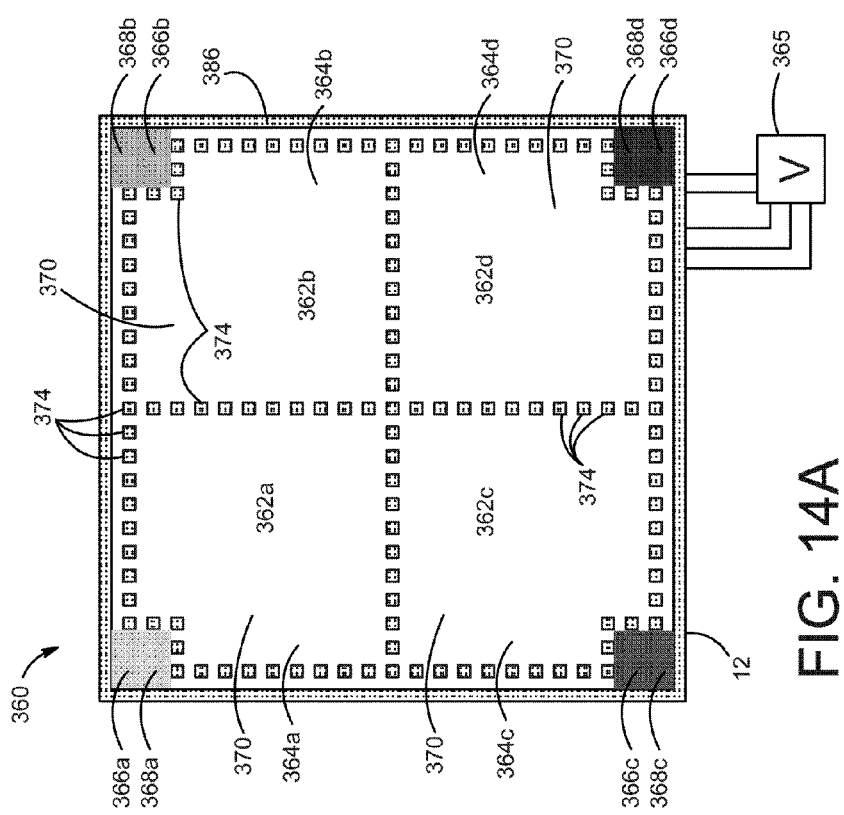
FIGS. 14A, 15A, and 16A are top views of a four-color device according to another embodiment of the invention.

Shown in FIGS. 14A and 14B, each channel region 362n includes a reservoir 366a, 366b, 366c, 366d (collectively 366n) each containing a different polar fluid 368a, 368b, 368c, 368d and where the volumes of the channels regions 362n are filled with a non-polar fluid 370. The outer periphery 372 of the pixel 360 has a series of spacers 374 forming the Laplace barrier. This outer periphery 372 has the purpose of allowing controlled return of the non-polar fluid 370 to the reservoir 366n as the respective polar fluid 368n moves from the reservoir 366n and into the channel regions 362n.

Figure 15B:
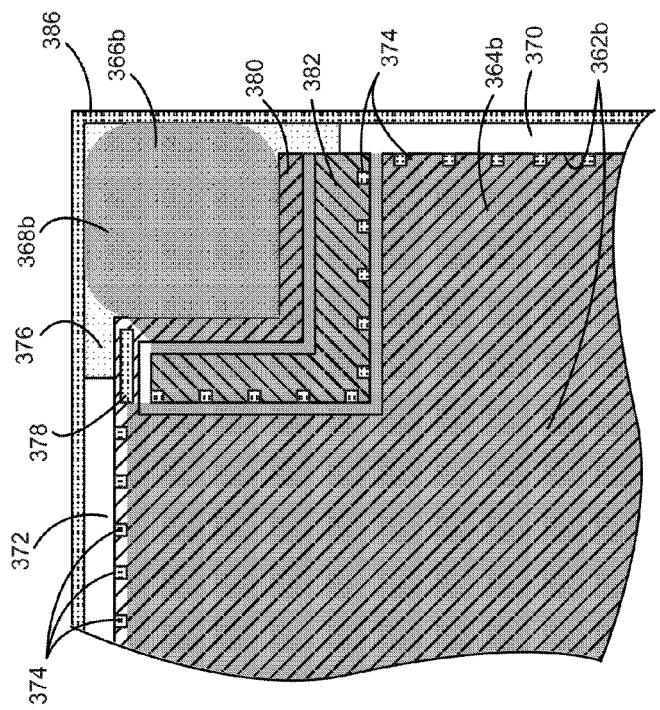
Figure 16B:
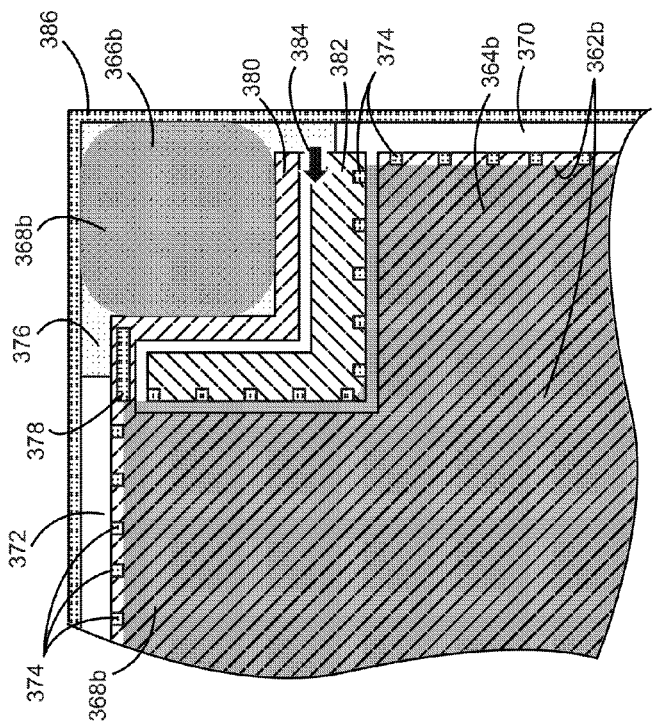

FIGS. 14B, 15B, and 16B illustrate further details of a portion of the pixel 360, particularly one channel region 362b. Shown, a duct 376 is fluidically coupled to the reservoir 366b and the channel region 362b. The duct 376 is geometrically structured partially or fully as deep as the reservoir 366b but having one geometry that is smaller than the reservoir 366b such that Laplace pressure will prevent the polar fluid 368b from wetting into the duct 376. The duct 376 therefore allows a pathway through which the non-polar fluid 370 can easily access the reservoir 366b. If the reservoir 366b is symmetric (such as having a circular shape) and is surrounded by the channel region 362b, then the duct 376 breaks the symmetry of the reservoir 366b, which otherwise the polar fluid 368b, under electromechanical force, could try to leave the reservoir 366b in all radial directions. The polar fluid 368b is further restrained within the reservoir 366b because the non-polar fluid 370 has no other manner of entering the reservoir 366b.

The enlarged views of FIGS. 14B, 15B, and 16B best show a non-limiting sequence of fluid movement. While only one channel region 362b of the pixel 360 is shown for describing the sequence of fluid movement, it would be understood that similar structures and fluid movement may be utilized in the other channel regions 362a, 362c, 362d. In FIG. 15B, the polar fluid 368b is advanced from the reservoir 366b to the channel 362b. An enlarged spacer 378, acting as another Laplace barrier, is positioned to prevent the polar fluid 368b from moving through the portion of the channel region 362b covered by the spacer 378.

A voltage is applied to electrodes 380, 382, 364b to create an electromechanical force that pulls the polar fluid 368b from the reservoir 366b and into the channel region 362b.

The polar fluid 368b must then be split so that there is no continuous polar fluid connection between the channel region 362b and the reservoir 366b, otherwise, upon removal of the voltage, the polar fluid 368b would retract back into the reservoir 366b via Laplace pressure. As best shown in FIG. 16B, the voltage is removed from the second electrode 382, causing the non-polar fluid 370 to advance into the channel region 362b and cover the second electrode 382, as indicated by arrow 384. This effectively splits the polar fluid 368b into two volumes: a first volume in the channel region 362b and a second volume in the reservoir 366b. The voltage may then be removed from the electrode 364b because the spacers 374 have confined the polar fluid 368b within the channel region 362b. The polar fluid 368b can return to the reservoir 366b by applying a voltage to the electrodes 380, 382; however, the voltage that is applied to the electrode 364b should be sufficiently high to promote contact between the polar fluid 368b within the channel region 362b and within the reservoir 366b, but low enough that the Young-Laplace pressure will drive the polar fluid 368b from the channel region 362b into the reservoir 366b. Alternatively, though not specifically shown, a portion of the first electrode 380 adjacent to the reservoir 366b could be removed and replaced with a hydrophilic surface. This hydrophilic surface would therefore always be wetted by the polar fluid 368b. Alternatively, the electrodes 380, 382 could be interdigitated, or placed on different substrates (for example the first and second substrates 12, 16) such that they may both electromechanically influence the polar fluid 368b. Alternately, and as was described with reference to FIG. 6A, the portion of the electrode 380 that is adjacent to the reservoir 366b could be replaced by a splitting electrode 138 (FIG. 6A), and therefore use functionality similar to that described for FIGS. 6A and 13A.

Figure 15A:
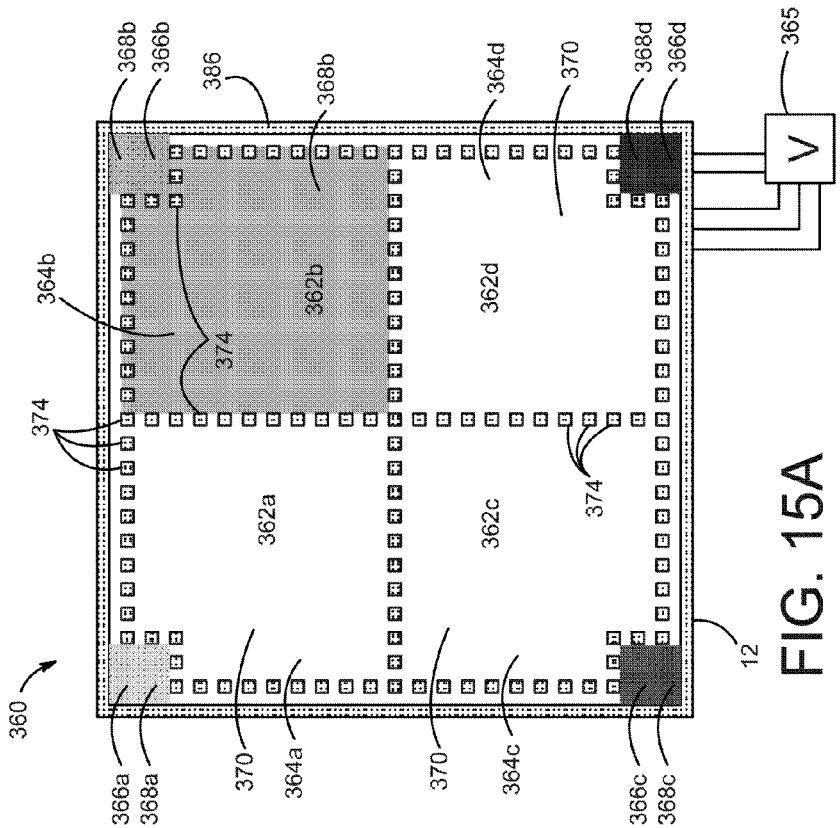

In FIG. 15A, the polar fluid 368*b* is wetted into only the channel region 362*b* above the electrode 364*b*. At this point, the polar fluid 368*b* may then move to an adjacent channel region 362*a*, 362*d* and, alternatively or additionally, pulled to cover all channel regions 362*n* by simultaneously applying voltage to the corresponding electrodes 364*a*, 364*c*, 364*d* and the second electrode 382 (FIG. 15B) associated with each of the reservoirs 366*b*.

Figure 16A:
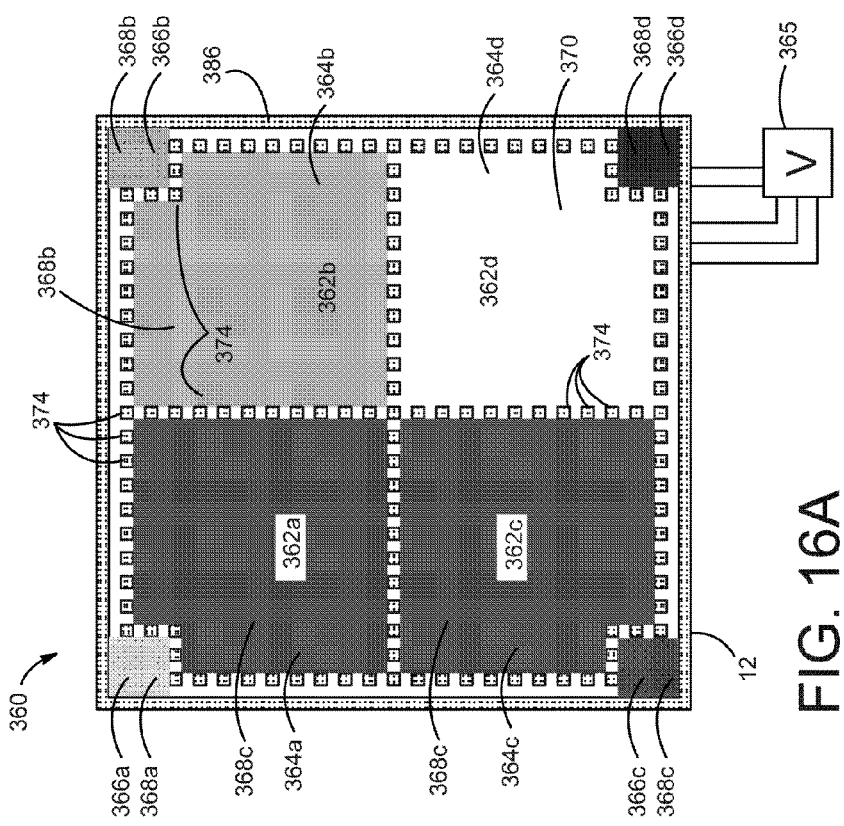

Shown in FIGS. 16A and 16B, two of the polar fluids 368*b*, 368*c* can fill adjacent channels regions 362*a*, 362*b*, 362*c* without the risk of merging. Hence, multiple color combinations can be provided in a single pixel 360 without the brightness and color saturation losses associated with color filters.

For an array of pixels, Laplace barriers surrounding each pixel may be replaced with a surrounding duct, though this is not specifically shown. In an alternate embodiment, multiple pixels could be placed adjacent to one another so as to share adjacent reservoirs, which may simplify the dosing of polar fluids or reduce the complexity of the drive circuitry for the constructed display.

For the embodiments shown in FIGS. 14A-16B, a border barrier 386 is provided in order to eliminate the influence of fluid flow and pressure between adjacent pixels 360 when arranged in a one- or two-dimensional array.

With reference to FIGS. 17A-17J, and in accordance with another embodiment of the invention, an electrofluidic device 400 with a thinner profile is shown and includes the first substrate 12, having a first electrode 402 and the dielectric 404 thereon. A first Laplace barrier, shown here as a series of spacers 32 is photolithographically patterned onto the dielectric 404. As an example, the thickness or height of each spacer 32 may be 4 μm. A spacer that is not a Laplace barrier is also formed using photolithography and is labeled as 386. A separating layer 406 is applied over the spacers 32 and includes a first two ducts 408*a*, 408*b* that are configured to allow fluid flow or communication within the device 400 as described below. The separating layer 406 is not an intermediate substrate, rather it is formed directly on, and therefore intimately part of and aligned to, the first substrate 12. The separating layer 406 can be applied as a laminated photoresist film like DuPont Per-MX. This forms a reservoir 410 for holding the polar fluid 24. When the second substrate 16 is added, a channel 412 is formed between the second substrate 16 and the separating layer 406. The channel 412 and reservoir 410 are similar in features and can be interchangeable in position. Accordingly, the ducts 408*a*, 408*b* provide fluid pathways between the channel 412 and the reservoir 410. Conventional constructions that include the independent fabrication of an intermediate substrate, followed by integration of the intermediate substrate with another substrate, are prohibitively challenging to manufacture because of alignment issues and deformation of thin polymer films.

Shown, the second substrate 16 includes a second electrode 414. Both the first and second electrodes 402, 414 include the dielectric layer 404, as has been described in detail previously.

A third electrode 416, which may be constructed from, or include as a coating, a material having a reflective property is fabricated onto the hydrophobic layer 406 using a method that is preferably based on photolithography.

The first and second substrates 12, 16 may further include border barriers 386, constructed as solid barriers or as Laplace barriers to define separate pixels of a display device.

The second substrate 16, the second electrode 414, and the dielectric 404 are laminated onto the border barriers 386 constructed from a transparent material. Prior to application of the second substrate 16, the majority of the surfaces that are in fluidic contact with either of a first polar fluid 24 or the non-polar fluid 26 will include a hydrophobic coating as was described previously, but not specifically illustrated here for the sake of simplicity. In some embodiments, the hydrophobic coating does not electrically insulate the third electrode 416 from the polar fluid 24. Therefore, the hydrophobic coating may be thin enough to allow conduction between the polar fluid 24 and third electrode 416.

The fluid space inside the device 400 adjacent to the second electrode 414, i.e., the channel 412, is substantially viewable from the viewpoint 311, whereas the space adjacent to the first electrode 402, i.e., the reservoir 410, is substantially hidden from viewpoint 311. The reservoir 410 and the channel 412 contain the polar fluid 24 and the non-polar fluid 26.

A light source 430, external to the device 400, enables viewing of the polar fluid 24 within the fluid space via the reflective properties associated with the third electrode 416. Accordingly, light enters the device 400 from the light source 430 and through the viewable area of the second substrate 16. The light traverses the fluid (either the polar fluid 24 or the non-polar fluid 26) positioned within the channel 412 and is reflected at the third electrode 416. As the light traverses the fluid, at least one spectral property of the light will undergo a change, where the polar fluid 24 and the non-polar fluid 26 alter the spectral property of light in different ways. Spectral properties may include, for example, the wavelength, scattering, polarization, reflection, absorption, refraction, or other as would be known.

A first voltage source 418 and a second voltage source 420 are connected to the three electrodes 402, 414, 416 with both voltage sources 418, 420 having a common connection with the polar fluid 24 through the third electrode 416. The voltage sources 418, 420 are capable of moving the polar fluid 24 between a first position, or a first display state, where the polar fluid 24 dominantly resides within the reservoir 410 and thus is largely hidden from view, to a second position, or a second display state, where the polar fluid 24 dominantly resides within the channel 412 and thus is largely viewable. Intermediate positions, so called 'gray-scales,' are also possible where only a portion of the polar fluid 24 is viewable.

With reference to FIGS. 17A and 17B, a first vertical radius of curvature 422 and a second vertical radius of curvature 424 are shown for the case of negligible or nil voltage applied to either of the first and second voltage sources 418, 420. The radii of curvature 422 and 424 are approximately equal because of the hydrophobic coating provided on most areas contacted by the polar fluid 24 and because the heights of the reservoir 410 and the channel 412 are approximately equal by design. A less influential horizontal radius of curvature 426 is also shown for the top-view diagram of FIG. 18B, but as described previously is less significant as compared with significantly smaller first and second radii of curvatures 422 and 424. In this configuration, the polar fluid 24 is stable with the following condition: because the radii of curvatures 422 and 424 can never be exactly the same (mainly due to the height variation between the channel 412 and the reservoir 410), some force must exist to further oppose polar fluid motion at equilibrium. In one embodiment, a Laplace barrier is required to oppose fluid motion. In this embodiment, the Laplace barrier can be provided by contact angle hysteresis, which would stabilize the polar fluid 24 in numerous positions. Contact angle hysteresis can be an inherent property of the hydrophobic coatings 22 (FIG. 1A), for example a textured surface for the hydrophobic coating, can be due to charge injection, or can be accomplished by other means known by those skilled in the art of electrowetting.

A Laplace barrier comprising contact angle hysteresis for use in the device 400 of FIG. 17A can be mathematically defined as follows. The difference between the Laplace pressure in the channel 412 or in the reservoir 410 must be less than the hysteresis pressure caused by contact angle hysteresis. The hysteresis pressure can be calculated by substituting the channel 412 or reservoir 410 height in a calculation of Laplace pressure with the height divided by the cosine of the quantity (Young's angle less the contact angle hysteresis).

However, contact angle hysteresis does not provide a grayscale reset capabilities as will be described below. As a result, the spacers 32 form a row of Laplace barriers will provide a grayscale reset state as described for other embodiments of the present invention.

Figure 17C:
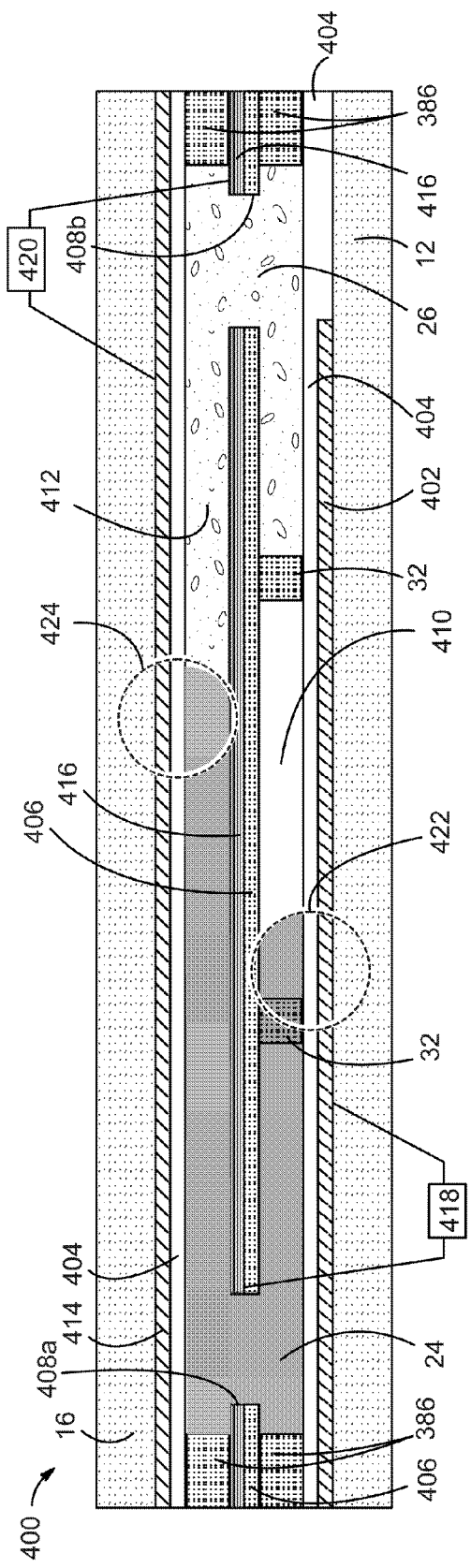
Figure 17D:
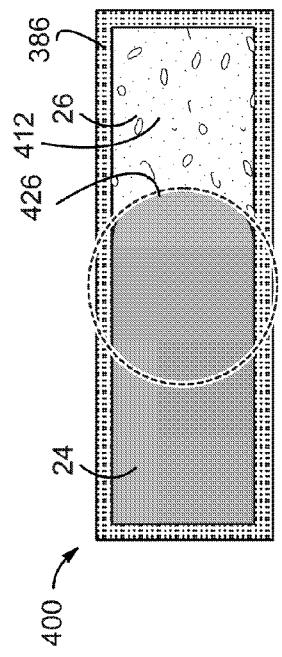
Figure 17G:
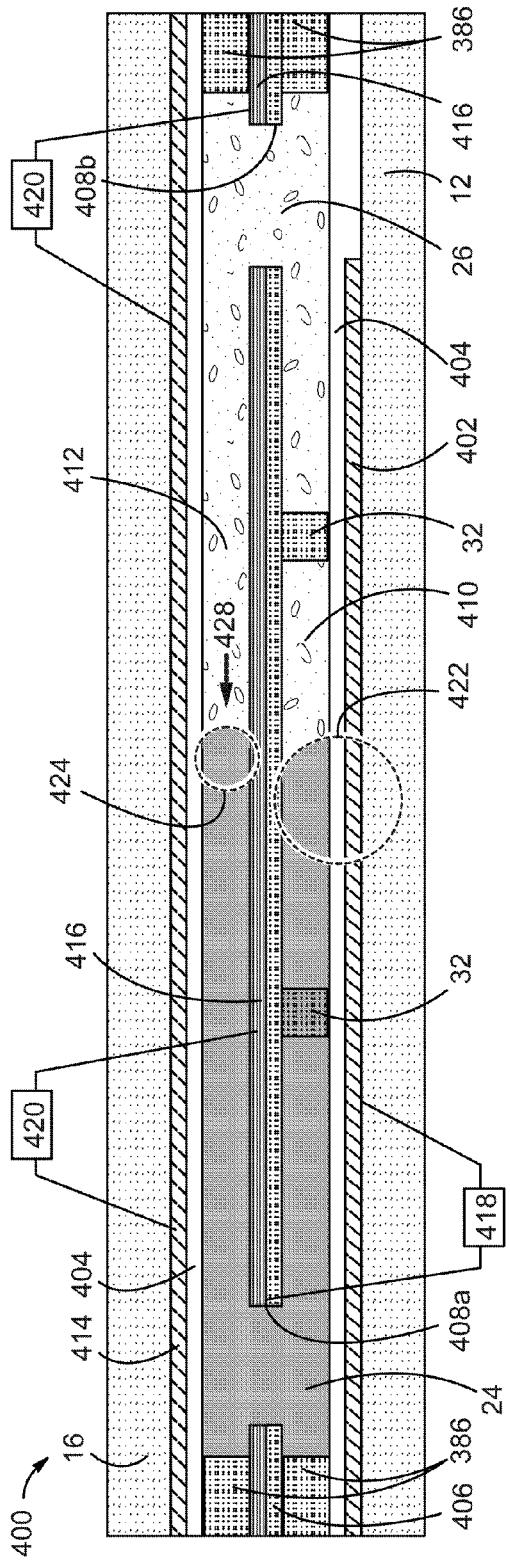
Figure 17H:
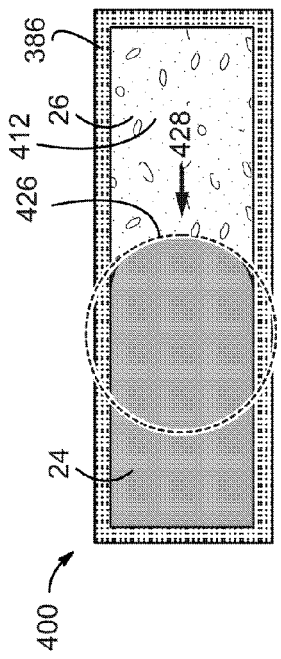

With reference to FIGS. 17C and 17D, both voltage sources 418, 420 supply a similar voltage, and thus apply similar electromechanical forces, to reduce the apparent contact angle of the polar fluid 24 on one side of the channel 412 or the reservoir 410. Although the radii of curvature 424, 426 have both increased, the radii 424, 426 have increased equally and no substantial displacement of the polar fluid 24 occurs.

With reference to FIGS. 17E-17H, only one of the voltage sources 418, 420 supplies a voltage, or alternatively voltages of varying magnitudes or duration time, such that a net pressure 428 causes the polar fluid 24 to move in the direction of the net pressure 428. The polar fluid 24 can fill or empty the reservoir 410 or be moved to an intermediate position within the reservoir 410 and/or the channel 412. Although not shown, additional electrodes and dielectrics could be added to be adjacent to the hydrophobic layer 406 to increase the net pressure 428. Because of contact angle hysteresis, upon removing the voltage, the polar fluid 24 remains stable in a given position.

Figure 17I:
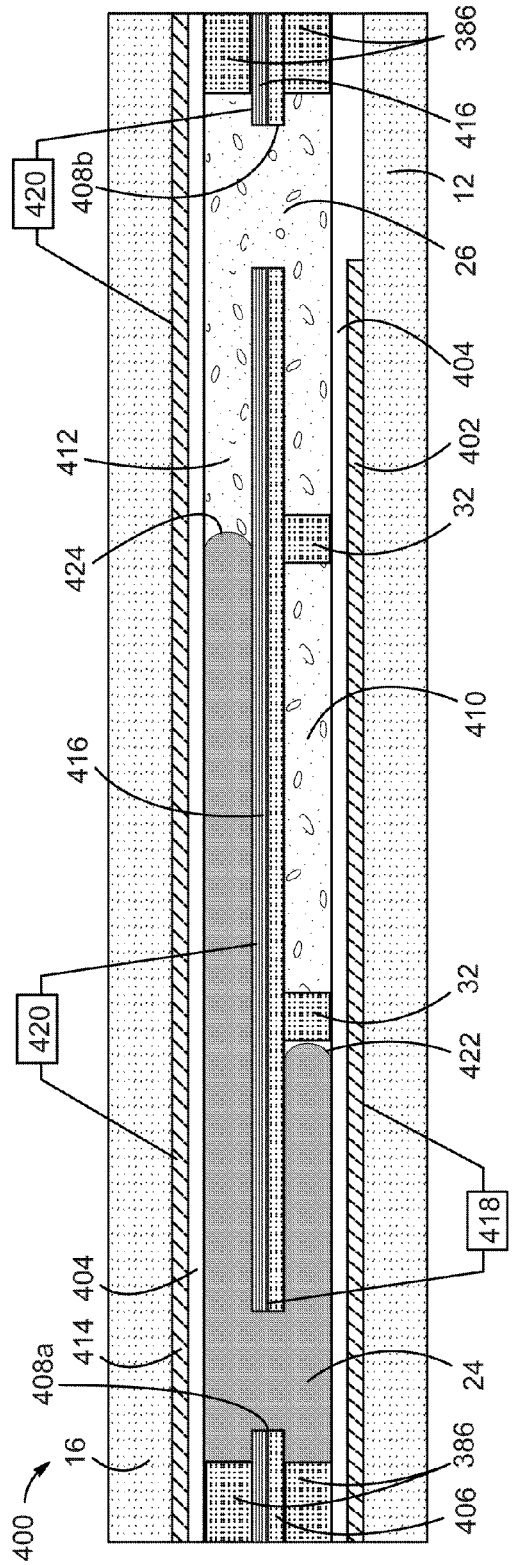
Figure 17J:
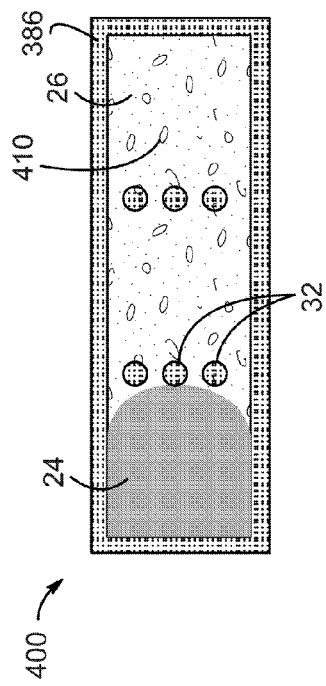

As illustrated in FIGS. 17I and 17J, the polar fluid 24 is advanced to the spacer 32, but not beyond it. The voltages can then be removed to create a bistable positioning of the polar fluid 24. The view of FIG. 17J is of the reservoir 410, which is unlike the views in FIGS. 17B, 17D, 17F, and 17H, which are views of the channel 412.

As a result, the device 400 is shown to provide on demand video or fast switching between various grayscale states without a significant or slow 'flicker.' For example, conventional electrophoretic displays must reset the pixels to completely a white or black appearance between image updates, otherwise small errors in switching pigment positions within the conventional device will accumulate to an unacceptable level. The only means by which this can be resolved is to create grayscale reset states at intermediate positions. For the device 400 of FIG. 17I, if the device or pixel was at 40% of maximum reflectance, and a grayscale reset of 50% of maximum reflectance is required, then before switching to a 45% grayscale state the pixel would first reset to the 50% state. That is only optically a 10% difference and, in terms of net fluid movement, a 15% difference, and therefore would greatly reduce the any 'flicker' appearance on the screen and the required switching time.

Although not shown, additional Laplace barriers can be added within either or both of the reservoir 410 or channel 412 in a manner that is like those described for other embodiments. Additional Laplace barriers will allow the polar fluid 24 to be displayed in various geometries, such as square or rectangular. Furthermore, the device 400 may contain a second polar fluid 40 (FIG. 1D), as was described previously, such that the two polar fluids 24, 40 can be displayed on either side of the Laplace barrier without risk of merging and color mixing. The features of device 400 can be combined with features and performance as described for other figures and embodiments of the present invention.

With reference to FIGS. 18A-18D and in accordance with embodiments of the invention, a device 450 with an open cell architecture is provided. Generally, the device 450 is similar to the device 400 of FIG. 17A, but for the duct 452 is provided in center of the device comprising a pixel and counter fluid flow is achieved at the edges 453 of the device 450. Additionally, the first electrode 402 is split at a position that is in alignment with the duct 452 and a second electrode 454 is formed within the void formed there between. The first and second electrodes 402, 454 are driven by a first voltage source 456; the third and second electrodes 414, 454 are driven by a second voltage source 458.

The geometric symmetry of this alternate embodiment can improve the switching speed of the device 450 as compared with the device 400 of FIG. 17A because the polar fluid 24 only needs to be moved about half of the distance in the device 450. An additional aspect is the ability to operate with use of a gas as the non-polar fluid 24. The gas has a much lower viscosity than a liquid fluid, like oil, and can effectively increase the switching speed by a factor of two or more.

With specific reference now to FIGS. 18C and 18D, when using the gas, the Young's angle for the polar fluid 24 is greatly reduced as compared to the embodiments utilizing oil as the non-polar fluid 26. However, the operational principles remain unchanged. The spacers 32 and the border barriers 386 occupy only a small fraction of the perimeter of the device 450. If the spacers 32 or the border barrier 386 occupy a significant area of the device 350, then when the polar fluid 24 wets against those Laplace barriers, it can be difficult for the polar fluid 24 to dewet. Minimizing the contact area between the polar fluid 24 and the Laplace barrier ensures that the polar fluid 24 remains as a single volume, thus sustaining maximum viewing contrast of the device 450. A second non-polar fluid, while not shown, can be utilized, and in that example, the first non-polar fluid could be a gas and the second non-polar fluid could be a small additional amount of oil provided next to a Laplace barrier to assist in dewetting the polar fluid 24 from the Laplace barrier.

Figure 19A:
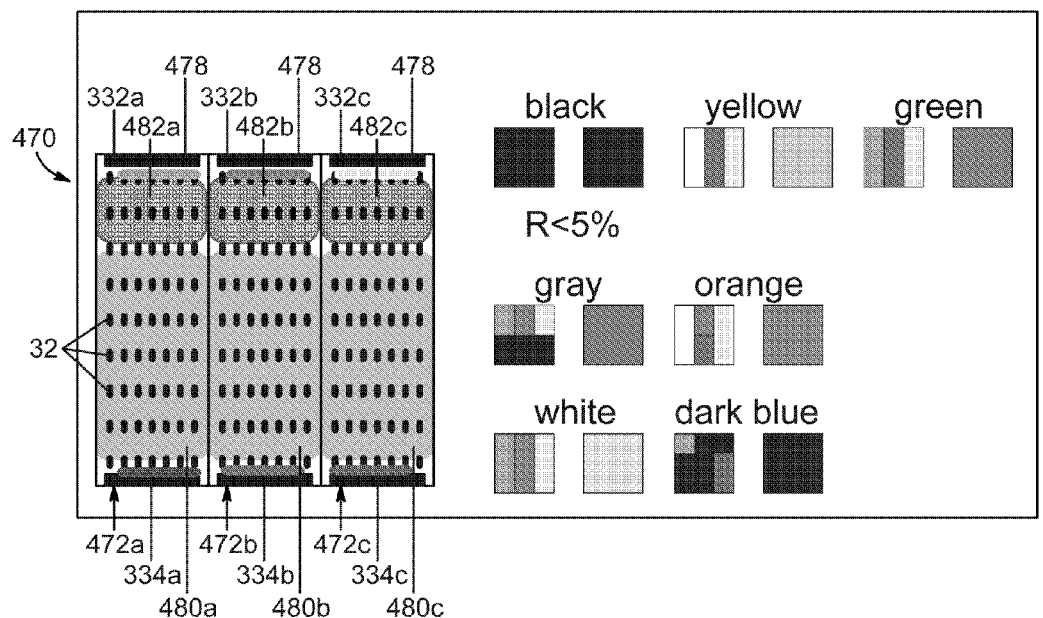
FIGS. 19A and 19B are top views of two embodiments of devices according to the present invention using multiple colored fluids and a bi-primary color system.
Figure 19B:
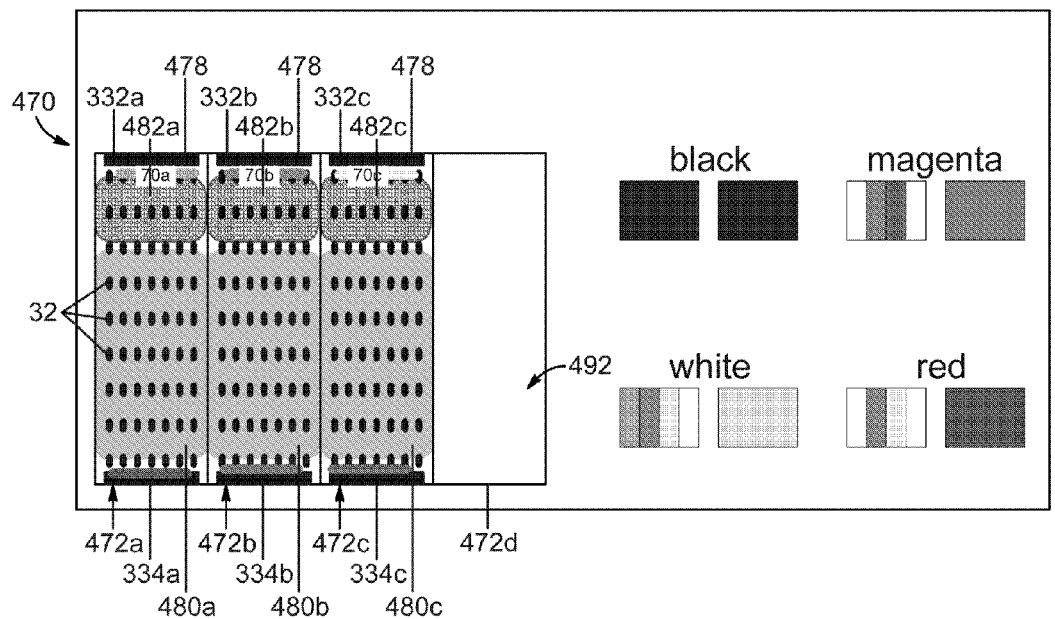

Turning now to FIGS. 19A and 19B and in accordance with embodiments of the invention, the Laplace barriers may be used to display three or more colored fluids in a single device without mixing or merging of the colored fluids. Conventional electrowetting devices with colored oils lack this ability because the oils leave trace amounts behind on most surfaces, which eventually lead to mixing. Conventional oils with electrophoretic pigments can provide two colored pigments, but the oils themselves must be clear, therefore only a maximum of two colors are possible.

The illustrative device 470 can, for example, allow use of a black non-polar fluid by use of a dye, and two or more colored polar fluids containing a colorant, such as dispersed pigments. Such a capability opens up new color-space opportunities for displays and enables reflective performance and color saturation that is roughly twice that of conventional technologies. The device 470 is shown having three pixels 472a, 472b, 472c (collectively 472n) that are constructed in a manner that is similar to the device 330 of FIG. 13A. Each pixel 472n contains a black non-polar fluid 478 and two polar fluids 480n, 482n having different colorants of complimentary colors. Abbreviations for red, green, blue, cyan, magenta, yellow, white, black are respectively RGBCMYWK. A complimentary color to a particular primary color (i.e., RBY) is the color that does not include the particular primary color, i.e., red and cyan are compliments because cyan is a mixture of blue and yellow and does not contain red. The illustrated device 470 includes the following: pixel 472a includes the polar fluid 480a having a red colorant (R) and the polar fluid 482a having a cyan colorant (C); pixel 472b includes the polar fluid 480b having a green colorant (G) and the polar fluid 482b having a magenta colorant (M); and pixel 472c includes the polar fluid 480c having a blue colorant (B) and the polar fluid 482c having a yellow colorant (Y).

Using the device 470, pixel performance using a bi-primary color system can be calculated. Before calculating the impact of using two or more colored polar fluids 480, 482 in each pixel 472n, the raw pixel performance must first be calculated. With a pixel area of 340 µm×115 µm or about 39,000 µm², a 5 µm resolution limit for Al electrodes and a spacer patterning, about 20 µm resolution limit for the reservoir patterning, and an Al dielectric 314 (FIG. 3A) that is covered by a material that boosts reflection by 3%, then the results are shown in Table 1. The raw pixel performance with two reservoirs 332n, 334n per pixel and with 8 rows of Laplace barriers (shown as spacers 32) having 77% net reflectance. The total area that is reflecting is 75%, assuming that the reservoirs 332n 334n, spacers 32, and the pixel perimeter are all masked by an optically black material. Further, it should be noted that if the ridges 202 (FIG. 5D) are used and are shorter that the channel height, then the ridges 202 (FIG. 5D) still act as the Laplace barrier and the 10% saturation loss associated with the spacers 32 can be eliminated.

TABLE 1

| Pixel Feature | Color Saturation (% Area) | Reflectance (%) |
| --- | --- | --- |
| Reservoirs 332n, 334n<br>100 × 20 µm² × 2 = 4000 µm² | 10% loss | 10% loss<br>(no Al) |
| Spacers 32<br>8 rows of 9, 5 × 10 µm = 3600 µm² | 10% loss | N/A |
| Pixel Perimeter<br>340 × 5 + 115 × 5 = 2275 µm² | 5% loss | 5% loss<br>(no Al) |
| Base Reflectance<br>93% Al, 3% ITO loss | N/A | 10% loss |
| Total: | 75% loss | 77% loss |

Taking into consideration pixel losses (Table 1) and the bi-primary color system, the practically achievable white reflectance for three pixels having two reservoirs 332n, 334n each is approximately 50% and the color saturation is 40%.

As a first example, shown in FIG. 19A, the yellow saturation for the RGY device 470 is as follows: the red pixel 472a effectively contributes 50% of yellow, the green pixel 472b contributes 50% of yellow, and the yellow pixel 472c contributes 100% yellow, for an average of 67%. Multiply this by the raw pixel area (75%, Table 1) and the color saturation value is 50%.

In the exemplary device 470 of FIG. 19A, each pixel 470n has 8 rows of Laplace barriers and is thus capable of 8 levels of color scaling. With two complimentary colors, i.e., two polar fluids 24, 40 in each pixel 470n, then the number of colors that can be generated by the device 470 is 8×8×8×2 colors, or 1024 different colors.

With specific reference to FIG. 19B, as a second example, the illustrative device 490 includes an additional fourth pixel 472d containing a white fluid 492 for displaying CMYW. This fourth pixel 472D could be constructed similar to the device 330 of FIG. 13A, but would need only one reservoir. If two reservoirs are used, then both reservoirs would include polar fluids 24, 40 that are white in color. The reflectance calculation for this device in a CMYW state, where the pixels 472n provide 66%+66%+66%+100% reflectance for an average of 74%, is multiplied by the raw pixel reflectance of 77% (Table 1), to yield a net reflectance of 57%. This value is only about 20% less than conventional white paper reflectance. Accordingly, even a color like red has good reflectance when, for example, red is formed with the device 470 having 33%+ 66%+66%+100%, which averages to 66% based on color and a pixel performance of about 51% reflection. This is actually higher than conventional print when considering conventional paper is 80% reflective and reflects only ⅓rd of the visible spectrum with red ink. Further, the brain may compensate for any reduced saturation, such as when a familiar object is perceived as the intended color (a pink apple in a picture is still perceived as red).

The above described approach cannot be achieved with conventional technologies. The only other technology that can display two pigments in a common pixel is a conventional in-plane electrophoretic display. However, in-plane electrophoretic displays cannot achieve bi-primary color performance because the pigment particles must be dispersed in a clear oil layer and therefore a black oil cannot be used. The clear oil is required to reveal a white background. As a result, the in-plane electrophoretic approach cannot generate black and two colors in a single sub-pixel. Therefore, the bi-primary color system of the device 470 of FIGS. 19A and 19B is unique itself above the use of Laplace barriers to closely display to colored polar fluids without the risk of merging.

Figure 20:
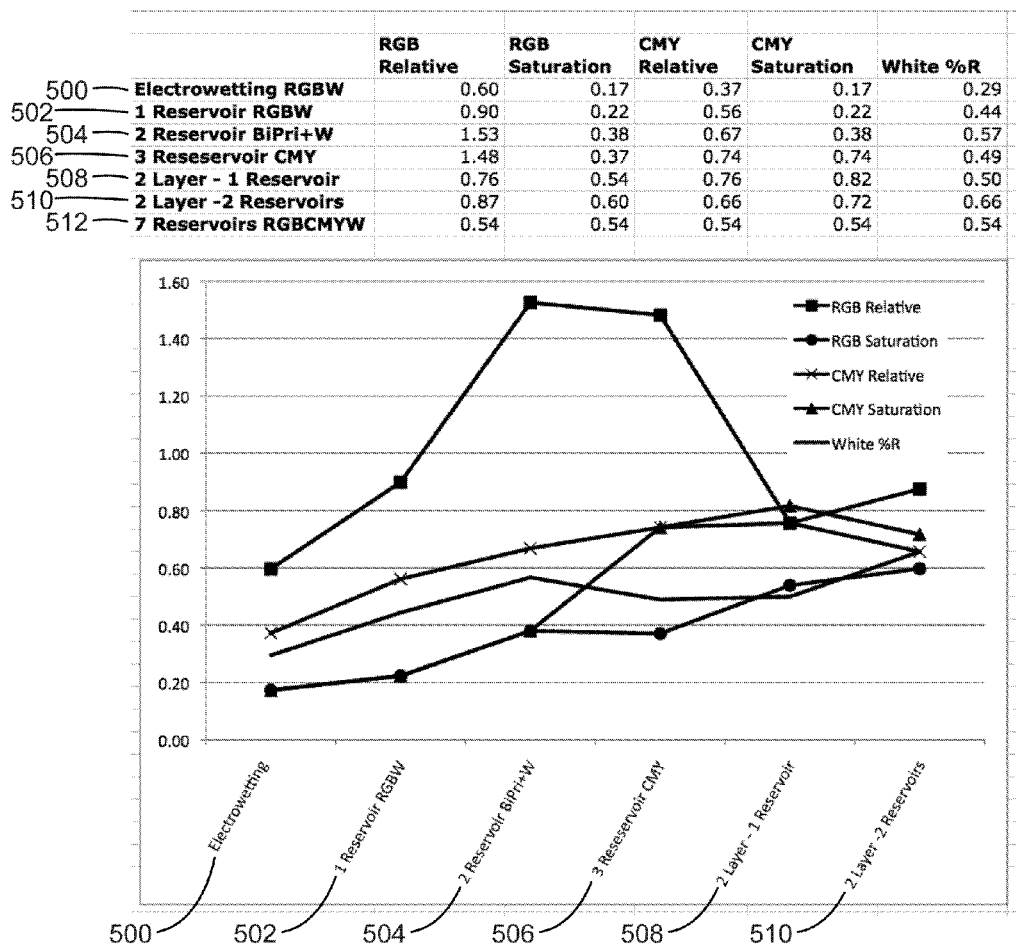
FIG. 20 is a table and a chart comparing the optical performance of conventional display devices to one or more embodiments of the present invention.

With reference to FIG. 20, a more rigorous calculation of the optical performance of the device 470 of FIG. 19B is made. This model assumes conventional materials, which in-fact may be improved upon and lead to greater color saturation and performance than that shown. This model further assumes that the Laplace barriers also add at an optical loss. However, as previously mentioned, utilizing Laplace barriers that do not span the entire channel height can mitigate optical loss. Using the principles of the present invention, several types of color systems are shown. 'RGB relative' refers to the % reflection when displaying an R, G, or B color, as compared to RGB printed on paper (33%). Therefore a value of >1 implies that color saturation is sacrificed to achieve reflectance. 'RGB saturation' refers to the % area, effectively, when displaying an R, G, or B color, as compared to color printed on paper (100% of area). Similar considerations are given for CMY colors.

To benchmark the calculations in the table of FIG. 20, a first model 500 was directed to a conventional electrowetting display using black oil films, an RGBW color filter, and a pixel architecture that is similar to that commercially available device by LiquaVista Co., Eindhoven Area, Netherlands. The model 500 predicts a white reflectance of 29%, which is close to the current prototype performance of about 25% white reflectance. With optimization, the LiquaVista RGBW model 500 should reach about 29% white reflectance.

A second model 502 is directed to an electrofluidic pixel having a single reservoir and using an RGBW color filter approach. The white reflectance was calculated to be as high as 44%. However, shown for both the first and second models 500, 502, i.e., the RGBW technologies (electrowetting, and electrofluidic), the color saturation is very poor.

A third model 504 is directed to an electrofluidic pixel having the 2 reservoir and using a bi-primary color system with the white sub-pixel, such as the device 470 of FIG. 19B. The white reflectance increases to 57%, but more importantly the color saturation nearly doubled. This is a major advance for electronic paper applications.

A fourth model 506 is directed to an electrofluidic pixel having 3 reservoirs containing C, M, and Y, polar fluids. The saturation and reflectance is also good but not as good as the bi-primary color system.

A fifth model 508 is directed to a stacking of two electrofluidic panels (2 layers) using subtractive color filtering with one color (i.e., one reservoir) at each pixel/plate. The reflective performance is not improved of previous models because optical losses typically dominate over any potential optical enhancements when stacking multiple substrates with active matrix backplanes. However, the saturation was improved.

A sixth model 510 is directed to stacking of two electrofluidic plates (2 layers) using two reservoirs with a distinct color each. The performance was calculated to be quite good with 66% reflectance and good color saturation for most of the colors to be displayed. Adding a white pixel (not shown) can take the reflectance close to that of paper.

A seventh model 512 is directed to a pixel having 7 reservoirs, one reservoir for each of CMYRGBW colored polar fluid, with a black non-polar fluid. Because of the optical losses imposed by the reservoir areas, the total performance is not as good as some of the other approaches shown.

With further reference to FIG. 20, when the fifth and sixth models 508, 510 (stacking two electrowetting plates) is subjected to subtractive color, it is generally desirable to not use active matrix backplanes if video-speed operation is not needed. If passive matrix addressing can be used, then the optical performance can be significantly increased. However, passive matrix addressing is typically only feasible for bistable pixels. Therefore, a possible passive matrix driving scheme for a two plate electrofluidic display can use the passive-matrix drive methods described for FIGS. 6A, 12A, and 13A, and stacking two such pixel/device structures to create colors similar to that described for FIG. 19B. These passive matrix drive schemes for the present invention are made possible by use of Laplace barriers, splitting electrodes, and three or more electrodes per pixel/device. It should be noted also, that the above described passive matrix drive scheme applies to single plate electrofluidic displays with one or more reservoirs per pixel.

With further reference to FIG. 20, it should be noted, that the color systems shown in FIGS. 19A and 19B are non-limiting, and by example only, additional color systems can be included within the spirit of the present invention. The color systems are also not optimized in terms of maximum perceptual performance, for example, by decreasing reflectance to increase saturation. Multiple variations and optimization of polar fluid colors, reservoir locations, Laplace barriers, and other features described herein, fall within the overall spirit of the present invention. This optimum is not the same for immersion reading, or for an application like a car navigation system. Furthermore, for display applications such as signage, where pixel sizes are much larger, the pixel optical performance only increases as less visual area is occupied by porous fluid barriers, pixel perimeters, etc.

The embodiments described herein are not limited to the specific barrier geometries presented herein. The present invention extends to using Laplace barriers that can comprise continuous walls or perimeters, on or between electrodes, but also Laplace barriers having a height that do not span the entire channel. Spacers and projections may be of varying heights that partially or completely span the channel. Some Laplace barriers may reside on the first and/or second substrate. Laplace barriers can take on multiple physical geometries (round, square, polygon, curved, etc.), locations, and arrangements, so long as they provide the Laplace barrier function within the spirit of the present invention.

The embodiments described herein are not limited to electrowetting control. The present invention extends to using Laplace barriers and electrofluidic methods including electrowetting without insulators, syringe-pumps, thermocapillary, photo-responsive molecules such as spiropyrans, dielectrophoresis, electrophoresis, and micro-electro-mechanical pumping. For example, one skilled in the art of in-plane electrophoresis will recognize that the projections such as spacer posts forming the Laplace barrier could also be coated with a surface charge, similar to how electrical charges are provided to pigments in electrophoretic or other types of dispersions. As a result, the Laplace barrier could be created where it would require a first voltage to move electrophoretic pigment in an insulating fluid to the Laplace barrier, but not beyond it, because of like repulsion of the pigment charge and the surface charge on the Laplace barrier. Next, a second and greater voltage could be provided to move the charged pigment beyond the Laplace barrier. As a result, a truly bistable and multi-position in-plane electrophoretic device is created.

Example 1

In a first example, shown as scanning electron microscope images in FIGS. 21A-22B, a perimeter of small diameter spacer posts 600 and larger diameter corner spacer posts 602 were implemented around an electrofluidic display pixel 604 having dimension of about 300 μm×300 μm. A plurality of pixels 604 comprises a device 606, where each pixel 604 is separated by the perimeter of posts 602. Each pixel 604 includes a channel positioned above an electrode, both represented by a surface 608. A reservoir 610 and duct 612 are formed into each surface 608.

The fluids consisted of a polar fluid 614 containing a red dispersed pigment and a black non-polar fluid 616 containing several dye mixtures. When voltage from a voltage supply (not shown) was applied to the electrodes (designated by surface 608), the polar fluid 614 was pulled out of the reservoir 610 and filled the channel (designated by surface 608). However, the polar fluid does not propagate beyond the pixel perimeter because of the spacer posts 600.

All images provided herein have been processed by the stylized-find edges and contrast-enhance functions of Adobe® Photoshop® of Adobe Systems Inc. (San Jose, Calif.).

Example 2

Another example, shown as microscope images in FIGS. 22A and 22B, include a glass substrate 618 having first, second, and third Aluminum electrodes 620, 622, 624. The electrodes 620, 622, 624 were coated with 2.5 μm of a SU-8 epoxy dielectric and then patterned with the posts 600, which were about 5 μm high and about 50 μm in pitch. The posts 600 were coated with 50 nm of a fluoropolymer. A top substrate, not shown in the figures, was added and the device was dosed with polar 614 and non-polar 616 fluids. The non-polar fluid 616 included a black dye such that when it covered one of the electrodes 620, 622, 624, the electrode 620, 622, 624 was not visible in the photograph In FIG. 22A, the polar fluid 614 was electrowetted with a first voltage to cover the first electrode 620; however, the posts 600 between the first and second electrodes 620, 622 confined the polar fluid 614 to the first electrode 620.

When a second and greater voltage was applied from a voltage source (not shown) to all electrodes 620, 622, 624, the polar fluid 614 advanced through the posts 600 such that polar fluid 614 covered all electrodes 620, 622, 624. When this voltage was removed, the polar fluid 614 retained the geometry shown in FIG. 22B. Electrode 622 was also shown to act as a splitting electrode according to the principles of the present invention.

Example 3

In the next example, though not specifically shown, the spacer posts were replaced with a woven wire mesh. The woven wire mesh was made hydrophobic with a fluoropolymer coating and was sandwiched between top and bottom electrowetting plates. The mesh was comprised of 30 μm wire diameter mesh, which at the overlap between wire threads was therefore 60 μm in total thickness. The mesh was purchased from TWP Inc., was woven to ISO 9044, and was a 50 mesh count (per inch). It was found that the wire mesh allowed polar fluid movement by electrowetting, but also was able to regulate polar fluid geometry in the absence of voltage. Therefore, the wire mesh was also shown to act as a Laplace barrier.

Example 4

In the next example, a device 630 was fabricated using a plurality of pixels 632, each being similar to the device 400 described with reference to FIG. 17A. FIGS. 23A-23D are scanning electron microscope and optical microscope photographs of the device 630. The pixels 632 are separated by a border comprising of a Laplace barrier, which shown in FIG. 23C includes a plurality of posts 600.

Figure 23A:
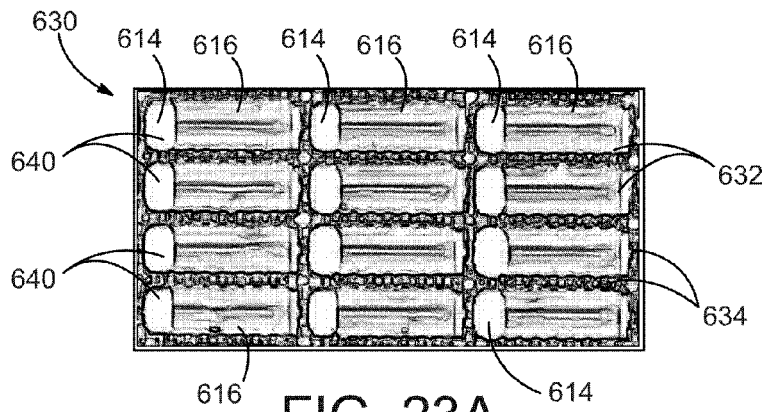
Figure 23B:
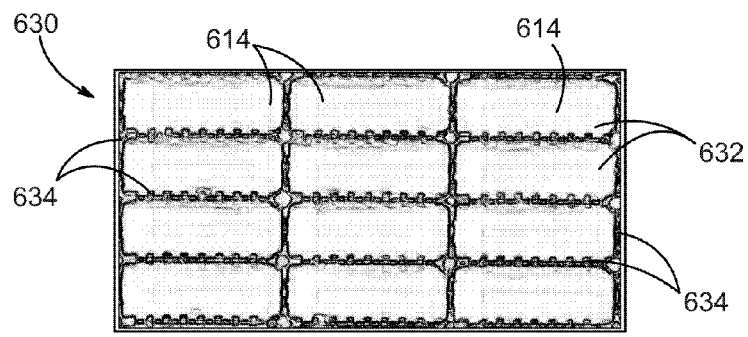

FIG. 23A illustrates the device 630 with the colored polar fluid 614 within the reservoir 636 and the non-polar fluid 616 in the channel 638. Thus, the non-polar fluid 616 is visible. FIG. 23B illustrates the device 630 when the polar fluid 614 has moved through the ducts 640 and into the channel 638 and is thus visible. Accordingly, the non-polar fluid 616 has moved into the reservoir 636 (not visible in FIG. 23B).

Devices were demonstrated using either polar fluid with black pigment or non-polar fluid with black oil. The device shown to be bistable for 3 months time in either position, with no movement of fluids. The bistable test could have been conducted for longer, but it the test was terminated as 3 months of bistability shows that the device is truly bistable (no fluid movement).

Example 5

Figure 23C:
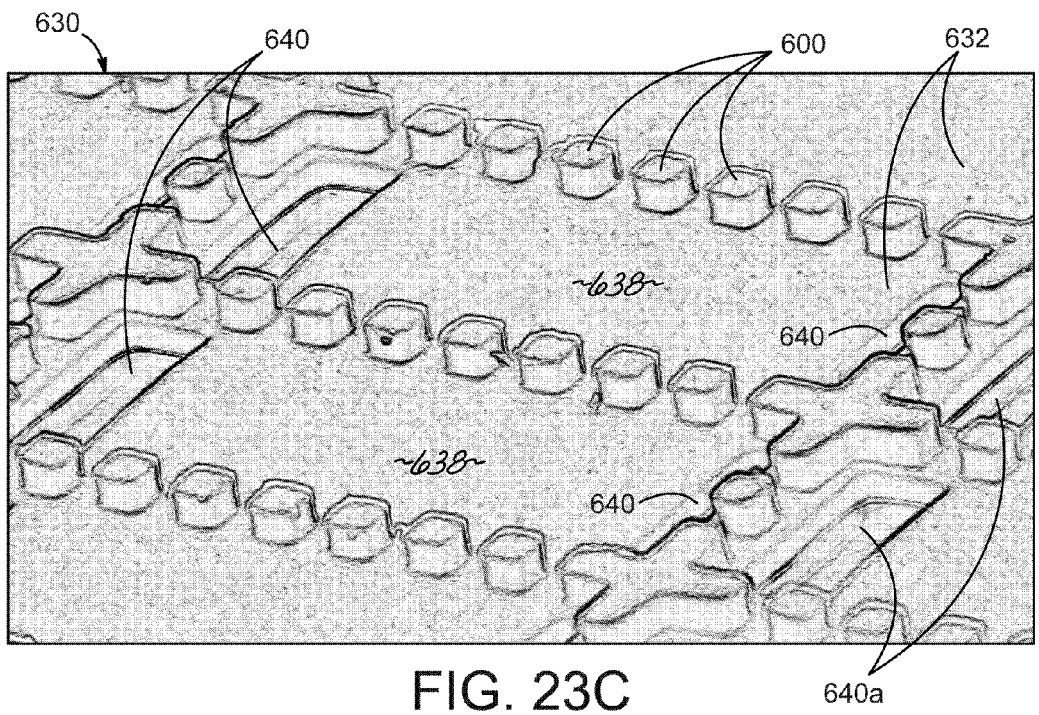
Figure 23D:
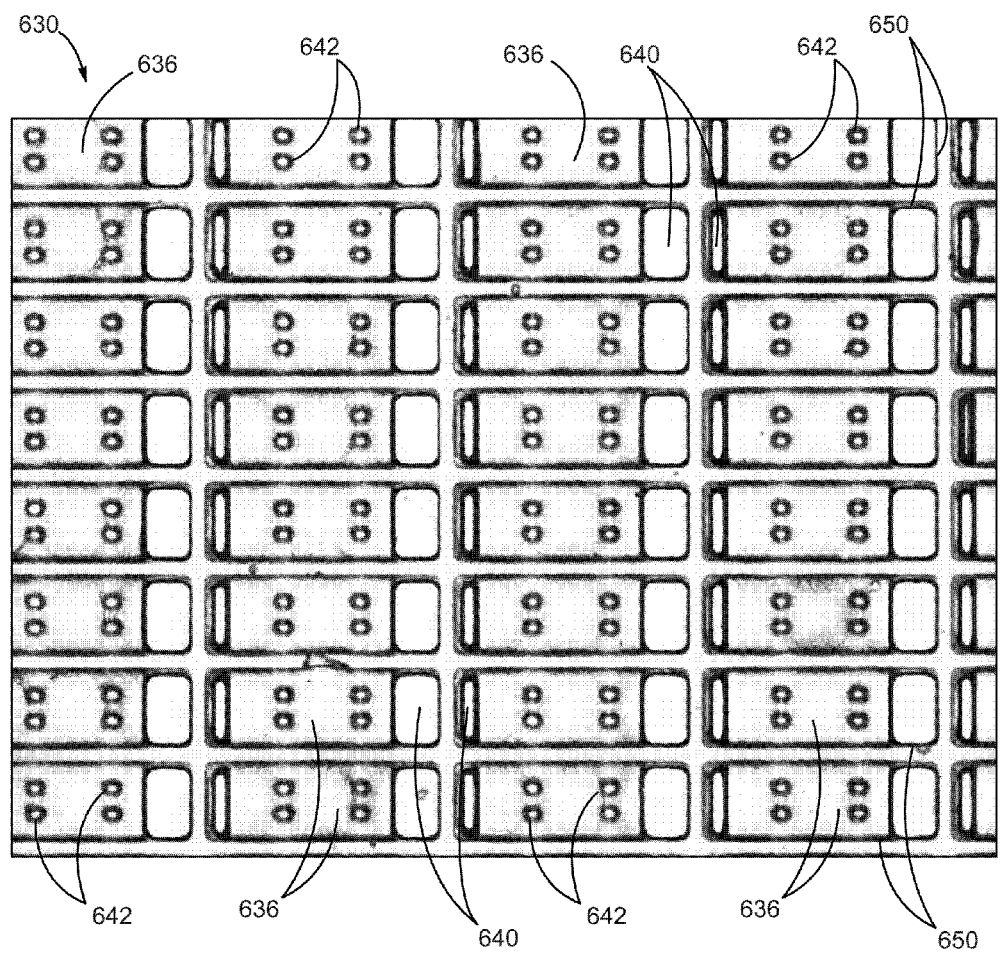

FIGS. 23C and 23D illustrate the next example as microscope images of the device 630 fabricated using principles similar to that described for FIG. 17A, but shown in the optical photograph of FIG. 23D, the reservoir 636 included two rows of two posts 642 to create a Laplace barrier in each reservoir 636 (because the top substrate and the electrode are transparent, the optical photograph can view into the reservoir 636). The device 630 operated similar to the device 206 of FIG. 7A, and the Laplace barriers required a first voltage from a voltage source (not shown) to move the polar fluid 614 (FIG. 23A) against but not beyond the posts 642. A second voltage, greater than the first voltage was necessary to move the polar fluid 614 beyond the posts 642. As a result, the device 630 exhibited grayscale reset states.

Further detail of the fabrication process used to create the devices shown in FIGS. 23A-23D is now provided. 1×1" test pixel arrays 630 were fabricated as follows. A polymer film (Parylene or SU-8) was deposited onto $In_2O_3$:$SnO_2$ coated glass to make a bottom electrowetting substrate 650. SU-8 is particularly useful because it acts as a dielectric and it also promotes adhesion of the next polymer layers. Onto the bottom electrowetting substrate 650, a DuPont PerMX6 dry film photoresist (20 μm) was hot-roll laminated (85° C., 40 PSI, 1 fpm), photolithographically exposed, and developed to form a bottom grid of 450×150 $μm^2$ cells with 30 μm grid width (spacers, Laplace Barriers, reservoir border). Next, a middle PerMX film (separating layer) was laminated onto the bottom grids and patterned with 130×60 $μm^2$ and 130×20 $μm^2$ vias at the ends of the pixel cell. Al was vacuum deposited onto the middle PerMX layer, serving as an optical reflector and a ground electrode. The vias through the middle PerMX layer form an overhang, so no patterning of the Al was required to electrically separate Al on the middle PerMX and bottom substrate surfaces. A top PerMX layer was then added in a grid geometry similar to the bottom PerMX (spacers, channel border). Before fluid dosing, all featured carried by the bottom substrate 650 were conformally dip-coated with Cytonix Fluoropel 1601V fluoropolymer. After fluoropolymer coating and self-assembled liquid dosing, the device 630 was sealed with a transparent top electrowetting plate (not shown in figures).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composing," or variants thereof are used in either the detailed description or the claims, such terms are intended to be inclusive in a manner similar to the open-ended term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A display pixel comprising;
   a first polar fluid;
   a non-polar fluid;
   a first substrate;
   a second substrate arranged relative to the first substrate to define a hydrophobic channel containing the first polar fluid and the non-polar fluid, wherein at least one of the first polar fluid and the non-polar fluid is visible through at least one of the first substrate and the second substrate;
   a first electrode on the first substrate;
   a dielectric layer between the first electrode and the first polar fluid;
   a first Laplace barrier within the hydrophobic channel, the first Laplace barrier defining a fluid pathway open to movement of the first polar fluid within the hydrophobic channel; and a first voltage source electrically connected with the first electrode, the first voltage source configured to electrically bias the first electrode to cause the first polar fluid to move within the hydrophobic channel relative to the first Laplace barrier, wherein the first polar fluid is moved to a first position within the hydrophobic channel when the first electrode is biased by the first voltage source with a first voltage that is less than or equal to a threshold voltage to provide a first display state, and the first polar fluid moves from the first position to a second position within the hydrophobic channel when the first electrode is biased by the first voltage source with a second voltage that is greater than the threshold voltage to provide a second display state.

2. The display pixel of claim 1, wherein the first Laplace barrier restrains the first polar fluid at the first position when the first electrode is biased with the first voltage.

3. The display pixel of claim 1, wherein the first Laplace barrier includes a plurality of hydrophobic spacers extending between the first and second substrates, and the plurality of hydrophobic spacers are arranged with a spacing that is sufficient to impart a radius of curvature to a meniscus of the first polar fluid.

4. The display pixel of claim 1, wherein the first Laplace barrier includes at least one projection that protrudes into the hydrophobic channel, and the at least one projection imparts a radius of curvature on a meniscus of the first polar fluid.

5. The display pixel of claim 1, wherein the first Laplace barrier includes one or more hydrophobic spacers dividing the fluid pathway into a plurality of openings each at least partially occupied by the first polar fluid at the second position.

6. The display pixel of claim 1, wherein the first Laplace barrier is bounded by an exposed surface, and the first polar fluid surrounds the exposed surface of the first Laplace barrier when the first polar fluid is in the second position and the first electrode is unbiased.

7. The display pixel of claim 1, wherein the first voltage provides an electromechanical force on the first polar fluid that is sufficient to move the first polar fluid to the first position by overcoming a Laplace pressure within the first polar fluid that is in a direction that opposes the movement.

8. The display pixel of claim 7, wherein, when the second voltage is removed, the Laplace pressure causes the first polar fluid to retract from the second position.

9. The display pixel of claim 1, where the second voltage provides an electromechanical force on the first polar fluid that is sufficient to continue moving the first polar fluid to the second position by overcoming both of a Laplace pressure and the restraint imparted on the first polar fluid by the first Laplace barrier.

10. The display pixel of claim 9, wherein, when the first polar fluid is in the second position, the first polar fluid experiences forces related to the hydrophobic channel and is otherwise unrestrained.

11. The display pixel of claim 1 further comprising:
a second polar fluid within the hydrophobic channel, the second polar fluid having at least one spectral property of light that is different than a spectral property of light of the first polar fluid, and the first Laplace barrier positioned between the first and second polar fluids when the first electrode is biased by the first voltage.

12. The display pixel of claim 1 further comprising:
a first reservoir fluidically coupled to the hydrophobic channel and configured to impart a Laplace pressure onto the first polar fluid in a direction that opposes the movement of the first polar fluid from the first position to the second position.

13. The display pixel of claim 12, wherein the first reservoir imparts a larger radius of curvature on the first polar fluid when the first polar fluid is within the first reservoir than a radius of curvature of the first polar fluid that is within the hydrophobic channel.

14. The display pixel of claim 12 further comprising:
a second reservoir fluidically coupled to the hydrophobic channel such that the hydrophobic channel extends between the first and second reservoirs; and
a second polar fluid within the hydrophobic channel, the second reservoir, or a combination thereof, the second polar fluid having at least one spectral property of light that is different than a spectral property of light of the first polar fluid.

15. The display pixel of claim 1 further comprising:
a first reservoir fluidically coupled to the hydrophobic channel; and
a second electrode constructed from a material having a reflective property,
wherein the second electrode is positioned between the first reservoir and the hydrophobic channel and is electrically coupled with the first polar fluid.

16. The display pixel of claim 1 further comprising:
a first reservoir fluidically coupled to the hydrophobic channel;
a second electrode positioned between the first reservoir and the hydrophobic channel; and
a second dielectric layer between the second electrode and the first polar fluid.

17. The display pixel of claim 1 further comprising:
a second electrode; and
a second voltage source electrically connected with the second electrode, wherein the first polar fluid is divided into two volumes within the hydrophobic channel that are on opposite sides of the second electrode when the second electrode is biased by the second voltage source at a first voltage, and the two volumes of the first polar fluid being moved onto the second electrode and combined when the second electrode is biased by the second voltage source at a second voltage, the second voltage on the second electrode being greater than the first voltage on the second electrode.

18. The display pixel of claim 17 further comprising:
a reservoir fluidically coupled to the hydrophobic channel and configured to impart a Laplace pressure onto the first polar fluid in a direction that opposes the movement from the reservoir to the hydrophobic channel, the second electrode is positioned in the hydrophobic channel and adjacent to the reservoir such that the first polar fluid in the reservoir moves into the hydrophobic channel only when the second voltage source is biased with a voltage that generates an electromechanical pressure that overcomes the Laplace pressure,
wherein, when the second electrode is biased with no voltage or the first voltage, the first polar fluid splits into a first volume positioned in the hydrophobic channel and a second volume spanning the reservoir, the first and second volumes being separated by the second electrode.

19. The display pixel of claim 18 further comprising:
a second Laplace barrier, wherein the second Laplace barrier is positioned in the hydrophobic channel and adjacent to the second electrode.

20. The display pixel of claim 1 further comprising:
a second polar fluid including a non-black colorant,
wherein the non-polar fluid includes a black colorant and the first polar fluid includes a colorant that is a complimentary color to the non-black colorant of the second polar fluid.

21. The display pixel of claim 1 further comprising:
a second electrode arranged to intersect the first electrode; and
a second voltage source electrically connected with the second electrode,
wherein the second voltage source is configured to supply a third voltage that cooperates with the biased first electrode to move the first polar fluid to the first or second position.

22. A display device comprising a plurality of electrofluidic display pixels according to claim 1.

23. The display device of claim 22 further comprising:
a second polar fluid in each of the two or more electrofluidic display pixels;
a first of the plurality of electrofluidic display pixels where the first polar fluid includes a red colorant and the second polar fluid includes a cyan colorant;
a second of the plurality of electrofluidic display pixels where the first polar fluid includes a magenta colorant and the second polar fluid includes a green colorant; and
a third of the plurality of electrofluidic display pixels where the first polar fluid includes a yellow colorant and the second polar fluid includes a blue colorant.

24. The display pixel of claim 1 wherein the first Laplace barrier operates in accordance with the principles of contact angle hysteresis.

25. The display pixel of claim 24 further comprising:
a first reservoir fluidically coupled to the hydrophobic channel, wherein the first Laplace barrier is operable to generate a hysteresis pressure that is greater than the difference between a Laplace pressure of the first polar fluid in the hydrophobic channel and in the first reservoir.

* * * * *